(12) United States Patent
Jackson

(10) Patent No.: US 10,561,924 B1
(45) Date of Patent: Feb. 18, 2020

(54) USER IDENTIFICATION AND TRACKING SYSTEM FOR ARTIFICIAL CAVE OBSTACLE COURSE

(71) Applicant: David Alexander Jackson, Manitou Springs, CO (US)

(72) Inventor: David Alexander Jackson, Manitou Springs, CO (US)

( * ) Notice: Subject to any disclaimer, the term of this patent is extended or adjusted under 35 U.S.C. 154(b) by 0 days.

(21) Appl. No.: 15/870,959

(22) Filed: Jan. 14, 2018

Related U.S. Application Data

(63) Continuation-in-part of application No. 15/200,277, filed on Jul. 1, 2016, now Pat. No. 9,884,263, which is a continuation-in-part of application No. 14/594,070, filed on Jan. 9, 2015, now Pat. No. 9,399,178.

(60) Provisional application No. 61/964,751, filed on Jan. 13, 2014.

(51) Int. Cl.
| | |
|---|---|
| *A63J 11/00* | (2006.01) |
| *G09B 23/40* | (2006.01) |
| *A63B 71/06* | (2006.01) |
| *H04W 4/029* | (2018.01) |
| *H04L 29/08* | (2006.01) |
| *H04W 4/38* | (2018.01) |
| *G09B 25/08* | (2006.01) |

(52) U.S. Cl.
CPC ........... *A63B 71/0616* (2013.01); *A63J 11/00* (2013.01); *G09B 23/40* (2013.01); *G09B 25/08* (2013.01); *H04L 67/22* (2013.01); *H04W 4/029* (2018.02); *H04W 4/38* (2018.02)

(58) Field of Classification Search
CPC .... A63J 11/00; A63B 17/00; A63B 2009/006; A63B 2009/008; A63B 2208/12; A63G 31/00; A63G 31/007; A63G 33/00
USPC .................................. 472/62, 116–117, 128
See application file for complete search history.

(56) References Cited

U.S. PATENT DOCUMENTS

| | | | | |
|---|---|---|---|---|
| 5,906,373 | A * | 5/1999 | Sanders ................. | A63B 67/00 273/349 |
| 6,095,927 | A * | 8/2000 | Malone .................... | A63J 11/00 472/128 |
| 8,226,493 | B2 * | 7/2012 | Briggs ................. | A63G 31/007 273/440 |
| 8,574,085 | B1 * | 11/2013 | Jackson ................... | A63J 11/00 472/136 |

(Continued)

*Primary Examiner* — Kien T Nguyen

(57) ABSTRACT

An artificial cave has various features that resemble speleothems (e.g., stalactites, stalagmites, etc.) found in real subterranean caves. Human users may pass through the artificial cave, with each user wearing a wearable transceiver that broadcasts a signal code unique to that user. Fixed transceivers throughout the cave can detect and identify any user who is sufficiently close to that fixed transceiver. Other components of the system collect user identification information from the fixed transceivers for any of several possible purposes (e.g., identifying which user was probably responsible for inappropriate interaction with a speleothem that is adjacent to a given fixed transceiver, where all of the various user of the cave are currently located in the cave, etc.). A count of users currently in the artificial cave passageway may be maintained and used for a number of purposes. Similarly, human detectors may be employed near the system and/or in the artificial cave passage for any of several different purposes.

17 Claims, 36 Drawing Sheets

(56) References Cited

U.S. PATENT DOCUMENTS

2003/0203760 A1* 10/2003 Henry ................. A63G 31/007
                                                            472/117

* cited by examiner

| SPELEOTHEM SENSOR | ASSOCIATED FIXED DETECTOR |
|---|---|
| SS1 | FD3 |
| SS2 | FD4 |
| SS3 | FD6 |
| SS4 | FD9 |
| SS5 | FD12 |
| SS6 | FD14 |
| SS7 | FD16 |
| SS8 | FD18 |
| SS9 | FD20 |
| SS10 | FD21 |

FIG. 14

| ROUTE 1 | ROUTE 2 |
|---|---|
| FD1-FD9 | FD1-FD15 |
| FD16-FD22 | FD20-FD22 |

FIG. 15

| USER A | FD1 | FD2 | FD3 | FD4 | FD5 | FD6 | FD7 | FD8 | FD9 | FD10 | FD11 | FD12 | FD13 | FD14 | FD15 | FD16 | FD17 | FD18 | FD19 | FD20 | FD21 | FD22 |
|---|---|---|---|---|---|---|---|---|---|---|---|---|---|---|---|---|---|---|---|---|---|---|
| T1 | 1 | | | | | | | | | | | | | | | | | | | | | |
| T2 | | 1 | | | | | | | | | | | | | | | | | | | | |
| T3 | | 1 | 1 | | | | | | | | | | | | | | | | | | | |
| T4 | | | | 1 | | | | | | | | | | | | | | | | | | |
| T5 | | | | | 1 | 1 | | | | | | | | | | | | | | | | |
| T6 | | | | | | 1 | 1 | | | | | | | | | | | | | | | |
| T7 | | | | | | | | 1 | 1 | | | | | | | | | | | | | |
| T8 | | | | | | | | 1 | | | | | | | | | | | | | | |
| T9 | | | | | | | | | | 1 | | | | | | | | | | | | |
| T10 | | | | | | | | | | | | | | | | 1 | | | | | | |
| T11 | | | | | | | | | | | | | | | | 1 | 1 | | | | | |
| T12 | | | | | | | | | | | | | | | | | 1 | | | | | |
| T13 | | | | | | | | | | | | | | | | | | 1 | | | | |
| T14 | | | | | | | | | | | | | | | | | | | 1 | 1 | | |
| T15 | | | | | | | | | | | | | | | | | | | | 1 | 1 | 1 |
| T16 | | | | | | | | | | | | | | | | | | | | | | 1 |
| T17 | | | | | | | | | | | | | | | | | | | | | | |
| T18 | | | | | | | | | | | | | | | | | | | | | | |
| T19 | | | | | | | | | | | | | | | | | | | | | | |
| T20 | | | | | | | | | | | | | | | | | | | | | | |
| T21 | | | | | | | | | | | | | | | | | | | | | | |
| T22 | | | | | | | | | | | | | | | | | | | | | | |
| T23 | | | | | | | | | | | | | | | | | | | | | | |
| T24 | | | | | | | | | | | | | | | | | | | | | | |
| T25 | | | | | | | | | | | | | | | | | | | | | | |
| T26 | | | | | | | | | | | | | | | | | | | | | | |
| T27 | | | | | | | | | | | | | | | | | | | | | | |
| T28 | | | | | | | | | | | | | | | | | | | | | | |
| T29 | | | | | | | | | | | | | | | | | | | | | | |
| T30 | | | | | | | | | | | | | | | | | | | | | | |

TIME ↓

| USER B | FD1 | FD2 | FD3 | FD4 | FD5 | FD6 | FD7 | FD8 | FD9 | FD10 | FD11 | FD12 | FD13 | FD14 | FD15 | FD16 | FD17 | FD18 | FD19 | FD20 | FD21 | FD22 |
|---|---|---|---|---|---|---|---|---|---|---|---|---|---|---|---|---|---|---|---|---|---|---|
| T1 | | | | | | | | | | | | | | | | | | | | | | |
| T2 | | | | | | | | | | | | | | | | | | | | | | |
| T3 | | | | | | | | | | | | | | | | | | | | | | |
| T4 | | | | | | | | | | | | | | | | | | | | | | |
| T5 | | | | | | | | | | | | | | | | | | | | | | |
| T6 | | | | | | | | | | | | | | | | | | | | | | |
| T7 | | | | | | | | | | | | | | | | | | | | | | |
| T8 | | | | | | | | | | | | | | | | | | | | | | |
| T9 | | | | | | | | | | | | | | | | | | | | | | |
| T10 | 1 | | | | | | | | | | | | | | | | | | | | | |
| T11 | | 1 | 1 | 1 | | | | | | | | | | | | | | | | | | |
| T12 | | | | 1 | | | | | | | | | | | | | | | | | | |
| T13 | | | | 1 | 1 | | | | | | | | | | | | | | | | | |
| T14 | | | | | 1 | | | | | | | | | | | | | | | | | |
| T15 | | | | | 1 | 1 | | | | | | | | | | | | | | | | |
| T16 | | | | | | 1 | 1 | | | | | | | | | | | | | | | |
| T17 | | | | | | | | 1 | | | | | | | | | | | | | | |
| T18 | | | | | | | | 1 | 1 | 1 | | | | | | | | | | | | |
| T19 | | | | | | | | | | 1 | 1 | | | | | | | | | | | |
| T20 | | | | | | | | | | | 1 | | | | | | | | | | | |
| T21 | | | | | | | | | | | 1 | 1 | | | | | | | | | | |
| T22 | | | | | | | | | | | | | 1 | 1 | | | | | | | | |
| T23 | | | | | | | | | | | | | | 1 | | | | | | | | |
| T24 | | | | | | | | | | | | | | 1 | | | | | | | | |
| T25 | | | | | | | | | | | | | | | | 1 | | | | | | |
| T26 | | | | | | | | | | | | | | | | | | 1 | | | 1 | |
| T27 | | | | | | | | | | | | | | | | | | | | | 1 | |
| T28 | | | | | | | | | | | | | | | | | | | | | 1 | 1 |
| T29 | | | | | | | | | | | | | | | | | | | | | | 1 |
| T30 | | | | | | | | | | | | | | | | | | | | | | |

TIME ↓

DETECTED DAMAGE

| | SS1 | SS2 | SS3 | SS4 | SS5 | SS6 | SS7 | SS8 | SS9 | SS10 |
|---|---|---|---|---|---|---|---|---|---|---|
| T1 | | | | | | | | | | |
| T2 | | | | | | | | | | |
| T3 | | | | | | | | | | |
| T4 | | | | | | | | | | |
| T5 | | | | | | | | | | |
| T6 | | 1 | | | | | | | | |
| T7 | | | | | | | | | | |
| T8 | | | | | | | | | | |
| T9 | | | 1 | | | | | | | |
| T10 | | | | | | | | | | |
| T11 | | | | | | | 1 | | | |
| T12 | 1 | | | | | | | | | |
| T13 | | | | | | | | | | |
| T14 | | | | | | | | | 1 | |
| T15 | | | | | | | | | 1 | |
| T16 | | | | | | | | | | |
| T17 | | | | | | | | | | |
| T18 | | | 1 | | | | | | | |
| T19 | | | | | | | | | | |
| T20 | | | | | | | | | | |
| T21 | | | | 1 | | | | | | |
| T22 | | | | 1 | | | | | | |
| T23 | | | | | | | | | | |
| T24 | | | | | | | | | | |
| T25 | | | | | | | | | | |
| T26 | | | | | | | | | | |
| T27 | | | | | | | | | 1 | |
| T28 | | | | | | | | | | |
| T29 | | | | | | | | | | |
| T30 | | | | | | | | | | |

TIME ↓

DETECTED DAMAGE (TRANSLATED TO FDS)

| TIME ↓ | FD3 | FD4 | FD6 | FD9 | FD12 | FD14 | FD16 | FD18 | FD20 | FD21 |
|---|---|---|---|---|---|---|---|---|---|---|
| T1 | | | | | | | | | | |
| T2 | | | | | | | | | | |
| T3 | | | | | | | | | | |
| T4 | | | | | | | | | | |
| T5 | | | | | | | | | | |
| T6 | | 1 | | | | | | | | |
| T7 | | | | | | | | | | |
| T8 | | | | | | | | | | |
| T9 | | | 1 | | | | | | | |
| T10 | | | | | | | | | | |
| T11 | | | | | | 1 | | | | |
| T12 | 1 | | | | | | | | | |
| T13 | | | | | | | | | | |
| T14 | | | | | | | | | 1 | |
| T15 | | | | | | | | | 1 | |
| T16 | | | | | | | | | | |
| T17 | | | | | | | | | | |
| T18 | | | 1 | | | | | | | |
| T19 | | | | | | | | | | |
| T20 | | | | | | | | | | |
| T21 | | | | 1 | | | | | | |
| T22 | | | | 1 | | | | | | |
| T23 | | | | | | | | | | |
| T24 | | | | | | | | | | |
| T25 | | | | | | | | | | |
| T26 | | | | | | | | | | |
| T27 | | | | | | | | | 1 | |
| T28 | | | | | | | | | | |
| T29 | | | | | | | | | | |
| T30 | | | | | | | | | | |

USER A "DAMAGE" REPORT

| | |
|---|---|
| SS1 | 0 |
| SS2 | 0 |
| SS3 | 1 |
| SS4 | 1 |
| SS5 | 0 |
| SS6 | 0 |
| SS7 | 1 |
| SS8 | 0 |
| SS9 | 2 |
| SS10 | 0 |
| TOTAL | 5 |

FIG. 20

USER B "DAMAGE" REPORT

| | |
|---|---|
| SS1 | 0 |
| SS2 | 1 |
| SS3 | 0 |
| SS4 | 1 |
| SS5 | 2 |
| SS6 | 0 |
| SS7 | 0 |
| SS8 | 0 |
| SS9 | 1 |
| SS10 | 0 |
| TOTAL | 5 |

FIG. 21

SPELEOTHEM DAMAGE RECORD

|       | USER A | USER B | ••• |
|-------|--------|--------|-----|
| SS1   | 0      | 0      |     |
| SS2   | 0      | 1      |     |
| SS3   | 1      | 0      |     |
| SS4   | 1      | 1      |     |
| SS5   | 0      | 2      |     |
| SS6   | 0      | 0      |     |
| SS7   | 1      | 0      |     |
| SS8   | 0      | 0      |     |
| SS9   | 2      | 1      |     |
| SS10  | 0      | 0      |     |
| TOTAL | 5      | 5      |     |

FIG. 24

SPELEOTHEM DAMAGE/REWARD RECORD

|  | USER A | USER B | ••• |
|---|---|---|---|
| SS1 | 0 | 0 | |
| SS2 | 0 | 1 | |
| SS3 | 1 | 0 | |
| SS4 | 1 | 1 | |
| SS5 | 0 | 2 | |
| SS6 | 0 | 0 | |
| SS7 | 1 | 0 | |
| SS8 | 0 | 0 | |
| SS9 | 2 | 1 | |
| SS10 | -1 | 0 | |
| TOTAL DAMAGES | 5 | 5 | |
| TOTAL CREDITS | 1 | 0 | |
| NET DAMAGES | 4 | 5 | |

FIG. 27

NAME _____

ELAPSED TIME _____

ROUTE TAKEN _____         (MAXIMUM POSSIBLE
                                     CREDITS ON YOUR
TOTAL DAMAGES _____        ROUTE _____ )

TOTAL CREDITS _____

NET DAMAGES _____

| IMAGE OF AREA INCLUDING FIRST DAMAGED SPELEOTHEM; # OF DAMAGES ___ | IMAGE OF AREA INCLUDING SECOND DAMAGED SPELEOTHEM; # OF DAMAGES ___ | ... |

| ROUTE | MAXIMUM POSSIBLE CREDITS ON THIS ROUTE |
|---|---|
| 1 | 1 |
| 2 | 1 |

1110

| EXTERNAL USER NAME | INTERNAL USER NAME | CAVE ENTERING TIME | CAVE EXITING TIME |
|---|---|---|---|
| ANN | A | 00005 | 00245 |
| SAM | B | 00085 | 00395 |
| ALAN | C | 00175 | 00502 |
| PAM | D | 00317 | 00612 |
| ⋮ | ⋮ | ⋮ | ⋮ |

| TIME | MAP DISPLAY IMAGE DATA |
|---|---|
| 00001 | DATA FOR MAP DISPLAY AT TIME 00001 |
| 00002 | DATA FOR MAP DISPLAY AT TIME 00002 |
| 00003 | DATA FOR MAP DISPLAY AT TIME 00003 |
| ⋮ | ⋮ |

FIG. 38

USER IDENTIFICATION AND TRACKING SYSTEM FOR ARTIFICIAL CAVE OBSTACLE COURSE

CROSS-REFERENCE TO RELATED APPLICATIONS

This application is a continuation-in-part of application Ser. No. 15/200,277, filed Jul. 1, 2016, which is a continuation-in-part of application Ser. No. 14/594,070, filed Jan. 9, 2015, which claims the benefit of Provisional Application 61/964,751, filed Jan. 13, 2014, all of which are hereby incorporated by reference herein.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

Obstacle courses of the type shown in U.S. Pat. No. 8,574,085 are currently in use for teaching participants about the fragile nature of real cave environments. Users of the current systems include search and rescue personnel, caving enthusiasts, and children and adults from the general public. When these users travel through the obstacle courses, they encounter artificial cave formations, also known as speleothems. When a user touches or otherwise inappropriately interacts with a speleothem, the user is considered to have "damaged" that speleothem. The "damaging" interaction between the user and the speleothem is detected by electronic sensors. These sensors may convey "damage" information to a system that displays maps showing all of the "damages" that have occurred, along with aggregate data such as (1) the total number of "damages" that have occurred in the current session and (2) the elapsed time of the current session. U.S. Pat. No. 8,574,085 is hereby incorporated by reference herein in its entirety.

Although the current obstacle courses have been very successful, there are a number of respects in which the current systems might be improved. For example, users may enter the existing obstacle courses singly or in groups, but in the courses currently in use there is no provision for determining which user within a group "damaged" a given formation. Further, there are no provisions for determining the location of each user within the course, or the progress of each user through the course. Additionally, in the systems currently in use, the users wear protective helmets equipped with electric lights, and there is no provision in the existing courses for the lights to be turned on and off automatically when the users enter and exit the course. There is also no provision for automatically detecting whether each user is wearing the proper equipment (including the helmet with light), and whether that equipment is functioning properly. Because of the above-described aspects of the existing courses, and because of other possible considerations not stated, there is room for improvement to the systems currently in use in the areas of user identification and tracking.

SUMMARY OF THE INVENTION

This invention provides an electronic system for locating, identifying, and tracking human users in an obstacle course designed to look like a natural cave environment. A prior invention (U.S. Pat. No. 8,574,085) by the same inventor relates to an obstacle course which contains artificial cave formations (speleothems), as well as sensors (e.g., electromechanical sensors) for the detection of human interaction with the artificial formations. The present invention provides an electronic tracking system comprising transceivers worn by the human users (hereafter wearable transceivers), as well as transceivers located throughout the obstacle course and possibly also at the entrances and exits of the course (hereafter fixed transceivers). Communication from the wearable transceivers to the fixed transceivers may convey information about the identity and location of users in the artificial cave obstacle course, and possibly also about the status of the wearable transceivers and other wearable electronics. For example, information about the amount of charge remaining in the batteries of the users' wearable electronics may be communicated, along with the on/off status of the users' electric lights. Communication from the fixed transceivers to the wearable transceivers may convey information making possible remote control of other wearable electronic hardware (e.g., an electric light worn by a user may be turned on and off using information conveyed from the fixed to the wearable transceivers). Communication among the fixed transceivers (and possibly other electronic systems) may convey information about the movement (or lack thereof) of the users, and may also allow for the identification of the user who was closest to a given location at the time of a specific event (e.g., when a user interacts with an artificial speleothem as detected by sensors as in U.S. Pat. No. 8,574,085, the present invention may allow for the determination of which of multiple users had the interaction with the artificial speleothem). Further, this invention provides electronic equipment for interfacing with the sensors and other electronic apparatus of the types shown in U.S. Pat. No. 8,574,085 and with the users and operators of the obstacle course.

Certain other possible features of the invention relate to apparatus and methods for counting users entering and exiting an artificial cave passage for such purposes as keeping the number of users currently in the passage at any given time at or below a predetermined desired maximum number of simultaneous users.

Still other possible features of the invention relate to apparatus and methods for monitoring human presence and/or motion (e.g., human operator presence and/or motion in an area outside the actual artificial cave passageway that operators typically enter to operate the cave, and/or human user presence and/or motion inside the artificial cave passageway) to automatically reduce electrical power consumption by at least some elements of the artificial cave system after there has been no such human presence and/or motion for at least a certain predetermined time interval.

Yet other possible features of the invention involve combining certain aspects of the two immediately preceding paragraphs, for example, so that the immediately above-mentioned power consumption reduction is not allowed to occur unless the net count of users (mentioned two paragraphs earlier) is zero when power consumption reduction would otherwise be called for.

Further features of the invention, its nature and various advantages will be more apparent from the accompanying drawings and the following detailed description.

BRIEF DESCRIPTION OF THE DRAWINGS

FIG. 14 is a table showing illustrative possible relationships between several system elements in an illustrative artificial cave construction such as shown in earlier FIGS.

FIG. 15 is another table showing illustrative possible dispositions of several system elements in an illustrative artificial cave construction such as shown in earlier FIGS.

FIG. 16 is a table showing some representative data resulting from monitoring the passage of a typical user through an artificial cave such as shown in earlier FIGS.

FIG. 17 is similar to FIG. 16 but for another typical user passing through the artificial cave.

FIG. 18 is a table showing some other representative data resulting from monitoring the passage of the users of FIGS. 16 and 17 through the artificial cave.

FIG. 19 is another table showing translation of the FIG. 18 data to an equivalent but different form of representation.

FIG. 20 is a table of illustrative data that results from correlation of the illustrative data in FIG. 16 with the illustrative data in FIG. 19 in accordance with certain aspects of the invention.

FIG. 21 is similar to FIG. 20 but for correlation of FIG. 17 and FIG. 19 data.

FIG. 24 is like a combination of FIGS. 20 and 21, but for an embodiment like that illustrated by FIG. 23.

FIG. 27 is generally similar to FIG. 24, but shows the result of gathering still other information about user performance in accordance with still other possible aspects of the invention.

FIG. 29 is generally similar to FIG. 22, but shows illustrative addition to a user's display of additional information of the kind shown in FIG. 27 and gathered in accordance with FIG. 28.

FIG. 37 is a table of some representative data that may be captured for such purposes as replaying displays like FIG. 33 in accordance with certain possible aspects of the invention.

FIG. 38 is another table of some other representative data that may be captured for such purposes as replaying displays like FIG. 33 in accordance with certain possible aspects of the invention.

DETAILED DESCRIPTION OF THE INVENTION

Figure 1:
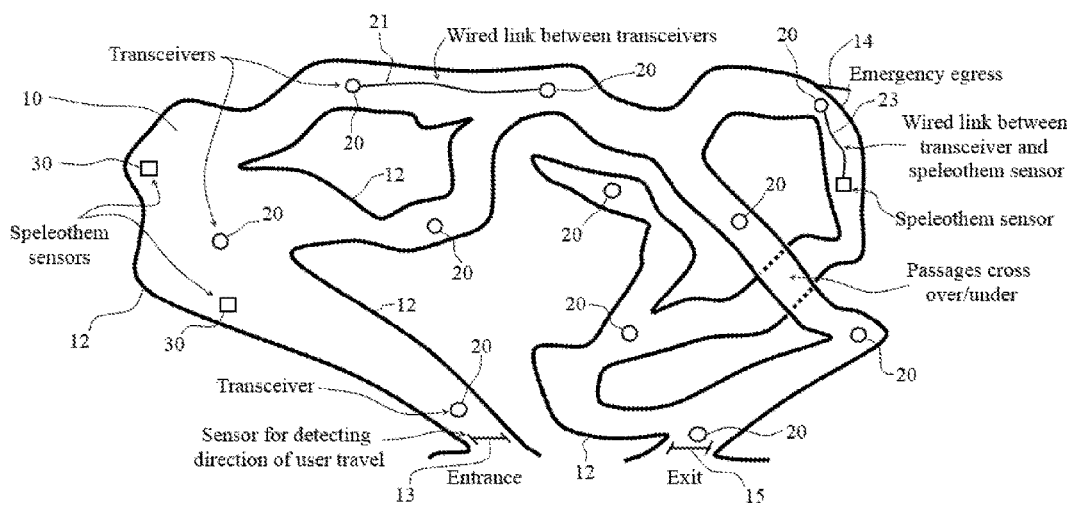
FIG. 1 is a simplified plan view of an illustrative embodiment of a cave obstacle course with fixed transceivers in accordance with certain possible aspects of the present invention.

Electronic transceivers 20 (see, e.g., FIG. 1) are placed throughout an artificial cave obstacle course or passage 10 fashioned of hollow, three-dimensional shapes 12, such as, but not limited to, rectangular and triangular prisms and cylinders, connected to form the passage 10 through which one or more humans ("users") can move, either with or without various types of equipment. As in U.S. Pat. No. 8,574,085, at least the interior of passage 10 is preferably constructed and otherwise made to resemble a natural subterranean cave environment. As in most natural caves, the construction of passage 10 is typically such as to require users to crawl through at least some portions of the passage in order to traverse (pass through) the passage.

The multiple electronic transceivers 20 in the course 10 (hereafter "fixed transceivers") preferably communicate wirelessly with additional electronic transceivers 50 (see, e.g., FIG. 2) worn by the human users of the course (hereafter "wearable transceivers"). Each such human user typically wears one wearable transceiver 50, which can be used (e.g., by any fixed transceiver 20) to uniquely identify the user wearing that wearable transceiver 50 as will be explained in more detail below. The wireless communication between the fixed 20 and wearable 50 transceivers may be accomplished via any suitable medium, including, but not limited to, radio waves, optical waves, or acoustic waves.

Each of the multiple wearable transceivers 50 preferably contains a unique identifying code, such as a number, which allows the fixed transceivers 20 to determine from which of the wearable transceivers a particular communication originated. The identifying code may be programmed into the transceiver 50 via any suitable means, such as, but not limited to, an array of switches, a coded piece of hardware plugged into the transceiver (hereafter "a dongle"), or a wired or wireless link to a programmer. Further, the identifying code may be fixed or may be reassigned by the system. Each fixed transceiver 20 is also preferably assigned a unique identifying code, such as a number, which allows a central electronic system 100 (see, e.g., FIG. 3) to determine from which of the fixed transceivers 20 a particular communication has emanated. Each fixed transceiver 20 may be programmed with its unique identifier via any suitable means, including an array of switches, a dongle, or a wired or wireless link (see, e.g., dongles 22 in FIG. 3).

The fixed transceivers 20 can be placed at any interval or randomly throughout the course 10, and may be affixed to the course in such a way that they can be relocated. FIG. 1 shows one illustrative embodiment of the placement of fixed transceivers (represented by the small circles 20) in an obstacle course (the area 10 between the heavy, longitudinally-extended lines 12 (which depict side walls of the obstacle course) and which area 10 extends, via various routes, between artificial cave or course entrance 13 and artificial cave or course exit 15). The fixed transceivers 20 can reside on the outside surface of the course 10, the inside surface of the course 10, or partially in and partially out of the course 10; and they may reside on any surface, including, but not limited to, the floors, walls, and ceiling of course 10. There may be wired or wireless links (e.g., wired link 21) among the transceivers 20, and the transceivers 20 may receive their power over wires or they may contain their own power sources. The fixed transceivers 20 can be linked together with other electronic equipment, including, but not limited to, the speleothem sensors 30 and other electronics disclosed in U.S. Pat. No. 8,574,085 and additional sensors for detecting the direction of flow of users through the course 10 (see, e.g., wired link 23 in FIG. 1). For example, transceivers 20 near entrance 13, emergency egress 14, and normal exit 15 in FIG. 1 may be especially employed for monitoring user entrance and/or exit from passage 10. Alternatively, or in addition, each of entrance 13, emergency egress 14, and normal exit 15 may include an electromechanical gate and/or an electronic sensor (e.g., a break-beam or "electric eye" sensor) for detecting and reporting to central electronic system 100 (see, e.g., FIG. 3) the passage of a person (user) through that entrance, emergency egress, or normal exit. Some or all of the fixed transceivers 20 can be reduced to transmitters only or receivers only.

Figure 2:
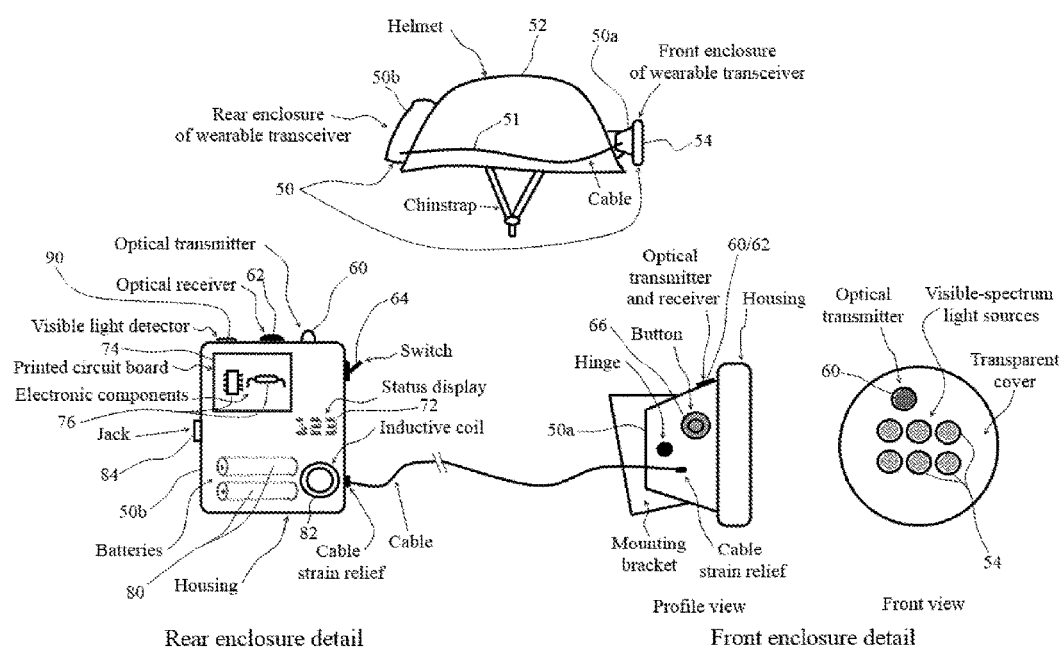
FIG. 2 comprises several views of an illustrative embodiment of a wearable transceiver in accordance with certain possible aspects of the present invention.

The aforementioned wearable transceivers 50 are affixed to the human users of course 10 via any suitable means, including, but not limited to, on a helmet 52 worn by the user as shown in FIG. 2. Again, because it is contemplated that more than one human user may be in course 10 at any given time, each such user wears a respective one of a plurality of wearable transceivers 50, each such transceiver 50 being uniquely identifiable by other components of the system and therefore serving as a means by which the particular user wearing that transceiver 50 can be identified while that user is in or at least near course or passage 10. In the illustrative embodiment shown in FIG. 2, typical transceiver 50 is incorporated with an electric light 54 affixed to a helmet 52, and the transceiver comprises two enclosures (front 50a and rear 50b) linked by a cable 51. In the particular embodiment shown, communication between each wearable transceiver 50 and the fixed transceivers 20 is accomplished via an optical link, and optical transmitters 60 and receivers 62 are located at various points on the front and rear enclosures 50a/b. Additionally, the wearable transceivers 50 may be fitted with devices for human input, such as switches 64, buttons 66, capacitive sensors, and knobs. The wearable transceivers 50 may also be outfitted with status indicators 72, including, but not limited to, colored lights or alphanumeric displays. The enclosures 50a/b may contain one or more printed circuit boards 74 with electronic components 76 such as microcontrollers. Each wearable transceiver 50 contains its own source of power 80, which may be replenished via any suitable means, including a wired connection or an inductive link 82. For the purpose of transferring power and/or information (e.g., when not operating wirelessly), the wearable transceivers 50 may be equipped with jacks 84 and/or other connectors. The wearable transceivers 50 may also be equipped with additional sensors, such as, but not limited to, ambient light detectors 90 for the automatic adjustment of the visible-spectrum electric light 54 associated with the wearable transceiver. Some or all of the wearable transceivers can be reduced to transmitters only or receivers only.

Figure 3:
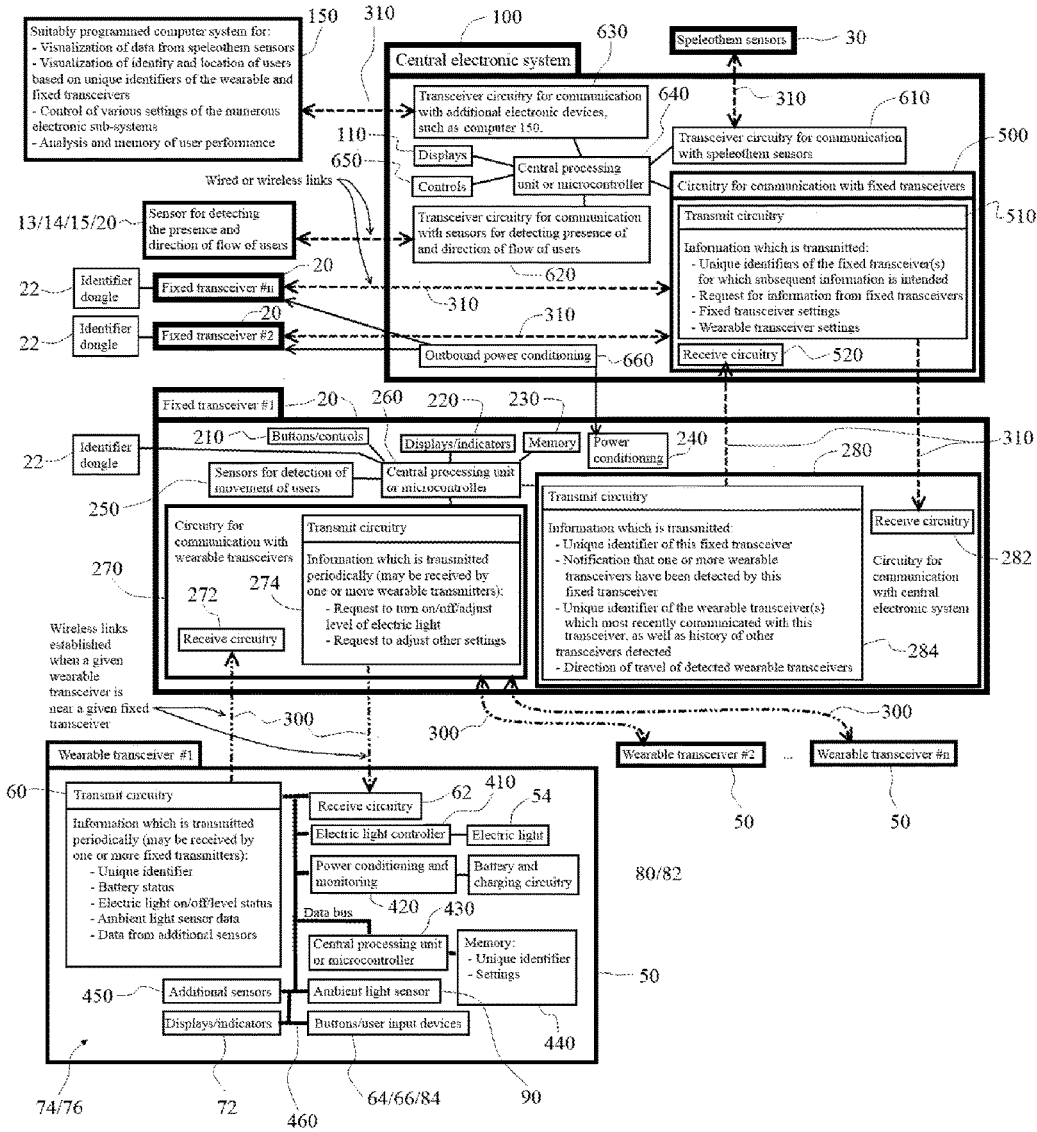
FIG. 3 is a diagram of an illustrative embodiment of communication among the fixed transceivers, the wearable transceivers, and additional electronic systems, and includes simplified schematic block diagrams of illustrative embodiments of various electronic components, all in accordance with certain possible aspects of the present invention.

Communication among the wearable transceivers 50, fixed transceivers 20, and a central electronic system 100 preferably allows for the identification and tracking of the users of the obstacle course 10, as shown in FIG. 3. As the users travel through the obstacle course 10, the wearable transceiver 50 on each user periodically transmits its unique identifier (ID) and status information. When the user is sufficiently close to a fixed transceiver 20 in the obstacle course, that fixed transceiver receives the unique ID and status information thus wirelessly broadcast by the wearable transceiver 50. After receiving these data from the wearable transceiver 50, the fixed transceiver 20 transmits information to the central electronic system 100. In one illustrative embodiment, each fixed transceiver 20 first identifies itself by its own unique ID to the central electronic system 100, and then transmits to the central electronic system the unique ID(s) of the wearable transceiver(s) 50 that it has recently (e.g., most recently) detected. The central electronic system 100 may communicate to the fixed transceivers 20 with requests for information, requests to change settings, and other information.

The central electronic system 100 preferably aggregates the data gathered from the fixed transceivers 20 and may transmit these aggregated data on to a suitably-programmed computer system 150 for further processing and/or display. Either the central electronic system 100, the programmed computer 150, or another electronic system may display information (e.g., via displays 110), including, but not limited to, which wearable transceivers 50 are in the course 10 at any given time, where in the course 10 each wearable transceiver 50 is at any given time, which wearable transceiver 50 is closest to a given speleothem when the speleothem sensor 30 is triggered, whether each wearable transceiver 50 is currently moving, which direction a wearable transceiver 50 is moving, and which wearable transceiver 50 was closest to an emergency egress 14 when the egress is opened.

Further considering certain aspects of the illustrative embodiment shown in FIG. 3, that FIG. includes a depiction of the circuitry of or associated with one of several representative fixed transceivers 20 (i.e., "fixed transceiver #1") in more detail. That representative fixed transceiver circuitry includes button controls 210, displays/indicators 220, memory 230, power conditioning circuitry 240, sensors for detection of movement of users 250, central processing unit or microcontroller 260, circuitry 270 for communication with the wearable transceivers, and circuitry 280 for communication with the central electronic system. Circuitry 270 in turn includes receive circuitry 272 and transmit circuitry 274, while circuitry 280 includes receive circuitry 282 and transmit circuitry 284. Central processing unit or microcontroller 260 is shown with connections to each of associated elements 210, 220, 230, 250, 270, and 280, as well as to the earlier-described identification dongle 22 of this particular fixed transceiver 20. Power conditioning circuitry 240 ensures that all other associated circuit elements receive the appropriate voltage(s) and current(s) required for successful operation of those other circuit elements.

Transmit circuitry 274 is the circuitry responsible for periodically wirelessly transmitting information to any one or more of the wearable transceivers 50 that is or are within wireless transmission range of the representative fixed transceiver 20 that is currently being described in detail. For example, that information from circuitry 274 may include an identifier of one or more wearable transceivers 50 that should respond to this transmission from circuitry 274 (as noted earlier, such identifiers are preferably unique for each wearable transceiver 50); a request or instruction to turn on, turn off, or adjust the level of the electric light 54 of that wearable transceiver 50 or those wearable transceivers 50; and/or a request or instruction to adjust one or more other settings of that wearable transceiver 50 or those wearable transceivers 50. An example of this last kind of request or instruction might be a request or instruction to change the information displayed by the status display 72 on one or more receiving wearable transceivers 50. FIG. 3 depicts by means of chain-dotted lines that wireless links like 300 are effective (i.e., "established") between any fixed transceiver 20 and any one of several wearable transceivers only when a given wearable transceiver 50 is sufficiently close to that fixed transceiver 20. For example, in the case of optical wireless communication between transceivers 20 and 50, there must typically be a direct line of sight between a transceiver 20 and a transceiver 50 in order for optical wireless communication 300 to occur between those two transceivers. Transmit circuitry 274 will be understood to include the transducer (e.g., an optical transmitter analogous to optical transmitter 60 on illustrative wearable transceiver 50 in FIG. 2) and circuitry for driving that transducer to cause transmission of the earlier-described signal information via communication link(s) 300.

Transmit circuitry 284 is the circuitry responsible for transmitting (e.g., periodically) information from the representative fixed transceiver 20 that is currently being described in detail to the central electronic system 100. As shown by the dotted lines 310 in FIG. 3, this communication may be via either wireless and/or wired connections. However, to any extent that these connections are wireless they are preferably made in a way that does not depend on proximity (closeness) between elements 20 and 100. For example, radio transmission having sufficient range (power) to be always effective for all elements 20 and 100 in the system may be used for any part or all of links 310 that are wireless. As shown in FIG. 3, the information transmitted by transmit circuitry 284 may include an identifier (preferably unique) for the representative fixed transceiver here being described (as mentioned earlier, the identifier dongle 22 of this transceiver 20 may provide the identifier for this transceiver); notification that this transceiver 20 has detected one or more of wearable transceivers 50 within effective wireless optical communication range of this transceiver 20; the unique identifier(s) of wearable transceiver(s) 50 thus most recently detected, as well as a history of other wearable transceiver(s) 50 recently detected by this transceiver 20 (e.g., all such wearable transceivers 50 recently detected that are still within effective wireless communication range of this transceiver 20); and the direction of travel of each detected wearable transceiver 50. (Various techniques for detecting direction of travel of users through passage 10 will be discussed in detail later in this specification.) As in the case of transmit circuitry 274, transmit circuitry 284 will be understood to include any necessary transducer and other circuitry required for driving the above-described signal information onto associated communication link 310.

Within the representative fixed transceiver circuitry 20 here being described in detail, receive circuitry 272 is responsible for receiving signal information from any one or more of wearable transceivers 50 that are within effective communication range of this transceiver 20 via above-described wireless communication link(s) 300. The particular information that this representative fixed transceiver 20 thus receives has already been described and will be even further described below in the further discussion of the representative one of wearable transceivers 50 (i.e., "wearable transceiver #1") that is shown extensively in FIG. 3. However, here it will be noted that receive circuitry 272 includes any necessary transducer and other circuitry for detecting signal information on any communication link 300 that is currently effective for this transceiver 20 and for converting that signal information to the electronic form suitable for processing within the circuitry of this transceiver 20. For example, in the case of optical communication link 300, receive circuitry 272 may include an optical receiver transducer analogous to optical receiver 62 on representative wearable transceiver 50 in FIG. 3 and circuitry for converting information received optically by that optical receiver transducer to electrical signals suitable for use elsewhere in the fixed transceiver 20 here being described.

Also within the representative fixed transceiver circuitry 20 here being discussed in detail, receive circuitry 282 is responsible for receiving signal information from central electronic system 100 via a link 310 of the type(s) described earlier for such links Again, the particular information that this representative fixed transceiver 20 thus receives from system 100 will be more fully described in the below further discussion of system 100. Here it will be noted, however, that receive circuitry 282 includes whatever is necessary (e.g., a wireless radio transducer) for detecting any signal information from central electronic system 100 via the associated communication link 310 and for converting that signal information to electronic signals suitable for use elsewhere within the fixed transceiver 20 here being discussed.

Further within the representative fixed transceiver 20 here being discussed in connection with FIG. 3, central processing unit or microcontroller 260 typically comprises a suitably programmed and/or configured microprocessor or microcontroller. For example, circuitry 260 may obtain the unique identifier code of this fixed transceiver from the associated identifier dongle 22 whenever that code is needed. All or part of any program coding used by circuitry 260 may be stored in associated memory 230 and retrieved by circuitry 260 from that memory as and when needed by circuitry 260. Circuitry 260 typically receives and appropriately processes (in accordance with its programming and/or configuration) information it receives from the associated receive circuitry 272 and/or 282. Circuitry 260 further typically outputs to transmit circuitry 274 and/or 284 information it has determined (again in accordance with its programming and/or configuration) should be transmitted to other elements of the system shown in FIG. 3. Circuitry 260 may use memory 230 for storage of any program coding and/or data that it needs in the course of its operation, and circuitry 260 may thus retrieve any such information or store any such information in memory 230 as and when appropriate. Circuitry 260 may be at least partly responsive to inputs from associated manually operable buttons or switches 210. Such buttons or switches 210 may be manually operable by a human operator of the system (e.g., to adapt the programming and/or configuration of circuitry 260 to any of several different uses for which this transceiver 20 may be needed). Circuitry 260 may control any of various associated displays and/or indicators 220, e.g., to indicate to a human operator of the system various aspects of the operational status of this transceiver 20.

Power conditioning circuitry 240 is typically hard-wired to a source of generally suitable electrical power (e.g., outbound power conditioning circuitry 660 (described below) in central electronic system 100). As has been mentioned, circuitry 240 ensures the availability of appropriate voltage(s) and current(s) for other components of transceiver 20.

It will be appreciated that although FIG. 3 shows possible wireless connections 300 only between the one representative fixed transceiver 20 that is shown in detail and the several depicted wearable transceivers 50 that are shown, this is only done to avoid unnecessarily over-complicating the drawing. In fact, as a general matter, any wearable transceiver 50 that is in use can establish a wireless connection 300 with any of the fixed transceivers 20 in the system that any such transceiver 50 is sufficiently close to.

Turning now to the details of the depiction of one representative wearable transceiver 50 (i.e., "wearable transceiver #1" in FIG. 3), the circuitry of that typical transceiver 50 includes transmit circuitry 60, receive circuitry 62, buttons and/or user input devices 64/66/68, displays and/or indicators 72, battery and charging circuitry 80/82, electric light 54, ambient light sensor 90, electric light controller 40, power conditioning and monitoring circuitry 420, central processing unit or microcontroller 430, memory 440, additional sensors 450, and data bus 460 for providing data and/or control signal interconnections between at least some of the other just-mentioned circuit elements.

Transmit circuitry 60 (which includes previously described optical transmitter or transducer 60 in FIG. 2) is responsible for transmitting signal information from the representative one of wearable transceivers 50 currently being discussed to the receive circuitry 272 of any fixed transceiver(s) 20 that is (are) close enough to establish wireless connection(s) 300 to that transceiver 50. As shown in FIG. 3, transmit circuitry 60 periodically transmits from the representative wearable transceiver 50 currently being discussed signal information such as the unique identifier code of this transceiver; the status of the battery 80 of this transceiver (e.g., how fully charged or discharged that battery is); the on, off, and, if on, the illumination level of light 54 of this transceiver; the level of ambient light detected by this transceiver (e.g., by this transceiver's ambient light sensor 90); and data from any additional sensors 450 of this transceiver. Transmit circuitry 60 can be generally like earlier-described transmit circuitry 274 in any fixed transceiver 20. Thus transmit circuitry 60 includes an output transducer (e.g., optical transmitter 60 in FIG. 2) for actually outputting signal information from the wearable transceiver and broadcasting that output signal information in the desired wireless medium and form for possible reception (via connection(s) 300) by one or more of the fixed transceivers 20 in the system; and transmit circuitry 60 also includes circuitry appropriate for driving that output transducer. Transmit circuit 60 may gather (e.g., via data bus 460) the information to be thus output from other associated components (e.g., power conditioning and monitoring circuitry for battery 80 status, electric light controller 410 for electric light 54 status, buttons/user input devices 64/66/84 for unique identifier information, and ambient light sensor 90 for ambient light level information). Alternatively, some or all of this information may be gathered by central processing unit or microcontroller 430 and then passed on to transmit circuitry 60 by element 430, possibly with some intermediate processing by element 430. Again, data bus 460 is typically used for communication of data and control signals among the various circuit element that are connected to it.

Receive circuitry 62 in the representative wearable transceiver 50 that is currently being discussed may be generally like the earlier-described receive circuitry 272 in the typical fixed transceiver 20. Thus receive circuitry 62 typically includes an input transducer (e.g., optical receiver 62 in FIG. 2) for receiving signal information via connection(s) 300 in whatever wireless medium and form is being used for such connections (e.g., optically, acoustically, by radio, etc.). In addition, receive circuitry 62 also typically includes circuitry for converting output signals of the just-mentioned input transducer to electronic signals suitable for use by other components of the representative transceiver 50 currently being discussed (e.g., the central processing unit or microcontroller 430 of that wearable transceiver). The types of signal information the receive circuitry 62 receives will be apparent from the earlier discussion of the various possible outputs of transmit circuitry 274 in a typical fixed transceiver 20. Thus, for example, receive circuitry 62 may receive from the transmit circuitry 274 of a nearby fixed transceiver 20 command signal information regarding whether the light 54 associated with that circuitry 62 should be turned on or off, and if on, then to what brightness level. Depending on how the wearable transceiver 50 circuitry is programmed and/or configured, this command information may be applied directly to electric light controller 40 for appropriate control of light 54; or this command information may first go to CPU or microcontroller 430, which then sends further appropriate data and/or control signals to light controller 410. This discussion is exemplary of how any wearable transceiver 50 in the system may handle and respond to any signal information it receives via a connection 300 and its receive circuitry 62.

Electric light controller circuitry 40 may use the value(s) of one or more data signals on bus 460 (e.g., from CPU or microcontroller 430, or from receive circuitry 62) to control the illumination level (brightness) of electric light 54. Such illumination level possibilities typically include the option of turning light 54 off completely.

Power conditioning and monitoring circuitry 420 typically includes circuitry for ensuring that battery 80 outputs voltage(s) and current(s) appropriate for satisfactory operation of other circuit elements of the representative wearable transceiver 50 currently being discussed. In addition, circuitry 420 may also output data indicative of how satisfactory such voltage(s) and current(s) are, and/or the level of charge remaining in battery 80. Circuitry 420 may apply such battery performance or status data to transmit circuitry 60 via bus 460. Or such data from circuitry 420 may first go (via bus 460) to CPU or microcontroller 430 for some initial processing, and then (again via bus 460) to transmit circuitry 60. This discussion of data flow from circuitry 420 is exemplary of how data/information may flow from other components of the representative wearable transceiver currently being discussed (e.g., from button/user input devices 64/66/84, from ambient light sensor 90, and/or from additional sensors 450).

Central processing unit ("CPU") or microcontroller 430 may be generally similar to earlier-discussed and similarly-named element 260 in a typical fixed transceiver 20. By the same token, memory circuitry 440 may be generally similar to earlier-described memory 230 in a typical fixed transceiver 20. Thus, for example, CPU or microcontroller 430 may use the associated memory 440 in the same general ways that similarly named elements 260 and 230 work together. It will therefore be understood that the earlier discussion of elements 260 and 230 applies again in general terms to elements 430 and 440. As a partial reminder of what was said earlier for those other generally similar elements, CPU or microcontroller 430 may be programmed and/or configured to control various operations of the associated circuitry (e.g., when associated transmit circuitry 60 will "periodically" transmit the signal information it should transmit, as well as specifying some or all of that transmitted information). The programming and/or configuration of CPU or microcontroller 430 may also enable component 430 to process signal information from other associated components such as 62, 420, 90, 64/66/84, and 450. Still further, this programming and/or configuration of component 430 may enable that component to process and output signal information (data and/or control) for use by or control of other associated components such as 60, 410, and 72. Memory 440 may be used to support various operations of component 430 (e.g., by storing at least some aspects of the programming or configuration of component 430). Memory 440 may also be used for storing various selectable characteristics of the associated wearable transceiver 50 (e.g., the unique identifier of that transceiver, various settings for operational control of other components, etc.).

Turning now to the details of the central electronic system 100 that are shown in FIG. 3, that system includes circuitry 500 for communication with fixed transceivers 20, transceiver circuitry 610 for communication with speleothem sensors 30, transceiver circuitry 620 for communication with sensors for detecting the presence of and direction of flow of users, transceiver circuitry 630 for communication with additional electronic devices such as computer 150, central processing unit or microcontroller 640, displays 110, controls 650, and outbound power conditioning circuitry 660.

Above-mentioned circuitry 500 for communication with fixed transceivers 20 includes, in turn, transmit circuitry 510 and receive circuitry 520. FIG. 3 shows that all of the fixed transceivers 20 in the system have wired or wireless connections 310 to circuitry 500. More particularly, FIG. 3 shows that these connections 310 allow the central transmit circuitry 510 to send electronic signal information to the receive circuitry 282 of each fixed transceiver 20, and additionally to allow the central receive circuitry 520 to receive signal information from the transmit circuitry 284 of each fixed transceiver 20. FIG. 3 further shows that the kinds of signal information that central transmit circuitry 510 may thus send to fixed transceivers 20 can include such information as the unique identifier(s) of one or more of the fixed transceivers 20 that central electronic system currently wishes to transmit to, a request signal for requesting information from the fixed transceiver(s) 20 thus addressed by means of the just-mentioned unique identifier(s), signals for controlling various settings of the fixed transceiver(s) 20 addressed by means of the just-mentioned unique identifier(s), and signals for controlling various settings of wearable transceivers 50 that are currently or may eventually be in communication with the fixed transceiver(s) addressed by the last-mentioned unique identifier(s). As an example of the types of signal information transmit circuitry 510 may transmit to one or more fixed transceivers 20, such information may request those fixed transceivers to send back the unique identifiers of all wearable transceivers 50 that are currently within communication range of each of those fixed transceivers 20. As another example of the types of signal information that transmit circuitry may transmit to one or more fixed transceivers 20, that signal information may instruct such a fixed transceiver 20 to relay to a wearable transceiver 50 that is currently in communication with that fixed transceiver an instruction to change the level of the light 54 of the identified wearable transceiver 50.

Further with regard to central receive circuitry 520, that circuitry receives signal information sent (via wired or wireless links 310) from the transmit circuitry 284 in the various fixed transceivers 20 that form part of the system. The legends in the one representative transmit circuitry 284 that is shown in detail in FIG. 3 identify some of the kinds of signal information that may thus be transmitted from any fixed transceiver transmit circuitry 284 to central receive circuitry 520. For example, such fixed-transceiver-to-central-receiver information may include (1) a unique identifier signal code for the transmitting fixed transceiver (e.g., provided by the identifier dongle 22 of that fixed transceiver), (2) signal information reporting that one or more wearable transceivers 50 has or have been detected in the vicinity or proximity of the transmitting fixed transceiver, (3) the unique identifiers of all such wearable transceivers 50 that have thus been detected near the transmitting fixed transceiver 20, and (4) the current settings of the wearable transceivers 50 thus detected near the transmitting fixed transceiver 20.

As mentioned above, central electronic system 100 also includes transceiver circuitry 610 for communication with speleothem sensors 30 via wired or wireless links 310. As discussed in detail in above-mentioned and incorporated by reference U.S. Pat. No. 8,574,085, artificial cave passage 10 typically includes a variety of artificial cave formations or speleothems (e.g., artificial stalagmites, artificial stalactites, artificial cave bacon, artificial cave popcorn, artificial gypsum flowers, etc.), all of which a human user is supposed to avoid touching or in some cases even approaching too closely.

As in prior U.S. Pat. No. 8,574,085, each such speleothem is equipped with sensors 30 (e.g., displacement or proximity sensors) for producing output signal information when a human user of artificial cave 10 improperly touches or comes too close to the speleothem. (As in U.S. Pat. No. 8,574,085, the term speleothem may also be used herein to include other types of cave artifacts that a human user of artificial cave 10 either should avoid or should interact with in certain ways. Examples of such other cave artifacts may include models of survey markers, paleontological articles, spiders, bats, rodents, salamanders, plant roots, etc. (all of which should generally not be touched) and human litter and trash (which should be touched for purposes of removal). All such additional types of "speleothems" may also be equipped with sensors 30 for detecting appropriate or inappropriate interaction of human users with those "speleothems.") Transceiver circuitry 610 receives electronic signals output by any of the above-described speleothem sensors 30 to indicate that there has been human-user interaction (usually inappropriate and therefore "harmful" interaction) with the speleothem associated with that sensor 30.

Some "speleothems" in artificial cave 10 may be made deliberately interactive. For example, a speaker associated with a "speleothem" may produce an audible warning to a human user who is coming too close to the "speleothem." Or an artificial animal "speleothem" such as an artificial bat or reptile may be equipped to move or make noise when approached too closely by a human user or when the user shines his or her light 54 on the artificial animal. In such cases, transceiver circuitry 610 can be responsible for sending signals back to the electronics of circuitry 30 associated with such "speleothems" to generate sounds and/or motions of or adjacent to those "speleothems."

Also as previously mentioned, central electronic system 100 includes transceiver circuitry 620 for communication with sensors for detecting presence and direction of flow of users through artificial cave passage 10. Any of fixed transceivers 20 can provide signal information for assisting in this task. But some fixed transceivers 20 and/or transducers 13/14/15 may be especially important for this function. For example, a transducer or transceiver 20 associated with cave passage entrance 13 may detect whenever a new user enters cave passage 10, and the unique identifier of that user's wearable transceiver 50 may be detected by the fixed transceiver 20 immediately adjacent to entrance 13 to enable transceiver circuitry 620 to record that this new user has just entered the artificial cave. Similarly, a transducer or transceiver 20 associated with "normal" cave passage exit 15 may detect whenever a user leaves cave passage 10 via exit 15. The unique identifier of the exiting user's wearable transceiver 50 may be detected by the fixed transceiver 20 immediately adjacent to exit 15 to enable transceiver circuitry 620 to record that the exiting user is no longer in cave passage 10. Emergency exit 14, a nearby fixed transceiver 20, and transceiver 620 may function similarly to detect and record when a user (identified by that user's wearable transceiver 50) exits cave passage 10 via emergency exit 14. Further discussion of detecting the direction of flow of users is provided later in this specification.

Turning now to central processing unit or microcontroller 640, this element interacts with most of the other components of central electronic system 100 to provide support for and control of those other components, as well as to process and analyze information from those other elements. For example, central processing unit 640 may receive from receive circuitry 520 information about which users (each uniquely identified by his or her wearable transceiver 50) have been detected near which of the fixed transceivers 20 in cave passage 10. If that received signal information warrants that some signal information (e.g., user light-level adjustment information) should be sent back to one or more users, central processing unit 640 may control transmit circuitry 510 to send such responsive signal information back to the appropriate user via the fixed transceiver 20 which that user has been detected to be near. As another example, central processing unit 640 may receive from transceiver circuitry 610 signal information that a user has undesirably contacted a speleothem in cave passage 10. Central processing unit 640 has also received information via circuitry 500 as to which user(s) is (are) currently near the fixed transceiver 20 that is closest to the speleothem that has been contacted. Accordingly, central processing unit 640 can attribute this undesirable speleothem contact to this user or these users and make a record that this user or these users undesirably contacted this speleothem. (Alternatively, this association and/or recording of speleothem contact with a particular user or users can be performed by other circuitry (i.e., computer 150) upstream from central processing unit 640.)

As yet another example of the functioning and operation of central processing unit 640, this element may control transceiver circuitry 610 to send signals back to other components in the vicinity of a speleothem sensor 30 that has detected undesirable interaction with a speleothem for such purposes as causing an audible warning to any nearby user or to cause other feedback to the user (e.g., motion of an artificial bat, salamander, or the like).

Central processing unit 640 may also interact with transceiver circuitry 620 for compiling and maintaining a record of what users are currently in passage 10 and/or in what direction each user is moving in the passage. (Alternatively, this type of information may be compiled and maintained by other circuitry (i.e., computer 150) upstream from central processing unit 640.)

Still another function of central processing unit 640 is to communicate with computer 150 via transceiver circuitry 630. Central processing unit 640 may also be responsive to local controls 650. For example, such local controls may enable the operator of the system to effectively disable a speleothem sensor 30 that seems to be malfunctioning, to change the sensitivity of a speleothem sensor, etc. Central processing unit 640 may also control various local displays 110. For example, such local displays may indicate (e.g., alphanumerically) which user has just had an inappropriate ("harmful") interaction with which speleothem.

A final element of central electronic system 100 is outbound power conditioning circuitry 660. This component helps to ensure that all elements throughout the system that receive electrical power by direct wiring receive appropriate and safe electrical currents and voltages at all times.

Computer 150 may provide overall control of certain aspects of the system, as well as accumulating and reporting data that results from various aspects of operation and use of the system. For example, computer 150 may include a human-readable output device such as a computer or video monitor for displaying data about user interactions with various speleothems (e.g., a list of all speleothems that a particular user has inappropriately ("harmfully") interacted with as that used passes through passage 10). It will be apparent from earlier discussion herein how the system may collect such data and forward it on to computer 150 for organization and output (e.g., display) by that computer and peripheral devices of that computer. As another example, computer 150 may use data collected by the system regarding the current location of each user in passage 10 to visually or graphically display the current location of each user on a displayed replica of passage 10. Again, it will be apparent how information collected by each fixed transceiver 20 about the identities of the user(s) near that fixed transceiver is communicated through the system to computer 150 so that computer 150 can organize and display that information. (As has already been said at several places above, users are identified by unique identifiers output by each user's wearable transceiver 50.)

Another function that computer 150 may perform is to control various settings used by other components or elements of the system. An example of such settings may be the sensitivities of various speleothems to approach to or contact of the speleothem by users of the system. As another example, entrance 13 may be barred by signals from computer 150 if the computer detects that there are already too many users in passage 10.

Still another function that computer 150 may perform is to analyze, store in memory, and report (e.g., via an output display) various aspects of the performance of various users. For example, a user's performance in one session in passage 10 may be compared to that user's performance in another session in the passage. For such purposes, user performance may be based on such things as the length of time the user needed to get all the way through passage 10 and/or the number of inappropriate speleothem contacts the user made while passing through the passage. As another example, computer 150 may be able to output comparisons of the performance of different users.

As has already been mentioned, in some embodiments it may be desirable to determine the direction of travel of users who are currently in passage 10. Additional discussion of examples as to how this may be accomplished in accordance with the invention will now be provided.

Figure 5:
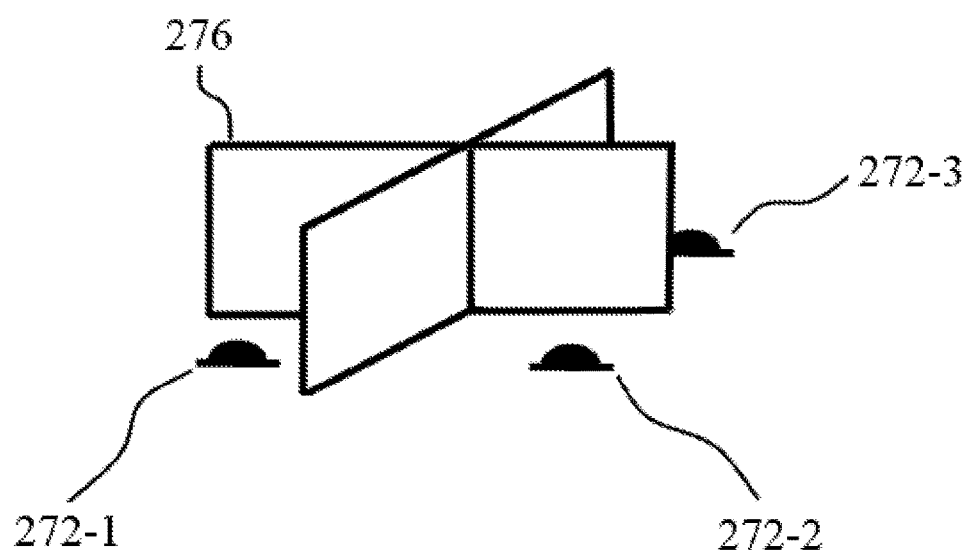
FIG. 5 is a simplified isometric view of an illustrative embodiment of a group of electronic sensors for detection of flow of users through a cave obstacle course in accordance with certain possible aspects of the present invention.

The representative fixed transceiver 20 show in detail in FIG. 3 can detect the direction of travel of a user in any of various suitable ways. In one embodiment, each fixed transceiver 20 contains multiple instances of receive circuitry 272. As shown in FIG. 5, each instance of receive circuitry 272 is separated from the others by a material 276 which is opaque to the transmission medium in such a way that each instance of receive circuitry 272 has a detection area which is spatially unique from the detection areas of the other instances of receive circuitry 272 within the given fixed transceiver 20. In other words, the instances of receive circuitry 272 are isolated from one another by material 276 such that wireless data from any given wearable transceiver 50 is incident upon at most one of the instances of receive circuitry 272 at any given time. As the wearable transceiver is carried by the user through the passage, the wireless signal will be incident upon one of the instances of receive circuitry 272 in a given fixed transceiver 20 before it is incident upon the other instances of receive circuitry 272 within that same fixed transceiver. By determining which instance of receive circuitry 272 detected a given wearable transceiver first, the central processing unit 260 within the given fixed transceiver can determine from whence the user came, and therefore in which direction that user is traveling. In addition to detecting which instance of receive circuitry 272 first detected a given wearable transceiver 50, the central processing unit 260 can also determine which instance of receive circuitry 272 was the last instance to detect a given wearable transceiver 50 prior to the wearable transceiver moving out of range of all receivers 272 within a given fixed transceiver 20, which allows the central processing unit to provide more accurate direction-of-travel information.

Figure 6:
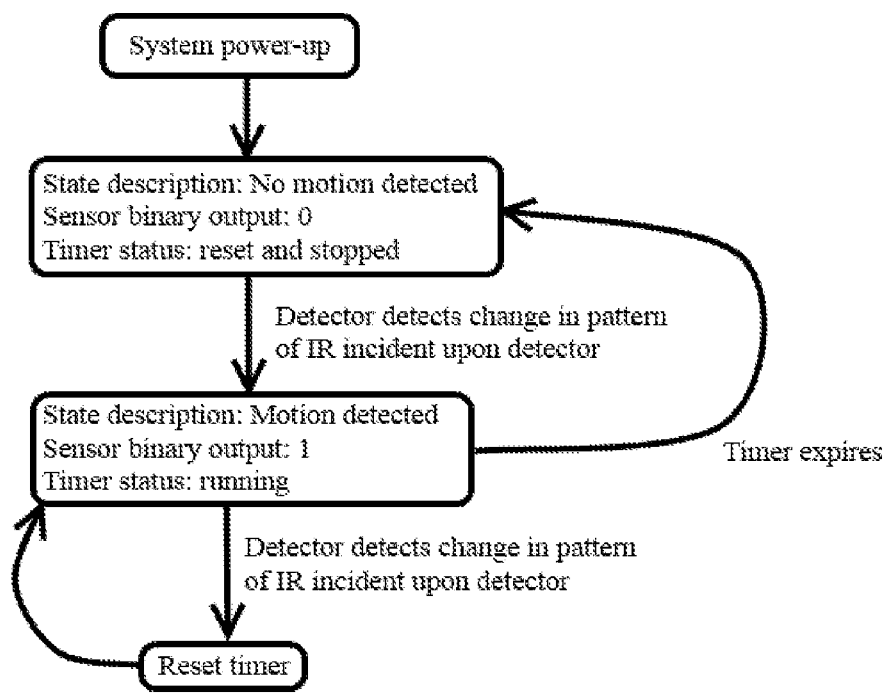
FIG. 6 is a state diagram of an illustrative embodiment of logic for detection of flow of users through a cave obstacle course in accordance with certain possible aspects of the present invention.

In another embodiment, direction of travel by users is detected with dedicated sensors 250, shown in FIG. 3. Two or more pyroelectric infrared (PIR) detectors can be used for this purpose. Each PIR detector produces a binary output, the state of which is directly correlated to the presence or absence of recent change in the amount of infrared (IR) energy incident upon the detector. Each PIR detector is associated with a timer. As shown by the state diagram in FIG. 6, when humans (acting as heat sources detectable by the PIR detectors) traveling through the cave passage move within range of a PIR detector, the detector detects a change in the amount of IR energy incident on the detector. When this detection occurs, the PIR detector output changes state and the timer associated with the particular PIR detector is reset and started. Each time that further motion of heat sources is detected, the timer is reset and started. If sufficient time passes without motion being detected, the timer will expire, and the detector's binary output will change state again to indicate that no recent motion has been detected. The two or more PIR detectors associated with a given fixed receiver 20 are arranged in such a way that the detection range of each PIR detector is mutually exclusive from the detection range(s) of the other detector(s). A representative arrangement is the same as the arrangement of receivers 272 shown in FIG. 5. By inspecting the binary output of all PIR detectors associated with a given fixed transceiver 20, a particular fixed transceiver can determine in which order the multiple PIR detectors saw movement, and the fixed transceiver can infer the direction of travel of human users within the passage.

Figure 4:
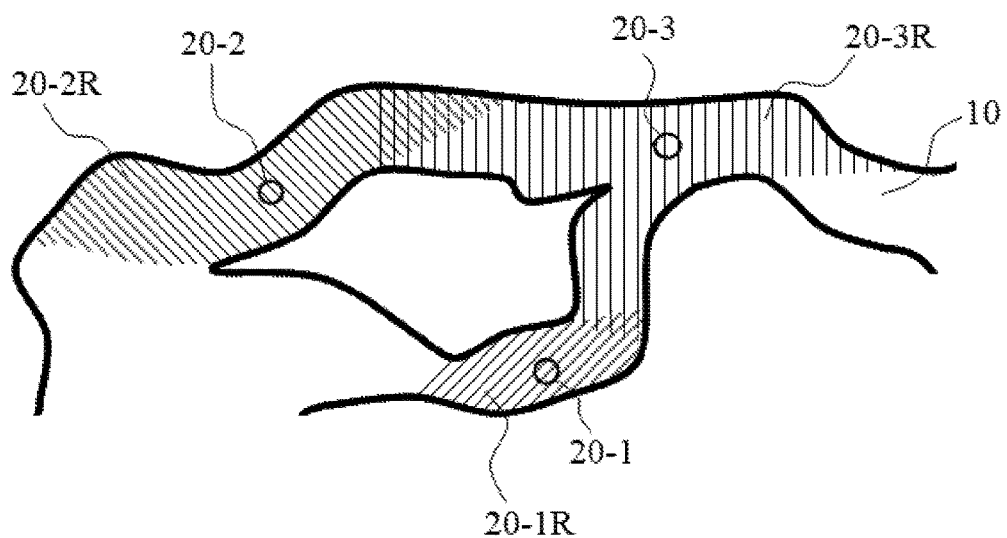
FIG. 4 is an enlargement of a representative portion of FIG. 1 with some shading added to further illustrate certain possible aspects of the invention.

In some respects recapitulating and amplifying the foregoing, certain aspects of the invention relate to an artificial cave obstacle course system as shown, for example, in FIGS. 1-3. Such a system may include an artificial cave passage 10. The system may also include a plurality of wearable transmitters (e.g., 50, 60). Each wearable transmitter can be worn by a respective one of a plurality of human users passing through passage 10. There can be more than one such user in passage 10 at any given time. Each of the wearable transmitters 50, 60 may broadcast a respective one of a plurality of unique user identification codes (e.g., provided by the transmit circuitry 60 of the transmitter). The system may further include a plurality of fixed receivers 20, 272 spaced from one another throughout passage 10. Each fixed receiver 20, 272 may have a respective broadcast signal reception area in a portion of passage 10 that is adjacent to that fixed receiver. For example, FIG. 4 shows a representative portion of passage 10 from FIG. 1 with three representative fixed receivers 20 from FIG. 1 now numbered 20-1, 20-2, and 20-3 for greater particularity. The broadcast signal reception area of fixed transceiver 20-1 is indicated by the cross hatched area 20-1R. Differently cross hatched area 20-2R indicates the broadcast signal reception area of fixed receiver 20-2. The still further differently cross hatched area 20-3R indicates the broadcast signal reception area of fixed receiver 20-3. It will be evident that each of these broadcast signal reception areas is approximately the line-of-sight area within passage 10 from the respective fixed receiver 20. This is consistent with use of line-of-sight wireless communication to each fixed receiver. The walls, floor, and ceiling of passage 10 bound line-of-sight signaling areas inside the passage. Infrared signal communication is an example of such basically line-of-sight communication that can be used; but there can be other relatively short-haul communication techniques that similarly allow subdivision of passage 10 into a number of relatively small broadcast signal reception areas, one area per receiver. Examples of such other techniques may include low-power ultrasonic signaling, low-power radio signaling, and the like. There may be some overlap between the broadcast signal reception areas of the various receivers 20 in passage 10, but there is also preferably some non-overlap among these areas. It is preferable for the broadcast signal reception areas of all of receivers 20 to collectively cover all or at least most of passage 10.

In embodiments like those here being recapitulated or described, each fixed receiver 20, 272 is able to receive the user identification signal broadcast by any of the wearable transmitters 50, 60 that are currently within the broadcast signal reception area (e.g., 20-1R, 20-2R 20-3R, etc.) of that fixed receiver. Preferably, each fixed receiver 20, 272 is not able to receive signals broadcast by any of the wearable transmitters 50, 60 that are not currently within the broadcast signal reception area of that fixed receiver, e.g., wearable transmitters 50, 60 that are in other portions of passage 10 outside the broadcast signal reception area of that fixed receiver. In such embodiments the system further includes circuitry (e.g., 260, 250, 220, 230, 280, 100, 150) for collecting from each fixed receiver 20, 272 signal information identifying the wearable transmitters 50, 60 from which that fixed receiver is currently receiving user identification signals.

Consistent with the foregoing objective of having each fixed receiver 20, 272 able to receive signals broadcast by only those wearable transmitters 50, 60 that are currently in the relatively small or limited broadcast signal reception area adjacent to that fixed receiver, wearable transmitters 50, 60 also employ relatively low-power and/or line-of-sight signal broadcasting. Once again, examples of such line-of-sight and/or low-power transmitter 50, 60 broadcasting include infrared signals, low-power acoustic signals, low-power radio signals, etc.

In embodiments such as are currently being discussed the system may further include a plurality of artificial speleothems 30 spaced from one another throughout passage 10. Each speleothem 30 is preferably disposed in passage 10 so that it is possible for a user to pass that speleothem without causing harm to that speleothem if that speleothem were a real speleothem in a real cave. However, each speleothem 30 is also preferably disposed in passage 10 so that it is alternatively possible for a user to interact with the speleothem in a way that would be harmful to a real speleothem if the user does not exercise sufficient care in passing the speleothem. Such embodiments may also include a plurality of sensors (also designated 30), each of which is associated with a respective one of the artificial speleothems and each of which detects any harmful interaction with the associated speleothem by a user who does not exercise sufficient care in passing the speleothem. (Above-incorporated U.S. Pat. No. 8,574,085 shows many examples of suitable artificial speleothems and sensors for such speleothems.) In such embodiments as are currently being discussed the recently-mentioned circuitry (e.g., 260, 250, 220, 230, 280, 100, 150) for collecting additionally collects (e.g., via components 610) signal information from each of the sensors 30 indicative of that sensor detecting a harmful interaction with the speleothem associated with that sensor.

Further in embodiments such as are currently being discussed, each of the speleothems 30 may be adjacent to a respective one of the fixed receivers 20, 272 so that any user who harmfully interacts with that speleothem is then within the broadcast signal reception area of the fixed receiver 20, 272 adjacent to that speleothem. More particularly, the immediately preceding sentence typically means that each speleothem 30 is in the broadcast signal reception area of the fixed receiver 20, 272 that is "adjacent" to that speleothem.

Still further in embodiments such as are here being discussed, the recently-mentioned circuitry (e.g., 260, 250, 220, 230, 280, 100, 150, 610) for collecting may further include circuitry (e.g., 640) for correlating (a) signal information from each of the sensors 30 indicative of that sensor detecting a harmful interaction with the speleothem 30 associated with that sensor with (b) signal information from the fixed receiver 20, 272 that is adjacent to that speleothem so that any user within the broadcast signal reception area (e.g., 20-1R, 20-2R, 20-3R, etc.) of that fixed receiver is identified as the probable cause of the harmful interaction with the speleothem adjacent to that fixed receiver.

Yet further in embodiments such as are currently being discussed, the circuitry (e.g., 640) for correlating may further include circuitry (e.g., 630, 150) for storing results of the correlating to produce a stored record of each user's probable harmful interactions with the speleothems.

Still further in embodiments such as are currently being discussed, the circuitry (e.g., 640) for correlating may further include circuitry (e.g., 150) for visibly displaying information indicative of the stored record of any user's probable harmful interactions with the speleothems.

Another feature that the embodiments currently being recapitulated may relate to involves monitoring the entrance 13 through which users enter passage 10. In accordance with this feature a first of the fixed receivers 20, 272 (e.g., the fixed receiver 20 that is just inside entrance 13 in FIG. 1) is located adjacent entrance 13 so that each user entering passage 10 passes through the broadcast signal reception area of said first fixed receiver. (Although the broadcast signal reception area of this first fixed receiver 20 is not expressly depicted in FIG. 1, it will be apparent from the typical examples of other broadcast signal reception areas shown in FIG. 4 and discussed above in connection with that FIG. that any person entering passage 10 through entrance 13 would have to pass through the broadcast signal reception area of the first fixed receiver that is just inside entrance 13.) Further in accordance with the feature currently being discussed, the recently mentioned circuitry (e.g., 260, 250, 220, 230, 280, 100, 150) for collecting includes circuitry for collecting from said first fixed receiver 20 signal information identifying the wearable transmitter 50, 60 of each user who enters passage 10. A further feature of such embodiments may be circuitry (e.g., 150) for storing the wearable transmitter identifying signal information collected from said first fixed receiver 20 (e.g., the fixed receiver 20 just inside entrance 13 in FIG. 1) in order to produce a stored record of the users who have entered passage 10.

Still another feature that embodiments like those currently being recapitulated may relate to involves monitoring the exit 15 through which users exit passage 10. In accordance with this feature a second fixed receiver 20, 272 (e.g., the fixed receiver 20 that is just inside exit 15 in FIG. 1) is located adjacent exit 15 so that each user exiting the passage passes through the broadcast signal reception area of said second fixed receiver. (Again, although the broadcast signal reception area of this second fixed receiver 20 is not expressly depicted, it will be apparent from the typical examples of areas 20-1R, 20-2R, and 20-3R in FIG. 4 that any person exiting passage 10 via exit 15 will have to pass through the broadcast signal reception area of the second fixed receiver that is just inside exit 15.) Further in accordance with the feature currently being discussed or recapitulated, the recently mentioned circuitry (e.g., 260, 250, 220, 230, 280, 100, 150) for collecting includes circuitry for collecting from said second fixed receiver 20 signal information identifying the wearable transmitter 50, 60 of each user who exits passage 10. If desired, the just-mentioned circuitry for collecting may further include circuitry (e.g., 150) for deleting from any stored record (such as was mentioned earlier) of users who have entered passage 10 the wearable transmitter identifying signal information collected from said second fixed receiver 20 (e.g., the fixed receiver just inside exit 15 in FIG. 1). This has the effect of making the just-mentioned stored record a list of all users who are currently in passage 10.

Embodiments like those most recently discussed or recapitulated are examples of embodiments in which wearable transceivers 50 may only need to have transmitter capability and in which fixed transceivers 20 may only need to have receiver capability. It will be apparent from what has been shown and described elsewhere herein that in other embodiments each of the wearable transmitters 272 may be a component of a respective one of a plurality of wearable transceivers 20, each wearable transceiver also including a respective one of a plurality of wearable receivers 62. In such a case these embodiments may further include fixed transmitter circuitry 20, 274 for broadcasting signals to the wearable receivers 62.

In embodiments such as those recapitulated in the immediately preceding paragraph, each of the wearable receivers 62 may be selectively responsive to received signals that include a respective one of a plurality of different identifier codes. For example, the unique identifier stored in memory 440 as shown in FIG. 3 may be used by central processing unit or microcontroller 430 to render any particular wearable transceiver 50 fully responsive to only signals received via circuitry 62 that include that unique identifier. In this way each wearable transceiver 50 may be individually addressed for purposes of remote control by using that wearable transceiver's individual and unique identifier.

In embodiments such as have just been recapitulated the fixed transmitter circuitry 274 may be configured to broadcast signals that include (a) one of the just-mentioned identifier codes (corresponding to the unique identifier in the memory 440 of one of the wearable transceivers 50) and (b) a command signal (e.g., one or more of the "requests" in transmit circuitry 274 in FIG. 3) for causing the wearable receiver 62 that is selectively responsive to that identifier code to initiate an operation in accordance with that command signal. For example, the operation initiated in response to such a command signal may be a change in the output level of a light 54 worn by the user wearing the wearable receiver 62 that is selectively responsive to that identifier code broadcast with that command signal.

In embodiments such as have just been recapitulated, at least one of the fixed receivers 272 is a component of a fixed transceiver 20 that includes the most recently mentioned fixed transmitter circuitry 274.

In other embodiments of the types that are currently being recapitulated, each of at least a subplurality of the fixed receivers 272 is a component of a respective one of at least a subplurality of fixed transceivers 20, and each of at least said subplurality of said fixed transceivers 20 includes a replication of said most recently mentioned fixed transmitter circuitry 274.

Recapitulating certain other aspects of the foregoing, an artificial cave obstacle course system in accordance with various embodiments of the invention may include an artificial cave passage 10 having an entrance 13 through which a human user can enter the passage. The system may further include receiver apparatus 62 worn by a user while in passage 10. The receiver apparatus may include a light 54 that can be turned on while the user is in passage 10 to help the user see inside the passage. The system may include a detector (e.g., the instance of component 20 (and especially its subcomponents 272, etc.) that is closest to entrance 13 in FIG. 1) for detecting that a user is entering passage 10 via entrance 13. The system may still further include transmitter apparatus (e.g., the instance of component 274 that is in the just-mentioned instance of component 20) responsive to the detector for wirelessly signaling the receiver apparatus 62 to turn on the light 54 of the receiver apparatus worn by the user entering the passage.

In embodiments such as have just been recapitulated, passage 10 may additionally have an exit 15 through which a human user can exit the passage. The system may then have a second detector (e.g., the instance of component 20 that is just inside exit 15 in FIG. 1, and especially the subcomponent 272 and related elements of that component 20) for detecting that a user is exiting passage 10 via the exit. The last-mentioned transmitter apparatus (e.g., the last-mentioned instance of component 274 and related elements) may then be additionally responsive to the second detector for wirelessly signalling the receiver apparatus 62 to turn off the light 54 of the receiver apparatus worn by the user exiting passage 10.

Recapitulating certain still other aspects of the foregoing, an artificial cave obstacle course system in accordance with various other embodiments of the invention may include an artificial cave passage 10 have an entrance 13 through which human users can enter the passage. The system may further include a plurality of wearable transceivers 50, each of which can be worn by a respective one of a plurality of users while in passage 10. Each of the wearable transceivers 50 may have a respective one of a plurality of different user identification codes (e.g., the unique identifier stored in the memory 440 of the wearable transceiver) associated with it. Each wearable transceiver 50 may wirelessly broadcast (e.g., as shown by wireless communication links 300) signals that include the user identification code associated with that wearable transceiver. Each wearable transceiver 50 may further be selectively responsive to received signals that include the user identification code associated with that wearable transceiver. The system may still further include detector apparatus (e.g., the instance of component 20 that is just inside entrance 13) for detecting that a user is entering passage 10 via entrance 13, the detector apparatus using the user identification code wirelessly broadcast by the wearable transceiver 50 worn by that user to wirelessly transmit back to that wearable transceiver signals that include that user identification code and an instruction to turn on the light 54 of that wearable transceiver.

In embodiments such as have just been recapitulated, passage 10 may also have an exit 15 through which human users can exit the passage. The system may then further include second detector apparatus (e.g., the instance of component 20 that is just inside exit 15) for detecting that a user is exiting the passage via exit 15. The second detector apparatus may use the user identification code wirelessly broadcast by the wearable transceiver 50 worn by that user to wirelessly transmit back to that wearable transceiver signals that include that user identification code and an instruction to turn off the light 54 of that wearable transceiver.

Recapitulating yet other aspects of the foregoing, an artificial cave obstacle course system in accordance with yet other possible embodiments of the invention includes an artificial cave passage 10. The system may further include a plurality of wearable transceivers 50, each of which can be worn by a respective one of a plurality of human users passing through passage 10, each wearable transceiver broadcasting (e.g., via wireless links 300) a respective one of a plurality of unique user identification signals (e.g., the unique user identifier in the memory 440 of that wearable transceiver). The system may still further include a plurality of fixed transceivers 20 spaced throughout passage 10. Each fixed transceiver 20 has a respective broadcast signal reception area (e.g., 20-1R, 20-2R, 20-3R, etc.) in a portion of the passage 10 that is adjacent to that fixed transceiver. Each fixed transceiver 20 is preferably able to receive the user identification signal broadcast by any of the wearable transceivers 50 that are currently within the broadcast signal reception area of that fixed transceiver. The system may yet further include circuitry (e.g., 100, 150) for collecting from each fixed transceiver 20 the signal information identifying the wearable transceivers 50 from which that fixed transceiver is currently receiving user identification signals.

Any of the systems described and/or recapitulated above may also include components (e.g., FIG. 5, FIG. 6, 250, 284, 13/14/15/20, 620) for detecting the direction of travel of a user in passage 10.

It will be understood that the foregoing is only illustrative of the principles of the invention, and that various modifications can be made by those skilled in the art without departing from the scope and spirit of the invention. For example, various methods of operating artificial cave obstacle course systems such as are described in detail above are within the scope of this invention. Just a few representative illustrations of such methods are provided in the next several paragraphs.

An example of methods of operating an artificial cave obstacle course system in accordance with certain possible aspects of the invention includes automatically detecting when a user enters the obstacle course and automatically turning on a light worn by the user who has thus been detected entering the obstacle course. Such a method may further include automatically detecting when a user exits the obstacle course and automatically turning off the light of the user who has thus been detected exiting the obstacle course.

Another example of methods of operating an artificial cave obstacle course system in accordance with certain possible aspects of the invention includes automatically detecting the direction of travel of a user in the obstacle course.

Still another example of methods of operating an artificial cave obstacle course system in accordance with certain possible aspects of the invention includes automatically detecting the identity of each user who enters the obstacle course. Such a method may further include automatically detecting the identity of each user who exits the obstacle course.

Yet another example of methods of operating an artificial cave obstacle course system in accordance with certain possible aspects of the invention includes automatically detecting the identity of each user who is currently in any one of a plurality of areas that are spaced throughout the obstacle course. Such a method may further include automatically detecting any user interaction with an artificial speleothem that is in any of said areas. Such a method may still further include automatically identifying a user who is currently in any one of said areas as the user probably responsible for any concurrent user interaction with the artificial speleothem in that area.

Other possible aspects of the invention relate to monitoring user and/or operator presence and/or activity in and/or near the artificial cave for such purposes as at least discouraging too many users from being present in the cave at any one time (e.g., by alerting prospective users not to enter the cave when the number of users already in the cave reaches a predetermined desired maximum number) and/or automatically turning off, powering down, or rendering dormant various electronic components of the cave system, e.g., when there has not been human presence and/or activity associated with the cave for at least a predetermined interval of time. Terms that are sometimes used herein to refer to monitoring or detecting the presence and/or activity or motion of a human include "human detection," "human detector," "means for detecting a human," "detecting a human," and the like. "Detecting the presence of a human" or the like as used herein means detecting the human without regard for whether the human is moving or has recently moved. "Detecting human motion" or the like as used herein means detecting the human by sensing present or recent motion or physical activity (typically gross or externally perceptible movements) of the human. Thus "human detection" or the like is generic to (1) "human presence detection" or the like and (2) "human motion detection" or the like.

Figure 7:
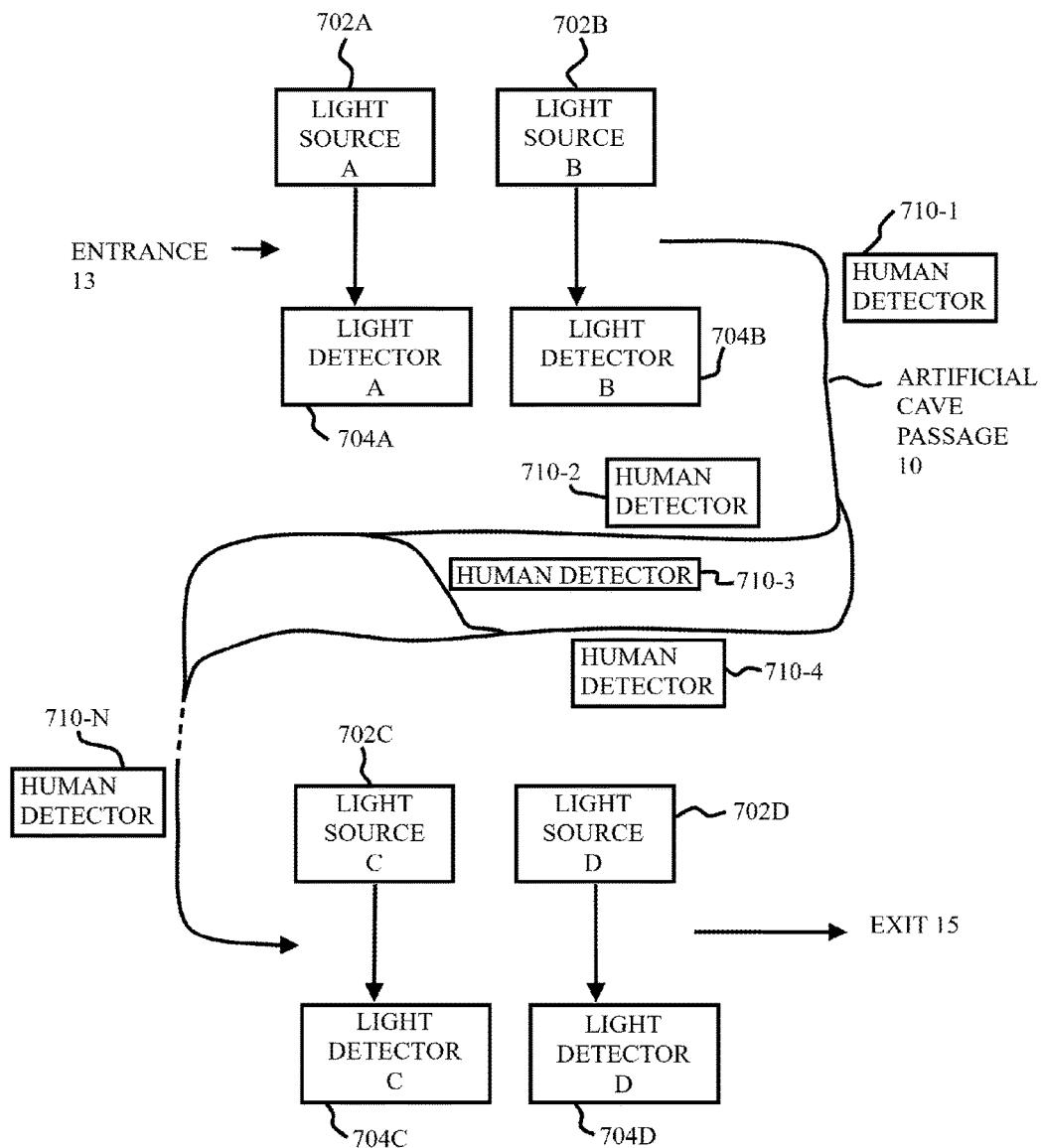
FIG. 7 is a simplified schematic block diagram showing an illustrative embodiment of certain further possible features in accordance with the invention.
Figure 8:
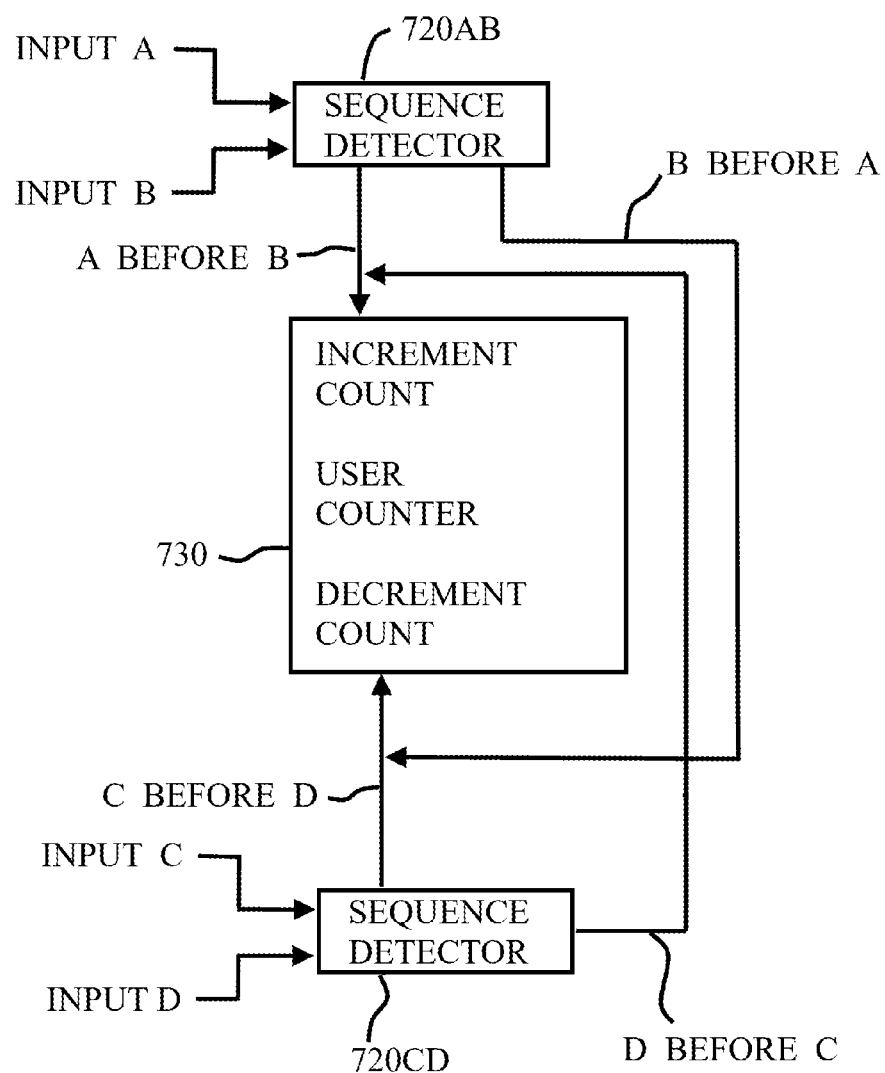
FIG. 8 is a simplified schematic block diagram showing an illustrative embodiment of how some signals produced by elements of the type shown in FIG. 7 may be used in accordance with further possible features of the invention.

FIGS. 7 and 8 show illustrative ways in which the number of users in artificial cave passage 10 may be monitored to keep track of the number of users currently in the passage. FIG. 7 shows two break-beam user sensors at or near representative cave entrance 13. The first of these sensors includes light source A (702A) and light detector A (704A). Detector 704A normally receives light from source 702A. However, when a user begins to enter cave passage 10 via entrance 13, the user must first pass between elements 702A and 704A, thereby interrupting the reception of light by detector 704A. This causes detector 704A to produce an output signal that is identified as "input A" in FIG. 8. Similarly, detector 704B normally receives light from source 702B. But an entering user who has first interrupted the 702A to 704A light path must subsequently pass between elements 702B and 704B, thereby interrupting the reception of light by detector 704B. This causes detector 704B to produce an output signal that is identified as "input B" in FIG. 8.

FIG. 8 shows inputs A and B applied to sequence detector 720AB. This sequence detector circuitry determines whether input A was received before input B (or, alternatively, whether input B was received before input A). If input A was received first, sequence detector 720AB outputs an "A before B" signal, which causes user counter circuitry 730 to increment (increase) its user count by 1 to indicate that a new user has entered artificial cave passage 10. On the other hand, if sequence detector 720AB detects that it has received input B before input A, detector 720AB outputs a "B before A" signal. This causes user counter circuitry 730 to decrement (decrease) its user count by 1 to indicate that a user previously in cave passage 10 has exited via entrance 13.

Returning to FIG. 7, this FIG. shows two more break-beam user sensors at or near the exit 15 from cave passage 10. The first of these user sensors includes light source C (702C) and light detector C (704C). The second of these sensors includes respectively similar elements 702D and 704D. A user exiting the cave via exit 15 must first break the light beam between elements 702C and 704C, and must thereafter break the light beam between elements 702D and 704D. When the 702C to 704C light beam is broken by a user, detector 704C produces the output signal identified as "input C" in FIG. 8. Similarly, when the 702D to 704D light beam is broken by a user, detector 704D produces the output signal identified as "input D" in FIG. 8.

As shown in FIG. 8, inputs C and D are applied to sequence detector circuitry 720CD. This circuitry detects which of its two inputs was received first. If input C preceded input D, detector 720CD produces a "C before D" output signal, which causes user counter 730 to decrement its user count by 1 to indicate that a user previously in the cave has now exited the cave via exit 15. On the other hand, if input D preceded input C, detector 720CD produces a "D before C" output, which causes user counter 730 to increment its user count to indicate that a new user has entered artificial cave passage 10 via exit 15.

It will be apparent from the foregoing discussion that although nominally an "entrance", entrance 13 can function generically as either a user entrance or a user exit with the benefit of circuitry of the type shown in FIGS. 7 and 8. Similarly, the FIGS. 7 and 8 circuitry allows "exit 15" to function generically as either a user exit or a user entrance. In other words, the FIGS. 7 and 8 circuitry allows user counter 730 to maintain an accurate, current count of all users who are currently in artificial cave passage 10, regardless of whether any particular user entered via a nominal "entrance 13" or a nominal "exit 15", as well as whether any particular user exited via a nominal "exit 15" or a nominal "entrance 13". Similarly, it will be apparent that artificial cave passage 10 can have any number of other entrances and/or exits (e.g., emergency egress 14 in FIG. 1). Each such other entrance/exit can be equipped with two further break-beam user sensors (like 702A, 704A, 702B, and 704B in FIG. 7). The outputs of those further break-beam sensors can be applied to further sequence detector circuitry like 720AB in FIG. 8. And the outputs of any such further sequence detector circuitry can be used as additional increment/decrement inputs to user counter 730 in FIG. 8. In this way the system can monitor all entrances to and/or exits from artificial cave passage 10 and user counter 730 can determine and maintain an accurate count of the number of users who are present in artificial cave passage at any given time.

Because (as has just been discussed) one or more nominal entrances to and/or exits from the cave passageway 10 may at least sometimes be used for user flow opposite to the "normal" or nominal user flow direction, the term "port" will sometimes be used herein as a generic term for any location along the artificial cave passageway via which a user may (1) enter, (2) exit, or (3) either enter or exit the passageway.

Users entering and/or leaving artificial cave passage 10 can be detected and thereby counted to produce the above-described current user count value by means other than the above-described pairs of break-beam sensors (e.g., 702-704A, B, C, or D shown in FIG. 7). For example, turnstiles that produce an output signal pulse for each user passing through the turnstile can be used. Such turnstiles can be bi-directional, i.e., producing an "increment user count" output signal when operated in one direction (the user-entering direction) and producing a "decrement user count" output signal when operated in the opposite direction (the user-exiting direction). Another example of possible alternatives to pairs of break-beam sensors is a pair or array of pyroelectric infrared (PIR) detectors as shown and described earlier in this specification that can detect both the presence and direction of travel of a user.

Another way of characterizing the above-described user count parameter is as a "net" count of the users. In other words, at any given time the above-described user count parameter registered in user counter circuitry 730 has a net value which is effectively the number of users who have entered cave passage 10 up to that time minus the number of users who have exited the cave passage up to that time.

It will be understood that FIG. 7 shows the actual passage 10 of the artificial cave structure and system only very simply and schematically, and without repeating many of the associated elements that are shown more fully, for example, in earlier FIGS. such as FIG. 1, FIG. 4, FIG. 5, and so on. It will be appreciated, however, that what is shown in FIG. 7 is intended for use with any or all of the artificial cave structures and/or artificial cave system features shown in these other FIGS. and described elsewhere in this specification.

Figure 9:
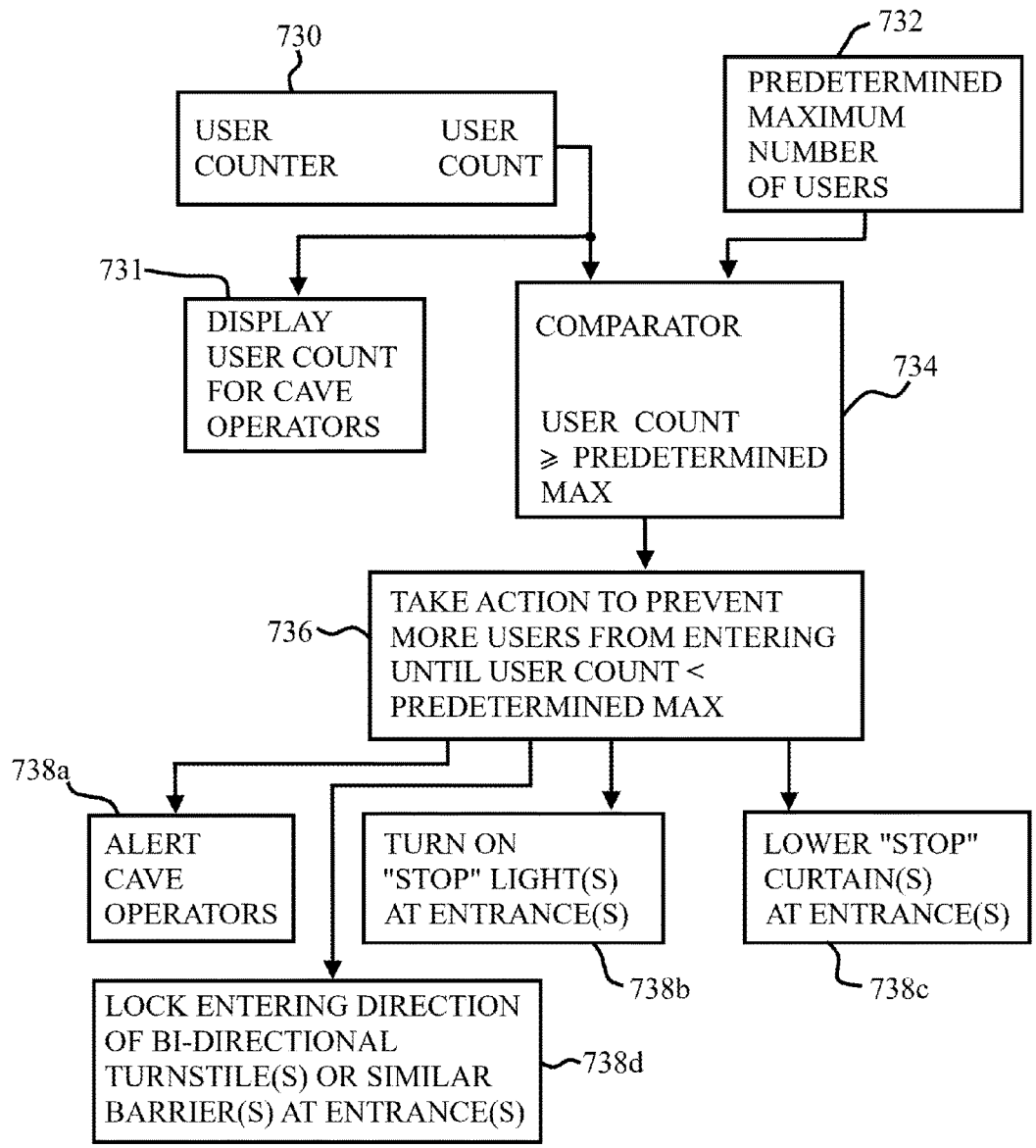
FIG. 9 is another simplified schematic block diagram showing still further development of use of elements like those shown in FIGS. 7 and 8 in accordance with still further possible features of the invention.

FIG. 9 shows several examples of how the above-determined count of users currently in artificial cave passage 10 can be used in accordance with various further principles of the invention. As shown in FIG. 9 a "user count" output signal of user counter circuitry 730 (as in FIG. 8) is applied to comparator circuitry 734. (This "user count" signal is indicative of the current value of the above-described user count parameter registered in circuitry 730.) Another input to comparator circuitry 734 is the output signal of circuitry 732, which indicates a predetermined maximum desired number of users who should be in the cave at any one time. This maximum number may be selected and stored in circuitry 732 when the system is first set up, or it may be a number that can be changed from time to time by the operators of the system. Although this number could be 1 for a relatively small artificial cave, preferably the cave is large enough to accommodate multiple users at any given time, in which case the predetermined maximum number output by circuitry 732 is set to a suitable number greater than 1.

Comparator circuitry 734 performs an on-going comparison between the actual current user count output by user counter 730 and the maximum desired number of simultaneous users output by circuitry 732. Any time that circuitry 734 detects that the actual current user count equals or exceeds the desired maximum number of simultaneous users, circuitry 734 produces a "user count greater than or equal to predetermined max" output signal. This signal is applied to circuitry 736 for taking action appropriate to preventing more users from entering artificial cave passage 10 until comparator 734 subsequently indicates that the actual current user count has fallen below (become less than) the predetermined desired maximum number of simultaneous users of the cave.

Because enforcement of the exact value of the predetermined desired maximum number of simultaneous users output by element 732 in FIG. 9 may not be absolutely necessary in all cases, terms like "approximate" may sometimes be used herein to refer to the comparison performed by comparator circuit 734 (and likewise to the condition monitored by element 736).

Below element 736 in FIG. 9, this FIG. shows several examples of actions that can be initiated by circuitry 736 in response to a "user count greater than or equal to predetermined max" output signal from circuitry 734. One such example is circuitry 738*a* for alerting the human operators of the cave system to the fact that user capacity has been reached or exceeded. Circuitry 738*a* may be a computer monitor that may display an appropriate alert message and/or graphic that the system operators can see. Alternatively or in addition, an audio output to the system operators may be generated by a computer that is part of the controls for the system. As an alternative or addition to circuitry 738*a*, circuitry 738*b* may automatically turn on a "stop" light (e.g., a red light like the red light of a traffic signal) at or near each entrance (or each entrance/exit) to artificial cave passage 10 to tell additional possible users not to enter the cave at this time. As an alternative or addition to such a "stop" light, circuitry 738*c* may lower a "stop" curtain over each entrance (or each entrance/exit) to the cave or otherwise position such a curtain across each entrance (or each entrance/exit) to deter or somewhat obstruct additional users from entering the cave. Such a curtain may bear an explanatory "cave full, do not enter at this time" message readable by prospective additional users. Preferably any such curtain is only a "soft" barrier or obstruction to entry that does not impede users currently in the cave from exiting the cave through or past the curtain.

Still another example of an action that may be taken to prevent more users from entering artificial cave passageway 10 when elements 734-736 detect that the number of users already in the cave is at or greater than the desired maximum number is illustrated by element 738*d* in FIG. 9. Element 738*d* illustrates a representative turnstile or similar barrier at a representative entrance 13 to or exit 15 from the cave. Turnstile 738*d* may normally be operable (turnable) in either of two directions to permit a user to either enter the cave by passing through the turnstile in one direction or to exit the cave by passing through the turnstile in the opposite direction. However, when element 736 signals that no more users should be allowed to enter the cave, that signal from element 736 is applied to turnstile 738*d* to prevent it from turning in the direction that permits any further prospective user of the cave from passing through the turnstile to enter the cave. Users can still exit the cave by passing through turnstile 738*d* in the opposite direction. The turnstile can return to normal, bi-directional operation when elements 734-736 are no longer indicating that the cave is at maximum user capacity.

The above-described possible turnstile feature or embodiment is an example of how "harder" stops or obstructions 738*d* may be provided for more strictly ensuring that the acceptable number of simultaneous users of the cave is never exceeded. Each entrance to or exit from cave passageway 10 (e.g., all of the ports 13, 14, and 15 in FIG. 1) may be "controlled" as described above for representative element 738*d* and/or any other generally similar barrier mechanism having automatically controlled operation like that described for elements 738*d*.

Another example of possible uses of the user count signal output by user counter 730 is illustrated by element 731 in FIG. 9. This example is a display of the current user count value for observation by the human operators of the artificial cave system. Thus display 731 may appear on (or may be) a computer monitor of the system (similar to or the same as the computer monitor for above-described cave operator alert 738*a*). Display 731 thus enables the operator of the system to see the number of users currently in the cave at any time during operation of the cave system.

Still more examples of possible uses of the user count output signal of user counter 730 will be discussed later in this specification in connection with FIG. 12.

Figure 10:
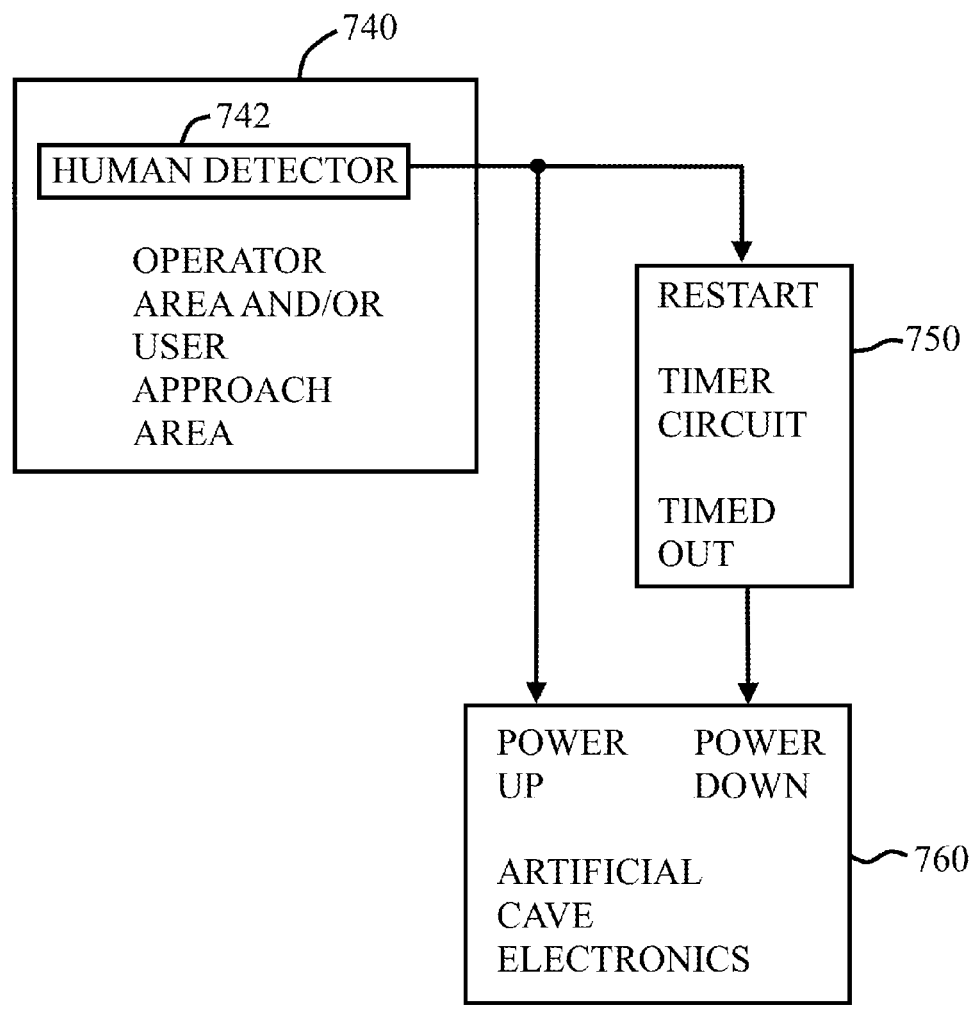
FIG. 10 is a simplified schematic block diagram showing an illustrative embodiment of yet other possible features in accordance with the invention.

FIG. 10 shows an illustrative embodiment of circuitry in accordance with a further possible aspect of the invention for automatically powering down at least portions of the electronic apparatus of the cave system after there has been no human activity associated with the cave for a predetermined relatively long time (e.g., an hour, more or less). Such powering down (analogous to having a computer monitor or computer system go into a relatively low-power "sleep" or "power-saver" mode) can be desirable for a number of reasons. For example, it can reduce overall, average electrical power consumption by the system, thereby lowering its operating cost. It can also help to extend the useful operating life of certain power-consuming circuit elements. Lowering power consumption of the system when it is not in use may also increase the safety of the system, especially while it may not be receiving much (if any) human operator attention.

In the illustrative embodiment shown in FIG. 10 the area at least sometimes occupied by the human operators of the system and/or the area through which potential users of the cave approach the cave to begin to use it (e.g., near cave entrance 13) is an area equipped with one or more sensors or detectors (e.g., 742) for detecting human presence and/or motion in that area or in those areas. "Human presence" may be detected in any of a number of ways. For example, the presence of a human within the detection range of a suitable "human detector" may be detected by the body heat given off by a human Or the presence of a human may change the acoustic characteristics of a given detection area and may therefore be detectable acoustically. A human motion sensor (as in some burglar alarm systems or room light control switches) may be used to detect "human motion." For purposes of this disclosure there is thus a distinction between "human presence detection" or the like and "human motion detection" or the like. As mentioned earlier in this specification, "human detection" or the like is sometimes used herein as a generic term for both "human presence detection" and/or "human motion detection" or the like.

It should be noted that for some purposes herein human detection that at least includes human presence detection may be preferable to human detection that only includes human motion detection. For example human presence detection may be more effective at detecting a person (e.g., a user in cave passageway 10) who has become ill and consequently immobile. On the other hand, human motion detection alone can also be very effective for present purposes.

Still other examples of human detectors usable herein include camera systems, possibly with human image recognition capabilities; audio systems for detecting human breathing, human heartbeats, and/or the human voice; etc. Various alternatives already mentioned, and other alternatives to be mentioned, are further discussed elsewhere in this specification. Thus, for example, PIR detectors, described earlier in this specification, may be used as human detectors, and may be (illustratively) like the motion sensors in some room lighting switches that are used to automatically turn on the lights in a room whenever a person enters the room. Again however, it will be understood that any other suitable type of human presence and/or motion detectors can be substituted for or added to PIR detectors for implementation of human detector 742 in FIG. 10 if desired. The same is true for any other human detector shown and described herein (e.g., human detectors 710-1 through 710-N in FIGS. 7, 11, and 12). Examples of yet other possibly suitable sensors for detecting human presence and/or motion include visible- and/or infrared-light-detecting cameras connected to computers operating face- and/or body-shape recognition software, MEMS thermal sensors, and microphones connected to computers operating human voice recognition software.

Returning again specifically to FIG. 10, whenever human detector 742 detects human presence and/or motion within the detection area(s) covered by the detector, it produces an output signal pulse that is applied to the "restart" input terminal of timer circuit 750. Any such restart pulse causes timer circuit 750 to return to an initial state from which it begins to measure the amount of time that has passed (elapsed) since it was last restarted. Whenever timer circuit 750 reaches a predetermined desired maximum amount of elapsed time since it was last restarted, circuit 750 produces an output signal pulse on its "timed out" output lead.

The "timed out" output signal of timer circuit 750 is applied to the "power down" input terminal of artificial cave electronics 760 (e.g., at least some of the electronic cave circuit elements, systems, and/or subsystems shown, for example, in FIGS. 1, 3-6, and so on). When a "timed out" output signal from timer 750 is thus applied to the "power down" input terminal of cave electronics 760, these cave electronics respond by automatically going into a relatively low-power "sleep" mode. In such a mode the artificial cave system is not capable of supporting normal human-user use of the cave. However, the cave system now consumes less electrical power, the useful life of at least some of the system's components may be usefully extended by being temporarily unpowered or only low-powered, and the system has other "green" attributes and benefits.

FIG. 10 shows that in addition to restarting timer circuitry 750, any output pulse produced by human detector 742 (indicating detection of human activity (presence and/or motion) in the detection area(s) covered by detector 742) can also be applied to the "power up" input terminal of artificial cave electronics 760. Receipt of such a human-detection signal from human detector 742 via its "power up" input terminal causes cave electronic circuitry 760 to automatically return to its full-power, normal operation mode in which it is ready to receive human users into cave passage 10 and to otherwise deal with such users in the various ways that are described elsewhere in this specification.

It will be understood that such automatically triggered powering up as has just been described is optional. It may be desired, for example, to instead require a human operator of the system to perform some specific "manual" operation to re-power the system after it has gone into "power down," "sleep", or "power saver" mode. This may help to ensure, for example, that both the system and its human operators are ready for the reception of human users into the cave system.

Figure 11:
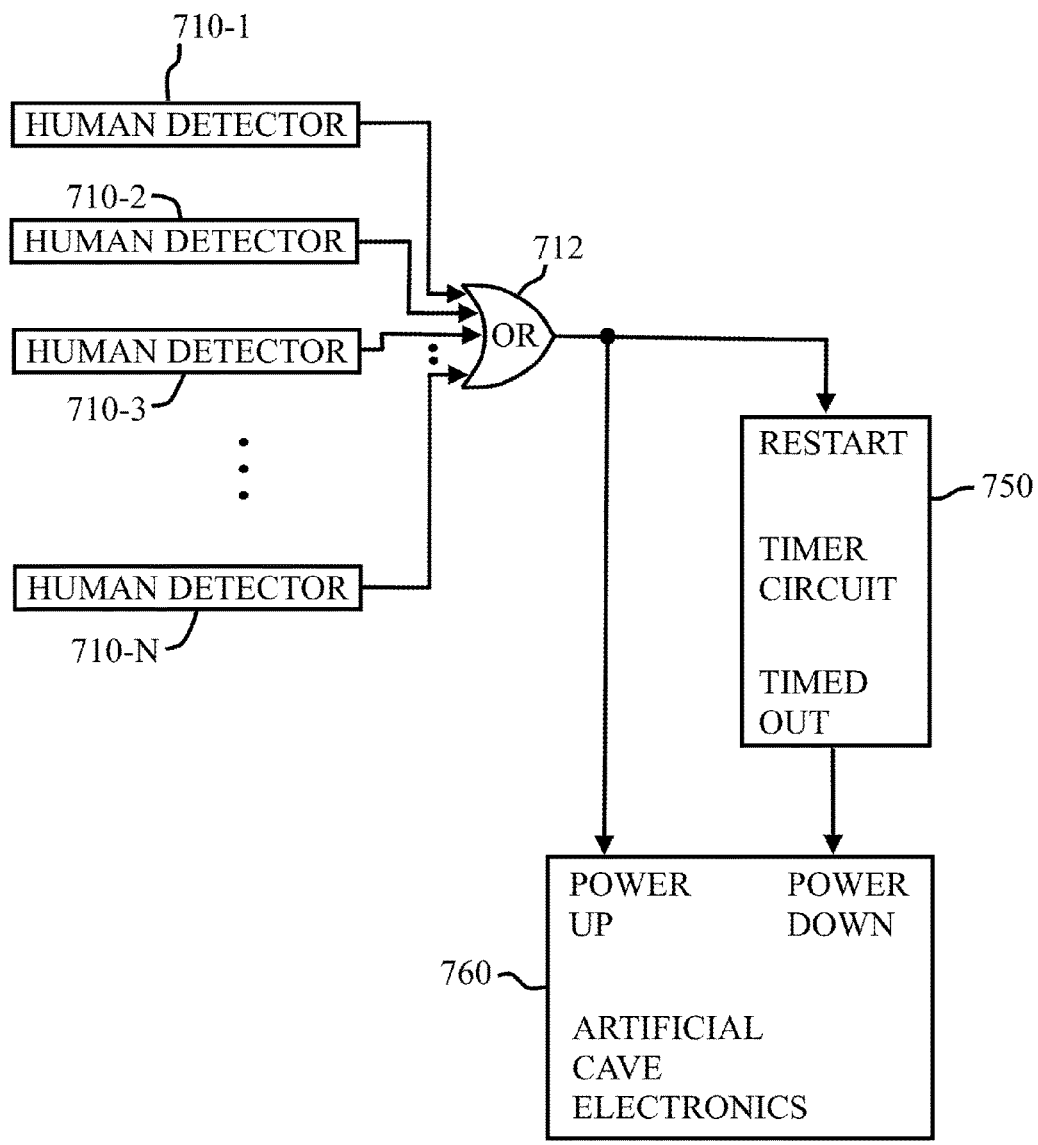
FIG. 11 is another simplified schematic block diagram that shows an alternative embodiment of the type of elements that are shown in FIG. 10 in accordance with the invention.

FIG. 11 (in conjunction with a previously undiscussed aspect of FIG. 7) shows another example of how it may be determined when it is appropriate to automatically cause artificial cave electronics 760 to go into "power down", "energy saver", or the like mode. As shown in FIG. 7 any number of human detectors 710-1 through 710-N for detecting human activity (presence and/or motion) may be provided at any of a number of locations along cave passage 10 (including any of its various possible branches). Again, solely for convenience and brevity of reference herein, all such human presence and/or motion detectors or sensors 710 will sometimes be referred to herein as human detectors or the like. It will be understood that (as in the case of detectors 742 in FIG. 10) detectors 710 can be PIR detectors or any other suitable detectors or sensors for human presence and/or motion in the "detection area" of each sensor. Preferably human detectors 710 are distributed throughout cave passage 10 (including any branches that the passage may have) so that, taken together (i.e., collectively), the detection areas of all detectors 710 cover at least a substantial portion (more preferably most or all) of the extent of passage 10. In this way human detectors 710 can collectively detect human presence and/or motion anywhere throughout at least a major portion (and most preferably most or all) of artificial cave passage 10.

In FIG. 11 the output signals of human detectors 710-1 through 710-N are applied, respectively, to the N input terminals of logical OR gate 712. Thus, if any one or more of human detectors 710 is producing an output signal indicating detection of human presence and/or motion in that detector's detection area, OR gate 712 passes that signal on to the "restart" input terminal of timer circuit 750 (which can be the same as timer circuit 750 in FIG. 10). Accordingly, timer circuit 750 is restarted and prevented from reaching its "timed out" time as long as there is sufficiently frequent human presence and/or motion detected in cave passage 10 by any of detectors 710.

Only after none of human detectors 710 have detected a human within the time allowed by timer circuit 750 is that circuit able to reach its "timed out" condition. When that occurs, timer circuit 750 applies its "timed out" output signal pulse to the "power down" input of artificial cave electronics 760. This causes cave electronics 760 to automatically go into "power down" mode exactly as described above for the same electronics 760 shown in FIG. 10.

Also similar to above-described FIG. 10, the output signal of OR gate 712 can be additionally applied to the "power up" input terminal of artificial cave electronics 760 in FIG. 11 to automatically restore electronics 760 to full power mode when any of human detectors 710 detects human presence and/or motion in cave passage 10. Alternatively (and again as discussed above in relation to FIG. 10) such automatically initiated power-up of electronics 760 can be omitted if desired, and manual power-up by a human operator of the system can be required instead.

Figure 12:
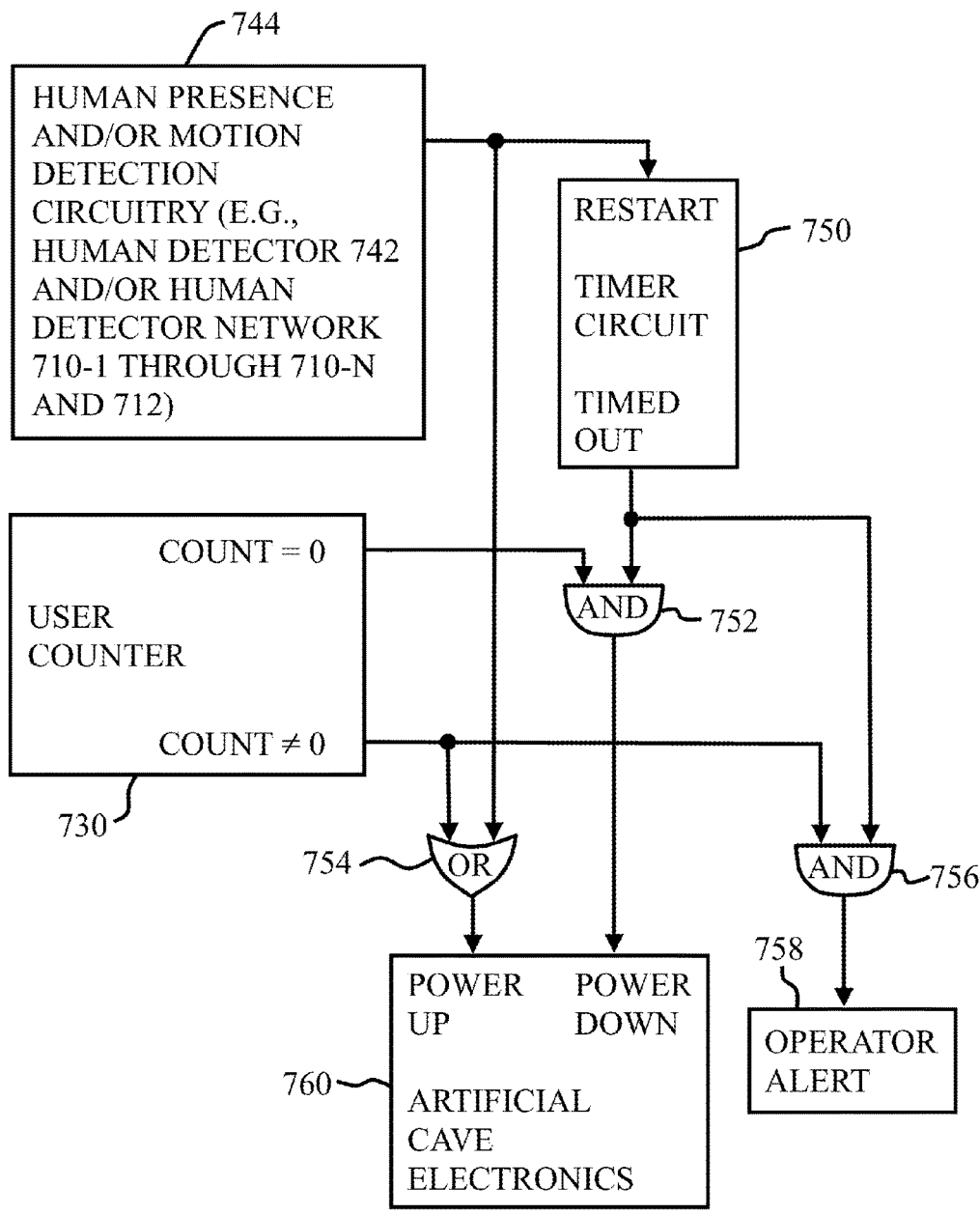
FIG. 12 is a simplified schematic block diagram showing an illustrative embodiment of how certain features from FIGS. 7-11 may be combined and further extended in accordance with yet other possible aspects of the invention.

FIG. 12 shows an illustrative embodiment of the system in which automatic power-down of artificial cave electronics 760 (as in either FIG. 10 or FIG. 11) is conditioned on both (1) a sufficiently long period of elapsed time with no human activity detected as in either FIG. 10 or FIG. 11, and (2) an appropriate current user count value (determined as discussed in detail above in relation to FIGS. 7-9).

In FIG. 12 element 744 can correspond to elements like 740 and 742 in FIG. 10, or to elements like 710 and 712 in FIGS. 7 and 11, or it can be any other components for detecting human activity wherever it is desired to perform such detection. Also in FIG. 12 element 750 can correspond to timer circuit 750 in FIG. 10 or 11, and element 730 can correspond to user counter 730 in FIG. 8 or 9.

In FIG. 12 user counter 730 produces a logical high (e.g., logical 1) output signal on its "count=0" output signal lead whenever it is registering a user count value of zero. Such a zero user count value in user counter 730 also causes counter 730 to output a logical low (e.g., logical 0) output signal on its "count not equal to 0" output signal lead. Conversely, whenever the user count value in user counter 730 is not zero, counter 730 outputs a logical 0 output signal on its "count=0" output signal lead, and counter 730 outputs a logical 1 output signal on its "count not equal to 0" output signal lead.

The "count=0" output signal of counter 730 is applied to one input terminal of logical AND gate 752. The "timed out" output signal of timer circuit 750 is applied to the other input to AND gate 752. (It is assumed here that the "timed out" output signal of timer 750 is logical 0 until timer 750 reaches its timed out condition, at which time timer 750 switches its "timed out" signal from logical 0 to logical 1. It is also assumed here that a logical 1 signal must be applied to the "power down" input terminal of artificial cave electronics 760 in order to cause those electronics to automatically power down.) The output signal of AND gate 752 is applied to the "power down" input terminal of artificial cave electronics 760. This AND gate 752 output signal is logical 1 (causing electronics 760 to power down) only when both of the inputs to AND gate 752 are logical 1. Thus AND gate 752 requires two preconditions to be satisfied or met before allowing automatic power-down of circuitry 760 to take place. These two preconditions are (1) the current user count value (in counter 730) is zero (indicating that no user is currently in artificial cave passage 10) and (2) there has been no human presence and/or motion anywhere in the detection area covered by circuits 744 for at least the length of time required for timer circuit 750 to reach its "timed out" condition.

By requiring the above-described two preconditions to be met or satisfied before causing circuitry 760 to automatically power down, the system is kept at full power while, for example, the human operators of the system can investigate why the non-zero user count value indicates that a user may still be in artificial cave passage 10 although no human motion or presence has been recently detected in the cave. This can help the operators to check for the possibility of an ill, injured, or incapacitated user in the cave while the cave electronics are all still kept at full power and in full operational mode. This can also enhance the suitability of human detectors 710 and/or 742 that are only human motion detectors, which can be more economical to implement than human presence detectors. This is so because user counter 730 effectively provides some human presence information in the FIG. 12 system.

To help alert the human operators of the cave to the apparent anomaly of no recent activity in the cave passage 10 coupled with a non-zero user count value in counter 730, the "timed out" output signal of timer circuit 750 is applied to one input terminal of AND gate 756 in FIG. 12, while the "count not equal to 0" output signal of user counter 730 is applied to the other input terminal of that gate. AND gate 756 thus produces a logical 1 output signal when timer 750 times out but counter 730 fails to indicate zero as the number of users currently in cave passage 10. A logical 1 output signal from AND gate 756 causes operator alert component 758 to output an alert (e.g., visible on a computer monitor or other warning light and/or audible via computer speakers or other audio equipment) to the human operators of the system. Such an operator alert advises the operators to ensure that no user is still in artificial cave passage 10 before allowing the system to shut down.

A final aspect of what is shown in FIG. 12 is logical OR gate 754. The two inputs to this gate are (1) the "count not equal to 0" output signal of counter 730 and (2) the output signal of detector circuitry 744 (assumed to be logical 1 whenever detector circuitry 744 detects human presence and/or motion within its detection range). The output signal of OR gate 754 is applied to the "power up" input terminal of circuitry 760. (Again it is assumed here that a logical 1 "power up" input signal causes cave electronics 760 to power up or to remain powered up.) Circuitry 760 may be constructed to give preference to any "power up" input signal over any "power down" input signal. In this way, for example, the system will not power down as long as counter 730 indicates a non-zero user count.

As in earlier-described embodiments, once the system has automatically powered down, it may be preferred to require a human operator to manually power the system up again.

Features of the invention like those discussed above especially in connection with FIGS. 7-12 can have particular importance because, to realistically emulate natural cave conditions, an artificial cave passage 10 should (1) be very or even completely dark, (2) preferably include at least some areas that require a human user to crawl and otherwise squeeze through relatively tight or constricted passageways, (3) have a number of horizontal and/or vertical twists and turns (i.e., a non-linear alignment), and (4) have artificial speleothems, some of which project into the user passageway and some of which might snag a user if not avoided appropriately. Also to realistically emulate a natural cave an artificial cave may have sudden or "unexpected" drops, and/or may require that a user climb up or down a steep or even vertical cave wall. Still other natural-cave-emulating features may be the inclusion of multiple alternative pathways through the artificial cave. Just like a real cave, some of the features that may be built into an artificial cave may thus be challenging, confusing, or even somewhat disorienting for some users. These requirements for or characteristics of artificial caves in accordance with this invention may make it difficult or impossible for the operators of these caves to directly observe users as they proceed through the cave. For example, the typical non-linear alignment of artificial cave passageway 10 obscures at least some portions of the passageway from other portions of the passageway. Especially, some portions of the passageway are thus typically not visible from outside any entrance 13 or exit 15.

Again, the cave interior is dark, the pathways through the cave are not straight but rather tortuous with a number of confined (e.g., user-crawl-requiring) areas, and there may even be multiple alternate pathways through. Because direct observation of users in the cave is thus difficult or impossible, it can be important to provide alternate means of making sure that all users make it through the cave successfully and in a reasonable amount of time. Video camera systems in the cave that rely on light frequencies that are invisible to users and that therefore do not interfere with a user's perception of the cave as naturally dark can be used. But to be fully effective the video monitors of such camera systems may require constant or at least frequent observation by the human operators of the cave. Such camera systems may also be relatively expensive and they may not provide the information needed to automatically prevent too many users from entering the cave at one time. For all of the foregoing reasons there is a need for artificial cave system features like those discussed above particularly in connection with FIGS. 7-12.

In addition to the possible system aspects that are illustrated, for example, by above-described FIGS. 7-12, it will be appreciated that these (and other FIGS. herein) also serve to illustrate methods of operating such possible system aspects in accordance with the invention. Thus, for example, these FIGS. inherently show what method functions are performed by the various depicted system elements and how these individual method functions interact with one another to produce full methods for achieving various desired results.

Figure 13A:
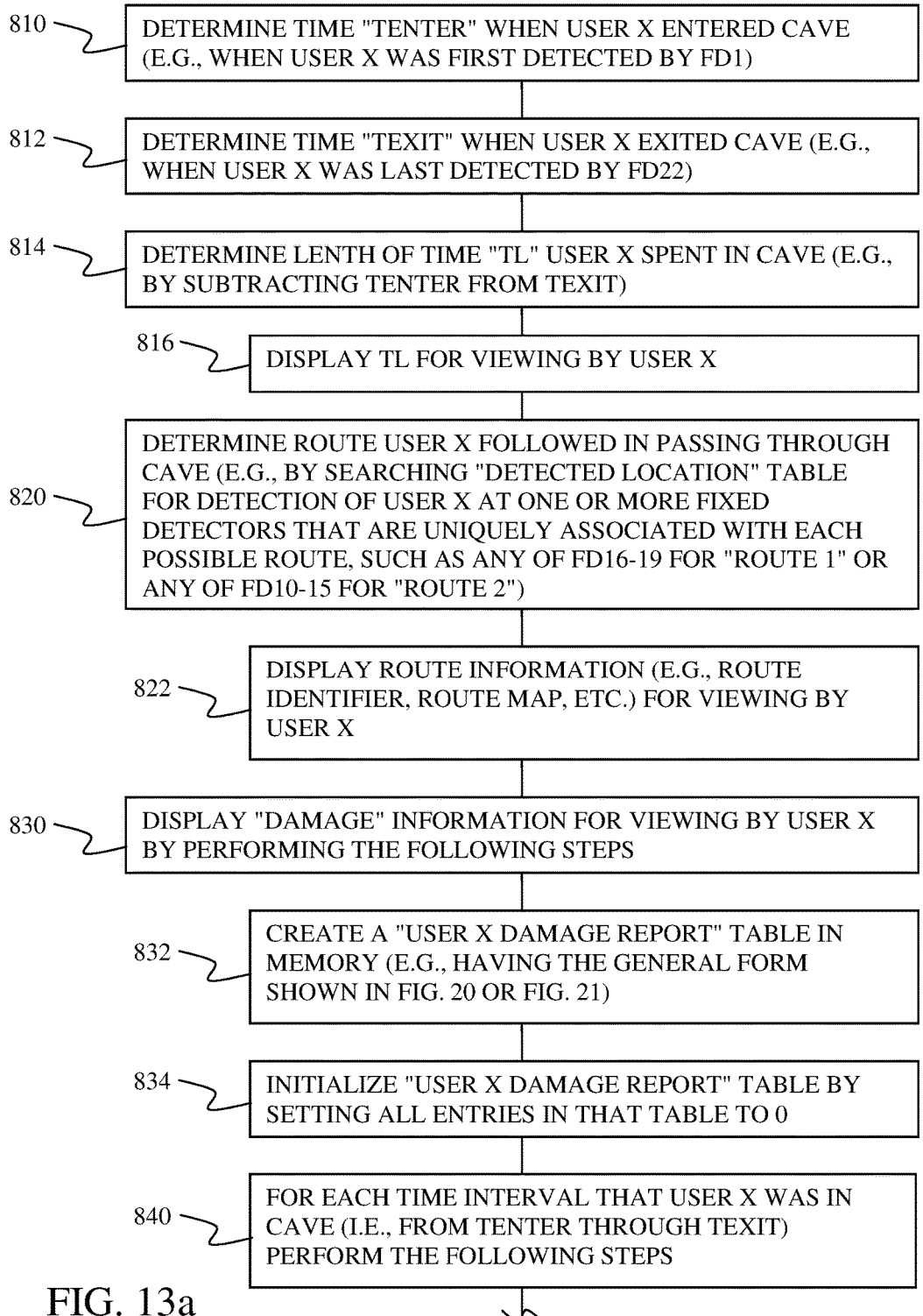
FIG. 13 (comprising parts 13a and 13b) is a diagram of illustrative functions or steps that can be performed (e.g., in and using system elements such as are shown in earlier FIGS.) to achieve certain aspects of the invention.
Figure 13B:
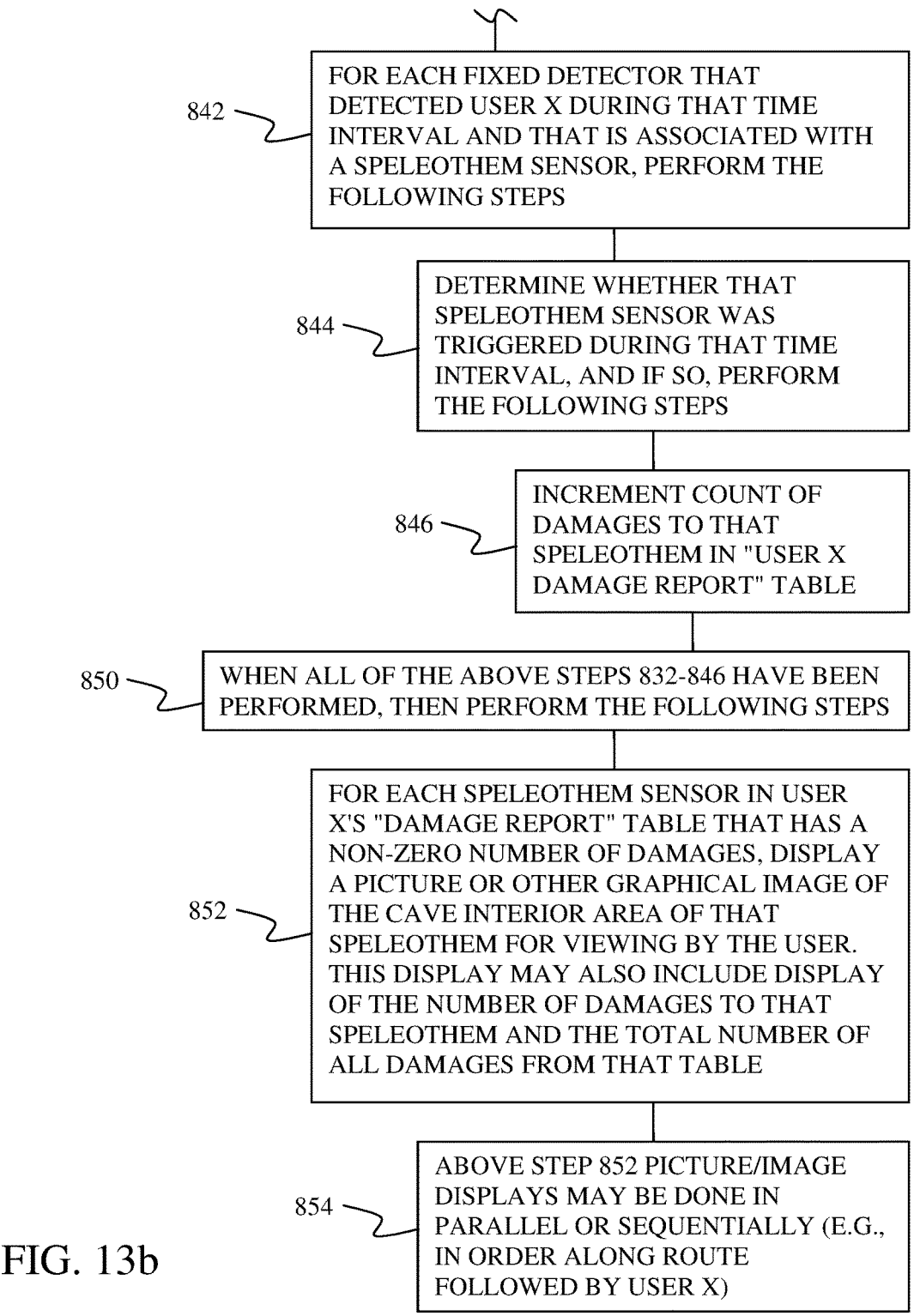

Turning now to some further aspects of keeping track of the performance of users traversing an artificial cave in accordance with the invention, and also reporting that performance back to users after they have left the cave (especially when there can be more than one user in the cave at the same time), FIG. 13 (comprising parts 13a and 13b) shows an illustrative embodiment of methods in accordance with the invention for accomplishing at least some of these objectives. It will be readily apparent to those skilled in the art how methods like those illustrated by FIG. 13 can be implemented in artificial cave apparatus like that shown and described earlier in this specification.

Considering now the illustrative embodiment shown in FIG. 13, this embodiment may be described as "free-running" to at least some extent. This is so because a clock or timer circuit in the system elements of the artificial cave (e.g., a clock or timer circuit in computer system 150 in FIG. 3) is used to automatically trigger the performance of certain steps or operations at regularly recurring time intervals. For example, FIG. 16 (which is one of several FIGS. that show an example of how the methods of FIG. 13 may operate under certain conditions) shows a succession of time instances or intervals (T1, T2, T3, T4, etc.) at regularly spaced times extending down the left-hand margin of FIG. 16. In particular, T1 occurs, followed by T2, which is followed by T3, and so on. Although each of these time intervals (or the time spacing between these time instances) can be of any suitable duration, for purposes of illustration it will generally be assumed herein that each of these times is about ten (10) seconds. In other words, from the start of T1 to the end of T6 is about one minute, from the start of T1 to the end of T12 is about two minutes, and so on.

Other illustrative FIGS that are related to FIG. 13 are preliminarily described as follows. FIG. 14 shows an example of how ten speleothem sensors SS1 through SS10 in an illustrative artificial cave (e.g., as in FIG. 1) may be correlated, respectively, with ten fixed detectors FD3, FD4, FD6, and so on in the artificial cave. In this discussion "speleothem sensors" has the same meaning as that same term in the earlier discussion of FIG. 1, etc. Thus for example, each of SS1-SS10 in FIG. 14 refers to a respective one of speleothem sensors 30 in FIG. 1 or FIG. 3. Further, in the present discussion, terms like "fixed detectors" refer to elements like fixed transceivers 20 in FIGS. 1, 3, and 4. Thus, for example, each fixed detector FD3, FD4, FD6, etc. in FIG. 14 corresponds to a respective one of fixed transceivers 20 in FIG. 1, 3, or 4. More particularly, FIG. 14 is intended to show that in the illustrative embodiment being discussed in connection with this FIG. any user of the illustrative artificial cave who interacts inappropriately with the speleothem associated with speleothem sensor SS1 will then be wirelessly detectable by the associated fixed detector FD3. In other words, FD3 is sufficiently proximate (close to, or in the vicinity of) the speleothem of SS1 that a user interacting inappropriately with that speleothem will be concurrently detectable by fixed detector FD3 in the manner described earlier in connection with FIGS. 1-6, for example. To take another similar example from FIG. 14, this FIG. shows that fixed detector FD16 is in the vicinity of the speleothem of speleothem sensor SS7. A user who is close enough to interact inappropriately with (and therefore theoretically damage) the speleothem of speleothem sensor SS7 will also then be in the vicinity (detection range or reception area (e.g., like any of the cross-hatched areas "R" in FIG. 4)) of fixed detector FD16 and therefore wirelessly detectable by that fixed detector. In this discussion it is assumed that each user of the artificial cave is uniquely identifiable by or via any fixed detector that can detect that user as just described. The capability for such unique identification of each individual user of the cave is fully discussed above, e.g., in connection with FIGS. 1-6.

(References to "theoretical" damage (or the like) to a speleothem herein refer to the fact that the artificial speleothems employed in the artificial caves of this invention are preferably essentially indestructible by a user of the cave. These artificial speleothems therefore cannot actually be damaged by a user. In other respects, however, these artificial speleothems resemble real cave speleothems that can be quite delicate and easily damaged by an insufficiently careful caver. Because the artificial speleothems herein are themselves not subject to any actual damage by a user, user interaction with an artificial speleothem that would be inappropriate for (and at least potentially damaging to) a comparable real speleothem may sometimes be referred to as "theoretical" damage to the artificial speleothem.)

Another FIG. appropriate for preliminary discussion at this point is FIG. 15. This FIG. shows an example of an illustrative artificial cave embodiment in which a user of the cave can follow either of two routes to traverse the cave. This is somewhat like what is shown in FIG. 1 or FIG. 4, which show (e.g., in the case of FIG. 1) that there is more than one path (route) that a user can follow to traverse the cave from entrance 13 to exit 15. In the illustrative example shown in FIG. 15, a user who traverses the cave via "Route 1" will be wirelessly detectable by fixed detectors FD1 through FD9 and FD16 through FD22. On the other hand, a user who traverses the cave via "Route 2" will be wirelessly detectable by fixed detectors FD1 through FD15 and FD20 through FD22. Again, it is assumed that a user is wirelessly detectable by one of the specified fixed detectors when the user is sufficiently close to (in the vicinity, detection range, or reception area) of that fixed detector. Also, it continues to be assumed that a user is individually (uniquely) identifiable via the fixed detector that detects that user. For convenience herein, it will generally be assumed that a user on either Route 1 or Route 2 is generally detectable by the fixed detectors in the numerical order of the fixed detectors mentioned in FIG. 15 and the like. Thus a user just entering the cave is then detectable by fixed detector FD1, and a user exiting the cave is then detectable by fixed detector FD22. While in the cave, a user on Route 1 will generally be successively detected by fixed detectors FD1 through FD9 and FD16 through FD22, in that order. This is not necessarily essential or required, but it can be a convenient simplifying assumption for purposes of initial discussion herein.

With the benefit of the foregoing discussion, it can now more fully be explained and understood that FIG. 16 shows an illustrative example of a typical user ("User A") traversing an illustrative artificial cave via illustrative Route 1 in FIG. 15. Thus FIG. 16 shows that at time T1 (or in time interval T1) User A is wirelessly detected at fixed detector FD1 (which is at the entrance to the artificial cave). As will be explained more fully in connection with FIG. 13, a table like that shown in FIG. 16 may be set up in a computer-controllable memory (e.g., in element 150 in FIG. 3) for User A. All entries in this memory are initially set to zero. (A typical "entry" in a table like FIG. 16 is at each intersection of each row and each column in FIG. 16. The initial entry zeros are not shown in FIG. 16 to avoid unduly complicating the FIG. and making it harder to see the meaningful data, i.e., the "1" entries in that FIG.)

At each successive time (or during each successive time interval) T1, T2, T3, T4, etc. in FIG. 16, the system interrogates each of the fixed detectors FD1 through FD22 to report back which (if any) user that fixed detector is currently wirelessly detecting (or has wirelessly detected since that fixed detector was last interrogated). If a fixed detector thus reports detection of User A in the vicinity of that fixed detector, the entry in the FIG. 16 table for that fixed detector at that detection time is changed from zero to one. Thus the 1 at the intersection of the row for T1 and the column for FD1 in FIG. 16 indicates that fixed detector FD1 detected user A at time T1.

From the foregoing, it will be seen that the table shown in FIG. 16 effectively records the progress of User A through the artificial cave by means of the "1" entries in the FIG. 16 table. To take just a few specific examples of this, FIG. 16 shows that at time T2 User A was detected in the vicinity of fixed detector FD2; at time T3 User A was still in the vicinity of FD2, but also close enough to fixed detector FD3 to be detected there as well; by time T4 User A had progressed into the vicinity of fixed detector FD4; and so on. It will be noted that the eventual detection of User A at fixed detectors FD16 through FD19 means that User A followed Route 1 (FIG. 15), not Route 2. Final detection of User A at fixed detector FD22 at time T16 means that User A exited the cave at T16. Assuming (as noted earlier) that each time interval T equals 10 seconds, it took User A 160 seconds (or two minutes and 40 seconds) to traverse the cave.

FIG. 17 is another FIG. similar to FIG. 16, but for a second user ("User B") traversing the artificial cave. FIG. 17 shows that another table is set up in memory (e.g., in component 150 in FIG. 1) for User B. Again, all entries in this table are initially set to zero (these initial values not being shown in FIG. 17 to avoid undue complication of the FIG.). As in the case of FIG. 16, FIG. 17 shows that the above-described periodic interrogation of fixed detectors FD1 through FD22 results in reporting detection of User B at FD1 starting at time T10. Note that this is a time when User A is still in the cave. In particular FIG. 16 shows that User A is in the vicinity of fixed detector FD16 at time T10. Thus FIGS. 16 and 17 illustrate a case or situation in which two different users are in the artificial cave at the same time, albeit at different locations in the cave. Despite the presence of more than one user in the cave at certain times, the system is able to keep the location data (FIGS. 16 and 17) for each user separately because the system is able to uniquely identify which user is being detected at each fixed detector FD (elements 20 in earlier FIGS. like 1-6) as discussed in full detail in connection with FIGS. 1-6.

FIG. 17 shows that at time T11 User B has progressed from the vicinity of fixed detector FD1 to the vicinity of fixed detector FD4. By time T12 FIG. 17 shows that User B is now only in the vicinity of FD4. The remainder of FIG. 17 shows the progress of User B through the remainder of the cave until User B exits the cave (FD22) at time T29. The data recorded in the FIG. 17 table shows that User B followed Route 2 in order to traverse the cave. This is evident (with reference to FIG. 15) by detection of User B at fixed detectors FD10 through FD15 (but not at FD16-19).

Turning now to a preliminary discussion of FIG. 18, this FIG. shows that in addition to interrogating all of fixed detectors FD1 through FD22 at each time (or in each time interval) T1, T2, T3, T4, etc., the system also interrogates each speleothem sensor SS1 through SS10 for detection of any inappropriate user interaction with the respectively associated speleothem. All entries in the table shown in FIG. 18 are initially set to zero (these initial values not being shown in the drawing to avoid undue complication). The FIG. 18 table is another table that can reside in memory, e.g., in element 150 in FIG. 1. In response to any of the just-mentioned periodic interrogations, any speleothem sensor SS1 through SS10 that is detecting an inappropriate user interaction with the associated speleothem (or that has detected such inappropriate interaction since the last interrogation) reports that inappropriate interaction. This inappropriate interaction report is recorded in the FIG. 18 table by storing a "1" at the memory location in that table which is at the intersection of the relevant SS1 through SS10 column and the relevant T1, T2, T3, T4, etc. row. Thus, for example, FIG. 18 records that speleothem sensor SS3 reported an inappropriate user interaction with the speleothem associated with SS3 at time T6. As another example, FIG. 18 shows speleothem sensor SS9 reporting inappropriate user interaction with the speleothem associated with SS9 at time T14, time T15, and time T27.

Note that the data in FIG. 18 does not indicate which user of the cave was responsible for which inappropriate speleothem interaction. Assigning or attributing such responsibility to particular users may be accomplished as will now be discussed.

FIG. 19 shows translation of the FIG. 18 data to another table in which the column headings have been converted from speleothem sensor numbers (SS1, SS2, etc.) to fixed detector numbers (FD3, FD4, etc.) based on the relationships identified in FIG. 14 as described above.

Employing the above-described data, a correlation can be performed between a user's Detected Location data (e.g., as in FIG. 16 for typical User A, or as in FIG. 17 for typical User B) and the Translated Detected Damage data (e.g., as in FIG. 19) based on times that are common between these two different data sets. Thus, for example, stepping through the times (or time intervals) that User A was in the cave (i.e., T1 through T16 in FIG. 16) reveals that User A was detected in the vicinity of fixed detector FD6 at time T6, which was also the time that FIG. 19 shows damage to the speleothem in the vicinity of FD6. The Table in FIG. 14 shows that the speleothem monitored by speleothem sensor SS3 is the speleothem in the vicinity of FD6. Accordingly, User A is the user to whom this instance of damage to this speleothem can be attributed or assigned. FIG. 20 shows a table (e.g., again in memory in component 150 in FIG. 1) in which a record of all speleothem damages by User A can be created. Initially all entries in this table are set to zero. The entry for a particular speleothem (in this instance identified by its speleothem sensor number SS1, SS2, SS3, etc.) is incremented by one each time User A is assigned responsibility for a damage to that speleothem. Thus the immediately above-described attribution of the time T6 damage to the speleothem of speleothem sensor SS3 causes the entry on the SS3 line of FIG. 20 to increment from zero to one as shown in FIG. 20.

To take another example of what has just been described, at T9 FIG. 19 shows damage to the speleothem in the vicinity of fixed detector FD9. FIG. 16 shows that User A was detected in the vicinity of FD9 at T9. Accordingly, this speleothem damage can be attributed to User A. FIG. 14 shows that the speleothem monitored by speleothem sensor SS4 is the speleothem in the vicinity of FD9. As a consequence, the entry for SS4 in FIG. 20 is incremented from zero to one as shown in that FIG. to record that User A has been determined to be the user responsible for this T9 damage to the speleothem monitored by speleothem sensor SS4 and in the vicinity of fixed detector FD9.

Continuing on in the manner described above, the table shown in FIG. 20 can be completed to create a record of (1) which speleothems User A interacted inappropriately with (i.e., theoretically damaged), (2) how many times User A thus damaged each speleothem, and (3) the total number of speleothem damages that were attributed to User A (i.e., the sum of the numbers in the entries above the total line entry). In the particular example shown in FIG. 20, the total number of speleothem damages attributed to User A is 5.

A similar record for speleothem damages by User B can be created as shown in FIG. 21 in the same manner as described above for User A and FIG. 20. To take just one example for User B and FIG. 21, FIG. 19 shows damage to the speleothem in the vicinity of fixed detector FD12 at both time T21 and time T22. FIG. 17 shows that User B was detected in the vicinity of FD12 at both of those times (i.e., at both T21 and T22). FIG. 14 shows that the speleothem associated with speleothem sensor SS5 is in the vicinity of FD12. Accordingly, on the SS5 line in FIG. 21, User B is given responsibility for two damages to the speleothem monitored by SS5 (i.e., one damage at time T21, and a second damage at time T22).

It should be noted that even though User A and User B were both in the cave during part of the time being considered, the techniques described above enable the system to assign responsibility for each speleothem damage to only the user who actually caused that damage. This is so because the unique identifier of each user allows detection of user locations to be separately recorded for each user (e.g., FIG. 16 for location detections of User A, and FIG. 17 separately for location detections of User B). With such separate records of time and location of each user, the common record (FIG. 18 or FIG. 19) of the times and instances of all speleothem damages can be broken down to attribute each speleothem damage to the user actually responsible for that damage. To take just one example that demonstrates this capability of the system, FIGS. 16 and 17 show that both User A and User B were in the cave at time T12 when FIGS. 18 and 19 show that speleothem sensor SS2 detected damage to the speleothem in the vicinity of fixed detector FD4. However, FIGS. 16 and 17 show that only User B was in the vicinity of FD4 at time T12. (In particular, FIG. 16 shows that User A was in the vicinity of FD17 (not FD4) at time T12.) Accordingly, FIG. 21 shows the damage to the speleothem monitored by SS2 being attributed to only User B. User A never damaged the SS2 speleothem, which is shown by the unaltered initial zero on the SS2 line in FIG. 20.

FIG. 13 can now be described as showing illustrative methods of operating an artificial cave in accordance with certain aspects of the invention that can be related to what has been described above in connection with FIGS. 14-21. The illustrative information shown in FIGS. 14-21 will sometimes be referred to in FIG. 13 to provide examples of what is being discussed in connection with FIG. 13. Methods like the FIG. 13 method can be at least partly controlled by suitably programming computer system 150 in FIG. 3. But of course many other system elements such as those shown throughout FIG. 3 are also involved in carrying out methods like the FIG. 13 method. In some respects FIG. 13 assumes that the information of the various types shown in FIGS. 14-21 is already known or has been collected as described above in connection with FIGS. 14-21. In other respects FIG. 13 shows how information of the various types shown in FIGS. 14-21 can be produced. FIG. 13 also shows some possible features of the invention that go beyond what has already been said in connection with FIGS. 14-21 but that can be additionally useful for various purposes.

In step 810 in FIG. 13 a parameter "TENTER" is determined for any particular user ("User X") of the artificial cave. TENTER is the time when User X entered the cave. For example, assuming that the cave is constructed as described above in connection with FIGS. 14-21, TENTER for User X is the time when User X is first detected by fixed detector FD1. Thus for User A in FIG. 16 TENTER is T1, while for User B in FIG. 17 TENTER is T10.

In step 812 in FIG. 13 a parameter "TEXIT" is determined for User X. TEXIT is the time when User X exited the cave. For User A in FIG. 16 TEXIT is T16. For User B in FIG. 17 TEXIT is T29.

In step 814 in FIG. 13 the length of time ("TL") that User X spent in the cave is determined by subtracting that user's TENTER from that user's TEXIT. Thus for User A in FIG. 16 TL is T16-T1. Assuming that each T1, T2, T3, etc. is approximately ten seconds, then TL for User A is approximately 150-160 seconds, or 2 minutes and 30 or 40 seconds. Similarly, for User B in FIG. 17 TL is T29-T11 or approximately 180 seconds (3 minutes).

Figure 22:
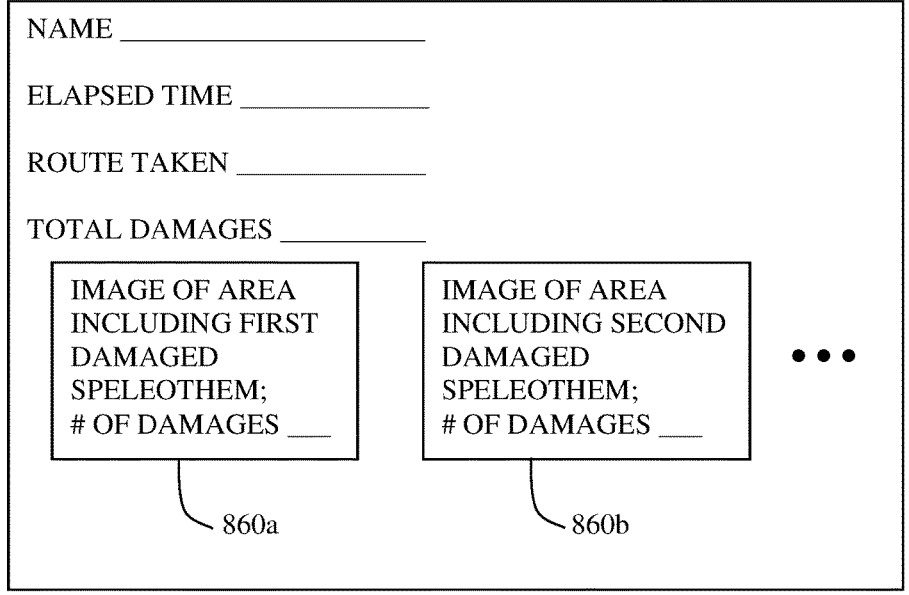
FIG. 22 is a depiction of an illustrative display (e.g., on a computer monitor) that may be provided to a user after the user has passed through the artificial cave to report to the user various aspects of the user's performance in the cave in accordance with certain aspects of the invention.

In step 816 in FIG. 13 the value of TL that has been determined for each user is displayed for viewing by that user after the user has exited the cave. For example, the displays 110 shown in FIG. 3 can be visible to each user who has exited the cave, and can be used to show each user that user's TL value. FIG. 22 shows an illustrative example of a display 110 (e.g., a computer-controlled video monitor, digital display, or other similar component) that can be used to show a user various results of that user's experience in the cave after the user has exited the cave. Thus, for example, the upper left area of display 110 may be used to display the user's name (e.g., what the user prefers as an identifier rather than identifiers used internally in the system such as User A, User B, or the like). Below the user's name, display 110 may display that user's Elapsed Time in the cave, i.e., the value of TL for that user as determined in step 814 in FIG. 13.

The next step in FIG. 13 is step 820 in which the route taken by User X in passing through the cave is determined. As shown in step 820, this determination can be made, for example, by searching the detection location table (e.g., as in FIG. 16 or FIG. 17) for that user to see whether that user was ever detected by the fixed detectors that are uniquely associated with the various possible routes. Thus in the illustrative embodiment shown in FIG. 15, for example, a FIG. 16 or FIG. 17 record that a user was detected at any of fixed detectors FD16-FD19 means that this user followed Route 1, whereas a FIG. 16 or FIG. 17 record that a user was detected at any of fixed detectors FD10-FD15 means that this user followed Route 2. (As discussed earlier, these criteria mean that User A in FIG. 16 followed Route 1 and User B in FIG. 17 followed Route 2.)

In step 822 (FIG. 13) the user's route (determined as in just-described step 820) is displayed for that user via display 110 as shown, for example, in FIG. 22 on the line "Route Taken".

Step 830 in FIG. 13 begins a series of steps that leads to display for a user of information about the speleothem "damages" (if any) the system has attributed to that user. This process may begin (as in step 832) by creating in memory a "Damage Report" table (as in FIG. 20 or FIG. 21) for each user. In step 834 all entries in a user's Damage Report table are initialized to zero. After such initialization, the steps below step 840 are performed for each time interval that the user being considered was in the cave (i.e., from TENTER through TEXIT for that user.)

Step 842 can be performed only for those fixed detectors that are associated with a speleothem sensor. For example, in the particular embodiment shown in FIGS. 13-21, this means that only the fixed detectors listed in FIG. 14 (e.g., FD3, FD4, FD6, FD9, and so on) need to be considered. Step 842 determines whether in the time interval being considered the user being considered was detected by the fixed detector being considered. If so, then the steps below step 842 are performed. If not, step 842 is repeated for the next fixed detector in the FIG. 14, and so on.

Whenever step 844 is reached from step 842 (because in the time interval being considered the user being considered was detected by the fixed detector being considered), step 844 determines whether the speleothem sensor associated with that fixed detector was triggered during that time interval. This can be determined by consulting the data stored in memory as in FIG. 18 and/or FIG. 19 (both of which capture the same underlying event data). Thus, for example, FIG. 18 shows that speleothem sensor SS3 was triggered during time interval T6. FIG. 19 shows that this event corresponds to triggering the speleothem sensor (SS3) that is in the vicinity of fixed detector FD6. Accordingly, if this performance of step 844 is the result of considering detection of the user being considered by fixed detector FD6 in time interval T6, then step 844 can be followed by performance of step 846. This performance of step 846 results in incrementing the appropriate entry in the Damage Report table (e.g., FIG. 20 or 21) of the user being considered. In the particular example being discussed, the first performance for User A of step 846 results in the SS3 entry in User A's Damage Report table (FIG. 20) being incremented from the initial zero value to the value one shown in FIG. 20. In this way, by repeated performance of steps 840-846 (as appropriate) for all time intervals that the user being considered was in the cave, a complete Damage Report table for that user is populated in memory with data showing which (if any) speleothem damages the system has attributed to that user, and also how many instances of such damage to each thus-damaged speleothem were detected. Again, FIGS. 20 and 21 are illustrative examples of such completed Damage Report tables. Each such table may also include a total number of all the speleothem damages attributed to the user being considered (e.g., last line in FIGS. 20 and 21).

When the Damage Report table for the user being considered has been completed as described above, steps 850-854 can be performed. In these steps various types of speleothem damage information can be added to the display 110 viewable by the user who has exited the cave and who is being considered in the foregoing discussion. See FIG. 22. For example, the total number of speleothem damages the system has attributed to this user (e.g., the number on the bottom, "Total" line in this user's Damage Report table such as in FIG. 20 or 21) may be included after the legend "Total Damages" on the display 110 viewable by the user as shown in FIG. 22. Other speleothem damage information that may be provided to the user via display 110 may be an array and/or succession of images 860a, 860b, etc. of the area in the cave of each speleothem that the system has determined this user damaged. These images may be predetermined and retrieved from a memory of the system. These images may be photographic or graphical and are intended to show the area of a "damaged" speleothem (e.g., as it might have appeared to the user approaching the speleothem). Such a speleothem "area" depiction typically includes an image of the speleothem itself and its near surroundings in the cave in order to help the user remember the circumstances that caused the user to damage that speleothem. Also to enhance the user's understanding of the information displayed, images 860a, 860b, etc. are preferably provided or arrayed in the order in which the user would typically have encountered the imaged areas as the user traversed the cave. In addition to this "image" information, each of these display elements 860 (FIG. 22) may also show the user how many damages of each speleothem the system attributed to the user (e.g., in the area "# of Damages" in each of display elements 860 in FIG. 22). This # of Damages data can come from the line in this user's Damage Report table (e.g., FIG. 20 or 21) for the depicted "damaged" speleothem.

To give a specific example of the FIG. 22 display 110 information that may be provided to a user in accordance with FIG. 13 steps 850-854, in the case of User A the "Total Damages" shown on display 110 would be 5 (last line in FIG. 20). Display element 860a would be the area of the speleothem monitored by speleothem sensor SS3 (i.e., assumed to be the first speleothem that User A encountered after successfully passing the undamaged and therefore not displayed speleothems monitored by SS1 and SS2). The # of Damages data item in display element 860a would be 1 (i.e., the first non-zero entry in User A's Damage Report table in FIG. 20). Display element 860b in FIG. 22 would be the area of the speleothem monitored by SS4 (identified by the next non-zero entry in FIG. 20). The # of Damages data item in display element 860b would be 1 (the second non-zero entry in FIG. 20). Additional display elements 860 that would be shown to User A would be the areas of the speleothems monitored by SS7 and SS9. The areas of the speleothems monitored by SS1, SS2, SS5, SS6, SS8, and SS10 would not be displayed to User A in this embodiment and example because User A was determined by the system not to have damaged any of those speleothems.

Figure 23:
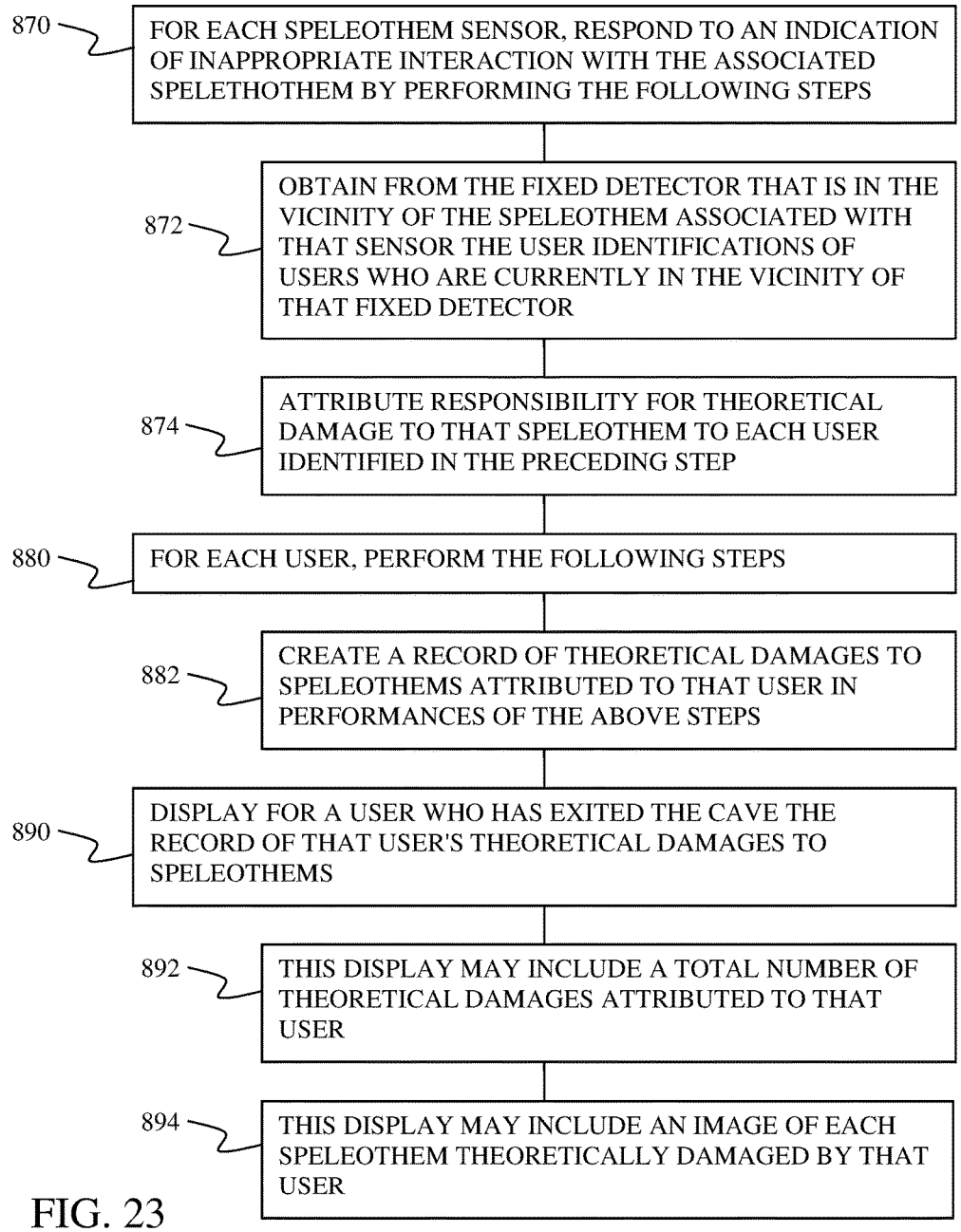
FIG. 23 is generally like FIG. 13, but for another illustrative embodiment of certain aspects of the invention.

FIG. 23 shows an alternative embodiment of at least some portions of what is shown in FIG. 13 and described above. Whereas the FIG. 13 embodiment has been described as somewhat free-running, the alternative embodiment illustrated at least in part by FIG. 23 is somewhat more event-driven. FIG. 23 will be described first. Thereafter related illustrative versions of what is shown in certain of FIGS. 14-22 will be discussed. The embodiment shown in FIG. 23 is said to be event-driven or asynchronous because instead of collecting data from the speleothem sensors 30 (FIG. 1 or FIG. 3) and the fixed detectors 20 (FIGS. 1, 3, and 4) at regular time intervals T1, T2, T3, etc. as in FIGS. 16, 17, and the like, in the FIG. 23 embodiment data can be collected to a large extent only when a speleothem sensor 30 detects "damage" to the speleothem associated with that sensor.

Step 870 in FIG. 23 is performed in response to any speleothem sensor 30 detecting that a user in the artificial cave has interacted inappropriately with the associated speleothem. This initiates a performance of steps 872 and 874.

In step 872 the system interrogates the fixed detector 20 that is associated with the speleothem of the just-triggered speleothem sensor 30 to obtain the individualized identification of the user who is currently in the vicinity of that fixed detector. More than one user may be in that vicinity, which may mean that that fixed detector responds with more than one user identification.

The information gathered in each performance of steps 870 and 872 allows an associated performance of step 874. This step is attributing the particular speleothem damage event detected in step 870 to the particular user(s) detected in step 872.

Steps 880 and 882 are performed at times appropriate to the performance of the preceding steps. These steps 880 and 882 cause the creation of a record (e.g., in memory of computer 150 in FIG. 3) for each user of the speleothem damages attributed to that user in the preceding steps. (An illustrative example of such a record is shown in FIG. 24 and discussed further later in this specification.)

Steps 890, 892, and 894 may be performed for each user after that user has exited the cave. For example, step 890 includes display for that user of information telling the user about the speleothem damages that have been attributed to that user. As in the earlier-described embodiment of FIGS. 13-22 (see especially FIG. 22), that displayed information may include the total number of speleothem damages the system has attributed to that user (step 892). That display may also include images of the areas of the speleothems damaged by that user (step 894), as illustrated by elements 860 in FIG. 22.

The illustrative speleothem damage data shown in FIG. 24 is based on the assumption that the FIG. 23 steps are performed on an artificial cave constructed with the same characteristics and configuration as are illustrated by earlier-described FIGS. 14 and 15. Additionally it is assumed in FIG. 24 that User A and User B each perform in the cave in the same way that they are shown to do in FIGS. 16-19 (although, again, what is shown in FIGS. 23 and 24 does not make use of monitoring during regularly recurring time intervals T1, T2, T3, T4, etc. as the earlier-described embodiment does).

Figure 25:
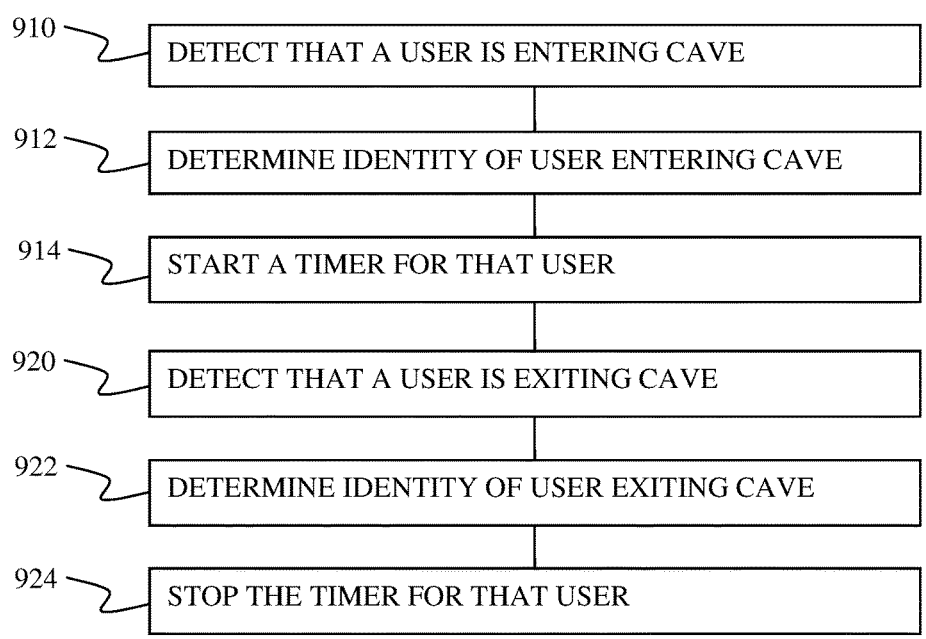
FIG. 25 is a diagram of additional illustrative functions or steps that can be performed in conjunction with other functions or steps (like those shown in FIG. 23) in order to gather additional information about the performance of users of the artificial cave in accordance with certain aspects of the invention.

FIG. 25 shows steps that can be performed if it is desired to add to an embodiment like FIG. 23 the ability to support determining and displaying (e.g., as in FIG. 22) the elapsed time that each user spends in the course of traversing it. In step 910 the fact that a user has just entered the cave is detected. Several techniques for detecting that a user has entered are described earlier in this specification.

In response to detection of a user entering, step 912 is performed to determine the unique identity of that user. For example, a fixed detector 20 (FIGS. 1, 3, and 4) at or near the cave entrance can be interrogated by the system (FIG. 3) to wirelessly determine the unique identifier of the helmet (FIG. 2) worn by the user who has just entered the cave.

Then, in step 914, a timer is started (e.g., in computer 150 in FIG. 3) to begin keeping track of the amount of time the just-identified user spends in the cave.

Step 920 detects when a user is exiting the cave. Again, any technique for detecting that a user is exiting (e.g., any of those techniques that are described earlier in this specification) can be used for this purpose. Step 922 is then performed to determine the identity of the exiting user. Once again, for example, this can be done by having the system (e.g., FIG. 3) interrogate a fixed detector 20 near the cave exit to report the unique identifier of the helmet (FIG. 2) worn by the user currently in the vicinity of that fixed detector. Once the exiting user has been thus identified, step 924 is performed to stop the timer for that user. The time thus recorded by that timer can be stored and ultimately displayed (e.g., as in FIG. 22) as the elapsed time of that user (i.e., the length of time that user spent in the cave).

Although just described as an adjunct to the FIG. 23 embodiment, what is shown in FIG. 25 can be carried out in any other embodiment as another or alternative technique for determining the time that each user spends in the artificial cave.

Figure 26:
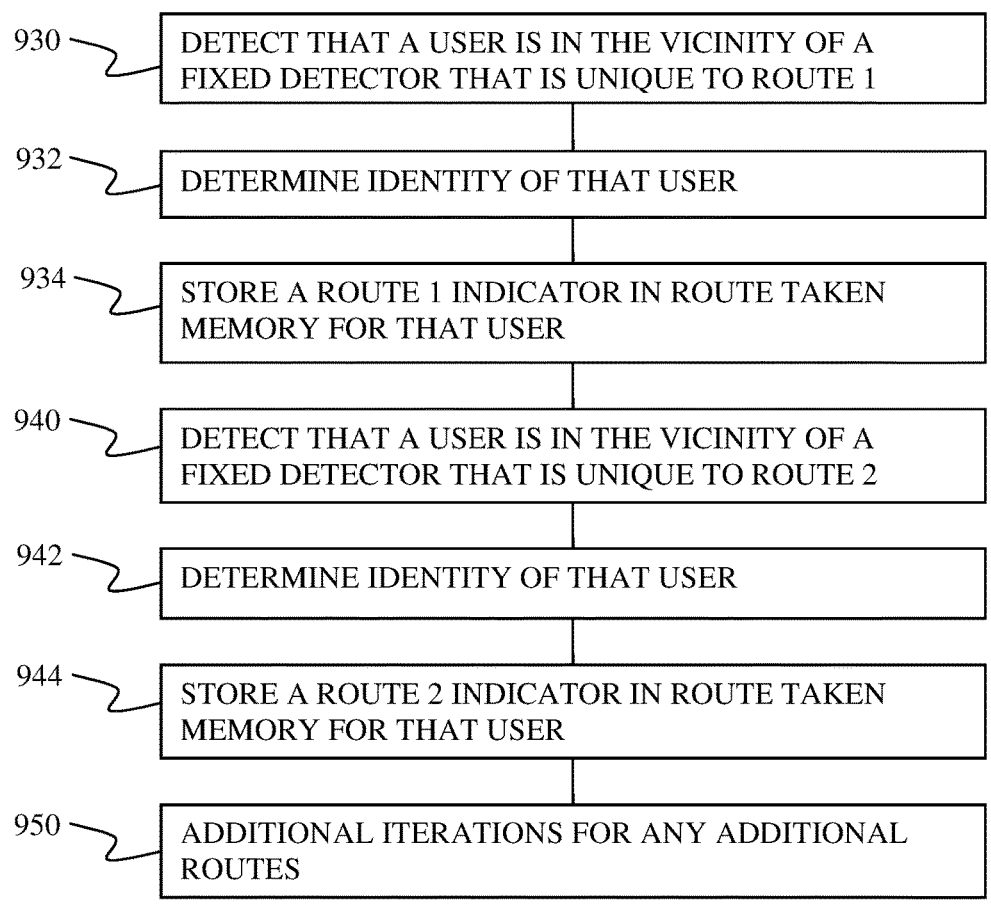
FIG. 26 is generally like FIG. 25, but for gathering other additional information about the performance of users in accordance with certain other possible aspects of the invention.

FIG. 26 shows another possible augmentation of the FIG. 23 embodiment that can be used to identify the route each of several users follows in the course of traversing the artificial cave. In step 930 a fixed detector 20 that is only responsive to a user who is in the "Route 1" part of the cave is employed. In the illustrative cave construction described in part by FIG. 15 this could be any of FD16-FD21. When a step 930 fixed detector detects the presence of a user, step 932 is performed to determine (from that user's unique helmet identifier) the identity of that user. Step 934 is then performed to store a "Route 1" indicator for that user in a memory of the system. This indicator can later be displayed (e.g., as in FIG. 22) in a "Route Taken" field or the like.

Steps 940, 942, and 944, are similar, respectively, to steps 930, 932, and 934. However, these steps are performed using a fixed detector that is only able to detect a user who is in the portion of the cave that is unique to "Route 2". For example, in a cave constructed as characterized in part by FIG. 15 this could be any of FD10-FD15. The result of performing steps 940, 942, and 944 is storage in system memory for any user identified in step 942 of a "Route 2" indicator. Again, this stored route information can be recalled from memory for inclusion in the "Route Taken" field of the display 110 (FIG. 22) ultimately shown to that user.

Element 950 in FIG. 26 indicates that there can be as many iterations of steps like 930, 932, and 934 as there are different possible routes through the artificial cave.

Once again, although just described as a way to augment the FIG. 23 embodiment, techniques as illustrated by FIG. 26 can be used as alternatives or additions to any other embodiment.

Another possible feature of the invention is to reward or credit users of the cave who affirmatively engage in desirable or good caving behaviors. For example, one or more of the "speleothems" 30 in the cave may be something that a "good" caver would know to remove from the cave. Such an item may be, for example, a previously discarded item of clothing (e.g., a shoe) or an article of human consumption (e.g., a soda can). In such cases good caver behavior is to pick up the item in preparation for removing it from the cave. (In some of this discussion the reference number 30, which is generally used to refer to a speleothem sensor associated with a speleothem, will sometimes be used to refer to as a speleothem itself.)

Figures 30, 31:
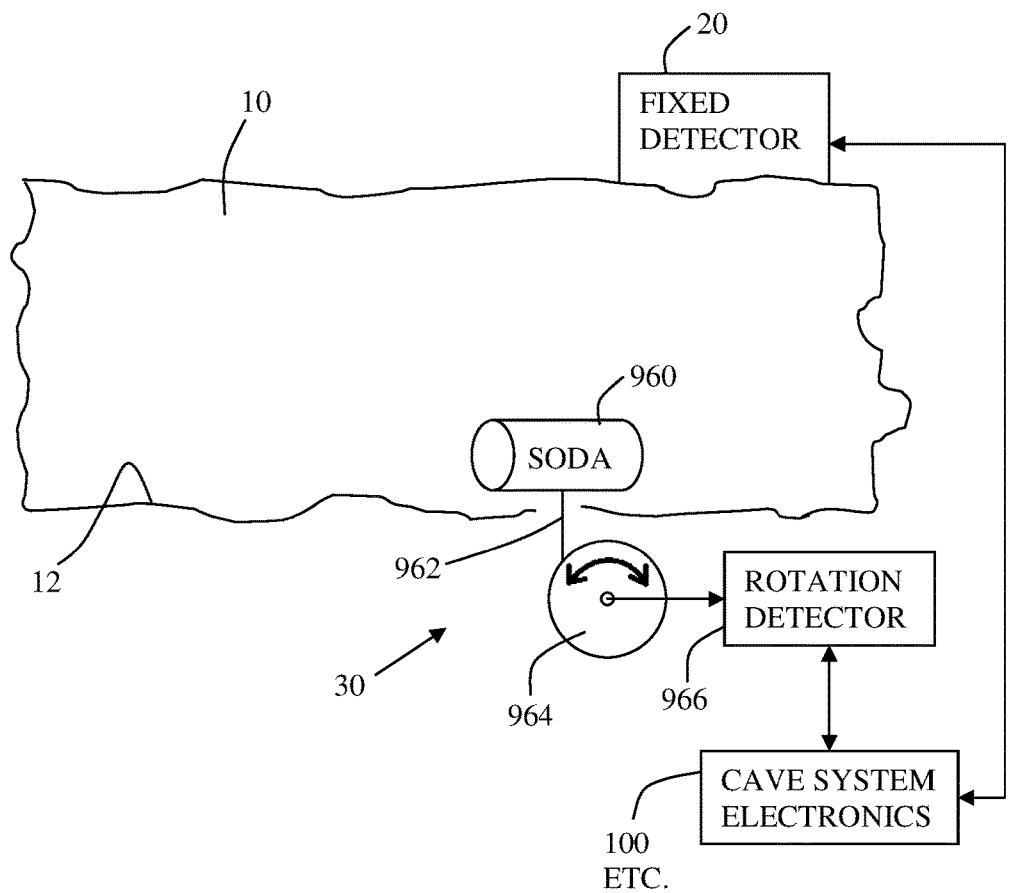
FIG. 30 is a table showing another possible aspect of the construction of an illustrative artificial cave in accordance with certain further possible features of the invention.
FIG. 31 is a simplified longitudinal sectional view (with some elements shown in schematic block diagram form) of an illustrative embodiment of a portion of an artificial cave in accordance with yet other possible features of the invention.

To test users of the artificial cave for such good behavior, one or more of the "speleothems" 30 in the cave may be a "special speleothem" made to include or resemble an item that should be removed from the cave. An illustrative embodiment of such a special speleothem 30 is shown in FIG. 31. In this example, special speleothem 30 includes a replica of a beverage can 960 disposed inside artificial cave passageway 10 so that it normally rests on the floor portion of the wall 12 of the artificial cave where it can be readily seen by a passing user traversing this part of the passageway. Beverage can replica 960 is permanently attached to the end of a wire or cable 962 that passes through an aperture in the cave wall to where an additional length of the wire or cable is wound around reel or spool 964, which is rotatably secured to the outer surface of the cave wall 12 or some other fixed structure. Spool 964 is spring-biased to retract wire or cable 962 so that beverage can replica 960 is resiliently held against cave wall 12 as shown in FIG. 31. However, the spring tension on can replica 960 via wire or cable 962 is not so great that it prevents a user of the cave who wants to exhibit good caver behavior from picking up can replica 960 and moving it away from its depicted at-rest position. This causes some of wire or cable 962 to pay out (extend, unwind, unreel) from spool 964, which causes spool 964 to rotate. Rotation of spool 964 is detected by rotation detector 966, which makes available to cave system electronics 100, etc., a signal indicating that a good caver behavior event has been detected at this special "reward" speleothem 30. When the user subsequently releases beverage can replica 960, spring-loaded spool 964 retracts wire or cable 962, which automatically restores the beverage can replica to its initial position as shown in FIG. 31.

For completeness, FIG. 31 also shows one of fixed detectors 20 in the vicinity of the special reward speleothem 30 shown in that FIG. This fixed detector 20 can be used as shown and described elsewhere in this specification to identify the particular user responsible for any good behavior with respect to the depicted reward speleothem 30 in embodiments in which there can be more than one user in the artificial cave at any one time.

As a matter of general principle, a "reward speleothem" and its associated "speleothem sensor 30" as just described are basically similar to other speleothems and speleothem sensors described herein. The main difference is that whereas most of the speleothems and sensors are intended to monitor inappropriate user interaction with the speleothem, a "reward speleothem" and its associated "speleothem sensor" are provided to monitor an affirmatively good behavior of a user. If such "good behavior" features are included, we turn now to further consideration of monitoring them and "rewarding" a user for exhibiting that good behavior. (A "reward speleothem" may also sometimes be referred to as a "credit speleothem.")

Continuing now with a discussion of how reward speleothems may be used, we consider an illustrative embodiment in which the speleothem monitored by the speleothem sensor 30 referred to as SS10 in FIG. 24 is a reward speleothem rather than the usual type of speleothem that a user of the cave should avoid. For purposes of such an embodiment FIG. 27 shows examples of user performance records similar to what is shown in FIG. 24, but with SS10 now monitoring a credit or reward speleothem. In FIG. 27 User A has basically performed the same way as shown for User A in FIG. 24, except that in FIG. 27 User A has affirmatively acted in such a way relative to the speleothem monitored by SS10 so as to earn a "credit" for this conduct. Such a credit is recorded in the FIG. 27 "speleothem Damage/Reward Record" as the value "−1". User A's "Total Damages" remains 5 in FIG. 27. But User A now has a "Total Credits" score of 1. If desired, User A's "Net Damages" score may be computed by reducing that user's "Total Damage" by the user's "Total Credits." Thus User A's "Net Damages" score in this example is 4.

FIG. 27 further shows the case in which User B does not act affirmatively (positively) with respect to the reward speleothem monitored by SS10. For example, if that reward speleothem is or resembles an item of trash that a good caver should pick up and attempt to remove from the cave, User B (unlike User A) does not engage in that instance of good caver behavior. In other words, User B ignores that reward speleothem, does not attempt to pick it up, and therefore does not earn the credit ("−1") that User A earned under the same circumstances. Thus User B's record for SS10 in FIG. 27 remains at its initial "0" value, and hence User B's "Total Credits" in FIG. 27 are also "0". Similarly, User B's "Net Damages" in FIG. 27 are the same as that user's "Total Damages."

Figure 28:
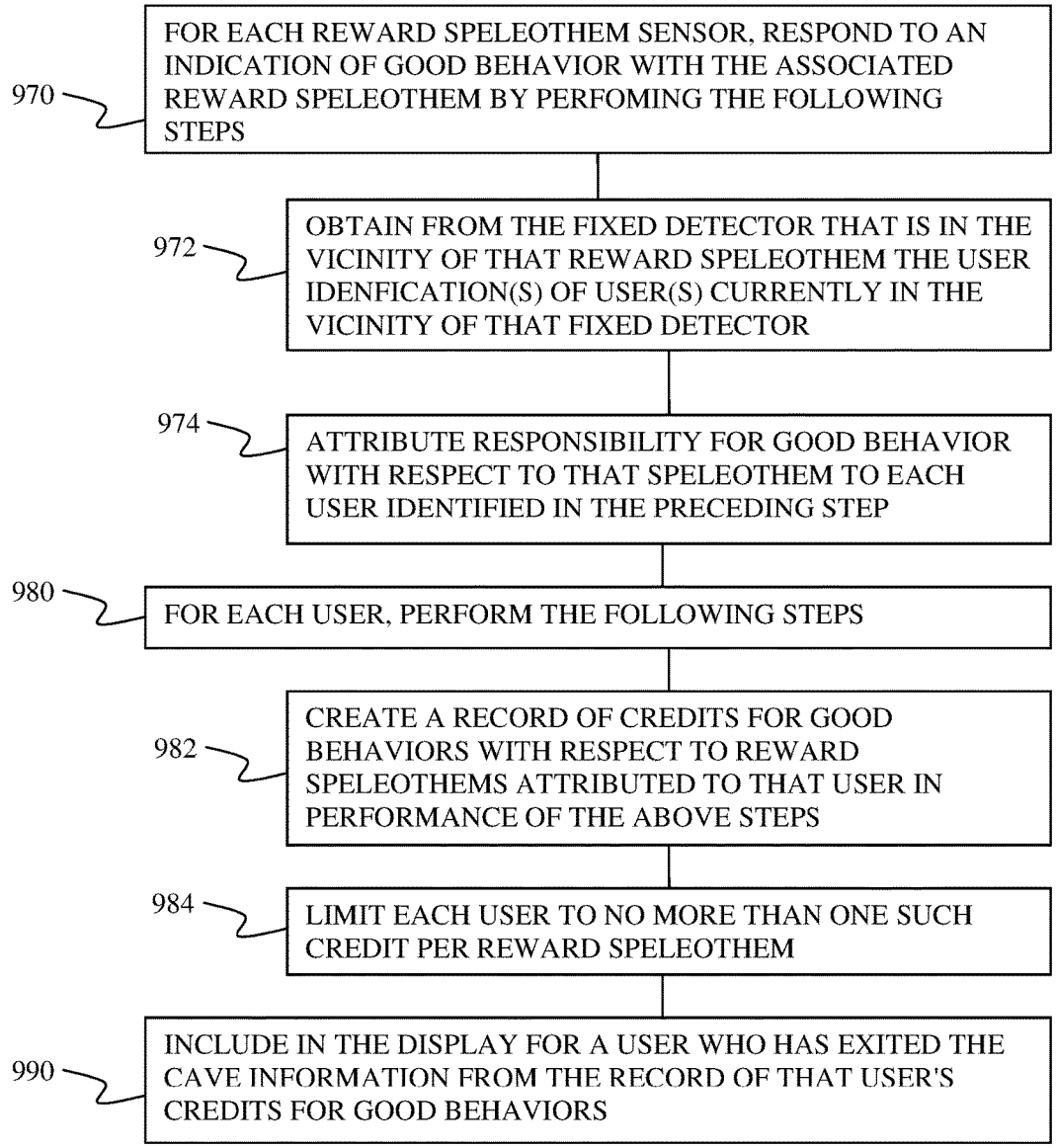
FIG. 28 is a diagram of additional illustrative functions or steps that can be performed to gather the additional information shown in FIG. 27 in accordance with possible aspects of the invention.

FIG. 28 shows how the procedure of FIG. 23 may be illustratively augmented (added to) to additionally keep track of each user's reward credits such as have just been described. Step 970 in FIG. 28 is similar to step 870 in FIG. 23, except that step 970 is performed to detect any good behavior with respect to each reward speleothem. Step 972 in FIG. 28 is similar to step 872 in FIG. 23, except that step 972 is performed to identify the user(s) currently near a reward speleothem for which a good behavior is occurring. Step 974 in FIG. 28 is similar to Step 874 in FIG. 23, except that step 974 is for attributing credit for a good behavior with respect to the reward speleothem of step 970 to the user(s) identified in step 972.

Step 980 in FIG. 28 is similar to step 880 in FIG. 23, except for credits rather than damages. Thus step 982 in FIG. 28 is similar to step 882 in FIG. 23, except that step 982 creates records of credits for good behavior by each individual user. Step 984 is provided in FIG. 28 to limit each user to no more than one credit for any reward speleothem. This prevents a user from improperly inflating that user's credit score by repeatedly manipulating any of the reward speleothems.

Step 990 in FIG. 28 adds to steps like 890, 892, and 894 in FIG. 23 by providing for the inclusion in the display provided to a user who has exited the cave information about any credits that user has earned. For example, FIG. 29 shows how the illustrative display of FIG. 22 may be augmented with "Total Credits" and "Net Damages" fields (e.g., as from those same lines in FIG. 27) as consequences of a performance of step 990 for any given user.

FIG. 29 shows another item of information that may be provided to a user on that user's post-exit information display 110. This additional item is a field for the "Maximum Possible Credits" on the "Route Taken" by that user in traversing the cave. The information supplied in this field can come from a table in memory like that shown in FIG. 30. This is a table that shows how many "reward speleothems" the cave has been constructed to have along each possible route through the cave. In the particular example shown in FIG. 30 each route takes a user past only one "reward speleothem". There could, of course, be zero or more than one reward speleothem along any of the various routes, and whatever the number on each route, that number would be shown in the FIG. 30 table. Then when a user has exited the cave and that user's route has been determined as described earlier, the "Maximum Possible Credits on Your Route" field of the user's display 110 can be filled by recourse to the FIG. 30 table to supply the maximum credits number for that route. Giving a user this maximum number of credits number allows the user to additionally assess how well he or she did in terms of good caver behavior.

Although FIGS. 28-30 detail how an embodiment like FIG. 23 can be augmented to add giving possible rewards or credits to users, those skilled in the art will understand from this example how other embodiments such as the FIG. 13 embodiment can be similarly augmented to add credits for good user conduct with respect to reward speleothems. For example, in FIG. 18 or FIG. 19 a detected good behavior can be indicated by a "4" entry, rather than a "1" entry indicating speleothem damage. This "4" entry information becomes corresponding "−1" information in records like those shown in FIGS. 20 and 21. With the availability of such "4" entries in these records, any user's FIG. 22 display can be augmented with "Total Credits" and "Net Damages" fields, etc., exactly as shown in FIG. 29.

Although an embodiment like that shown in FIG. 13 may involve the collection of more data or information than an embodiment like FIG. 23, a FIG. 13-type embodiment makes available information that can help to support other capabilities that may be desired. For example, full time-and-location tables like FIGS. 16 and 17 can be used to facilitate monitoring the progress of each user through the cave, identifying the current location of each user in the cave, mapping of each user's transit of the cave, etc. Some or all of these capabilities can also be provided with other embodiments, although possibly with the addition of further steps for supporting the desired capability or capabilities. Such further steps, if desired, will be apparent to those skilled in the art from what has been shown and described in detail above.

Various embodiments of the invention employ data gathering by the fixed detectors 20 regarding the identities of any users who are currently (or were recently) in the vicinity (i.e., the broadcast signal reception area exemplified by any individual shaded area 20-1R, 20-2R, 20-3R or the like in FIG. 4 and described earlier in this specification) of each fixed detector 20. As is also described earlier in this specification, each fixed detector 20 can gather this data by broadcasting a request that any wearable transceiver 50 in its reception area respond by broadcasting its user identification signal. This request broadcasting can be done periodically by each fixed detector 20 and/or whenever each fixed detector 20 is instructed by higher-level system components (e.g., 100 or 150 in FIG. 3) to make such a request broadcast.

Another way that the fixed detectors 20 can gather information about the users that are currently (or were recently) in their vicinity is for each wearable transceiver 50 to periodically broadcast its user identifying signal, and for each fixed detector 20 to receive any such broadcast in its broadcast signal reception area. To avoid more than occasional temporal overlapping of user identifying signals broadcast by multiple wearable transceivers in the vicinity of any fixed detector 20, each wearable transceiver 50 preferably broadcasts its information with a different periodicity than all other wearable transceivers 50. For example, if the total number of wearable transceivers is 20, then each may operate with a respective one of the following periodicities (expressed in seconds): 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, and 3.9. Note that these periods are all different from one another and that none of these periods is an integer multiple of any of the other periods. It is assumed in this example that it takes much less than 0.1 seconds for each wearable transceiver 50 to complete each iteration of the transmission (broadcast) of its user identifying signal information. In this way, even if several wearable transceivers 50 are in the vicinity of a fixed detector 20, that fixed detector will soon receive a signal from each of those wearable transceivers that does not temporally overlap with the outputs of any others of those wearable transceivers. (Even if there are as many as 20 available wearable transceivers 50 as assumed earlier in this paragraph, it is unlikely that more than a few of those transceivers will be in the vicinity of any fixed detector 20 at any given time.) A fixed detector 20 can therefore readily identify each user who is currently in the vicinity of that fixed detector. In effect, in this type of embodiment the fixed detectors 20 receive user identification information somewhat passively and asynchronously.

Continuing the discussion of this type of embodiment, each fixed detector 20 may maintain a list of the wearable transceiver 50 identifications (and therefore the user identifications) it has recently received. For example, a count-down timer can be associated with each user identification in the list maintained by each fixed detector 20. Such lists and count-down timers can be implemented in the software of each fixed detector 20 that at least partly controls the operation of that fixed detector. When a fixed detector receives a user identification that is not already in its list, the fixed detector adds that new user identification to its list and initializes the count-down timer associated with that user identification to some appropriate starting value (e.g., 12 seconds, 15 seconds, or some other predetermined suitable value). When a fixed detector 20 receives a user identification that is already in its list, the fixed detector restarts the count-down timer associated with that user identification. When the count-down timer for any user identification in the list of a fixed detector 20 times out (i.e., counts down to zero), the fixed detector deletes that user identification from its list.

Returning to a situation in which a fixed detector 20 has just received a new user identification (i.e., a user identification that is not already on its list of such identifications), that fixed detector may (in addition to previously described activities) send an "interrupt" to upstream system components (e.g., elements 100 and/or 150 in FIG. 3) to signal that it has new user location information to report. When the upstream circuitry is ready to receive that new information, the upstream circuitry signals the fixed detector 20 that is requesting attention to send its report upstream. The fixed detector 20 then sends its new user location information upstream where it can be used for any of the purposes described herein (e.g., tracking and possibly mapping the current locations of all users, determining the route taken by each user, etc.). As part of this transmission the fixed detector 20 may also send upstream any other information available to it, such as all the other "older" user identifications still in its list of such identifications. Again, the upstream components may make any desired use of this other information, such as maintaining on a map of all current user locations the user identifications of all users still apparently in the vicinity of that fixed detector (e.g., even though such a user may also have been more recently detected in the vicinity of another fixed detector).

Figure 32:
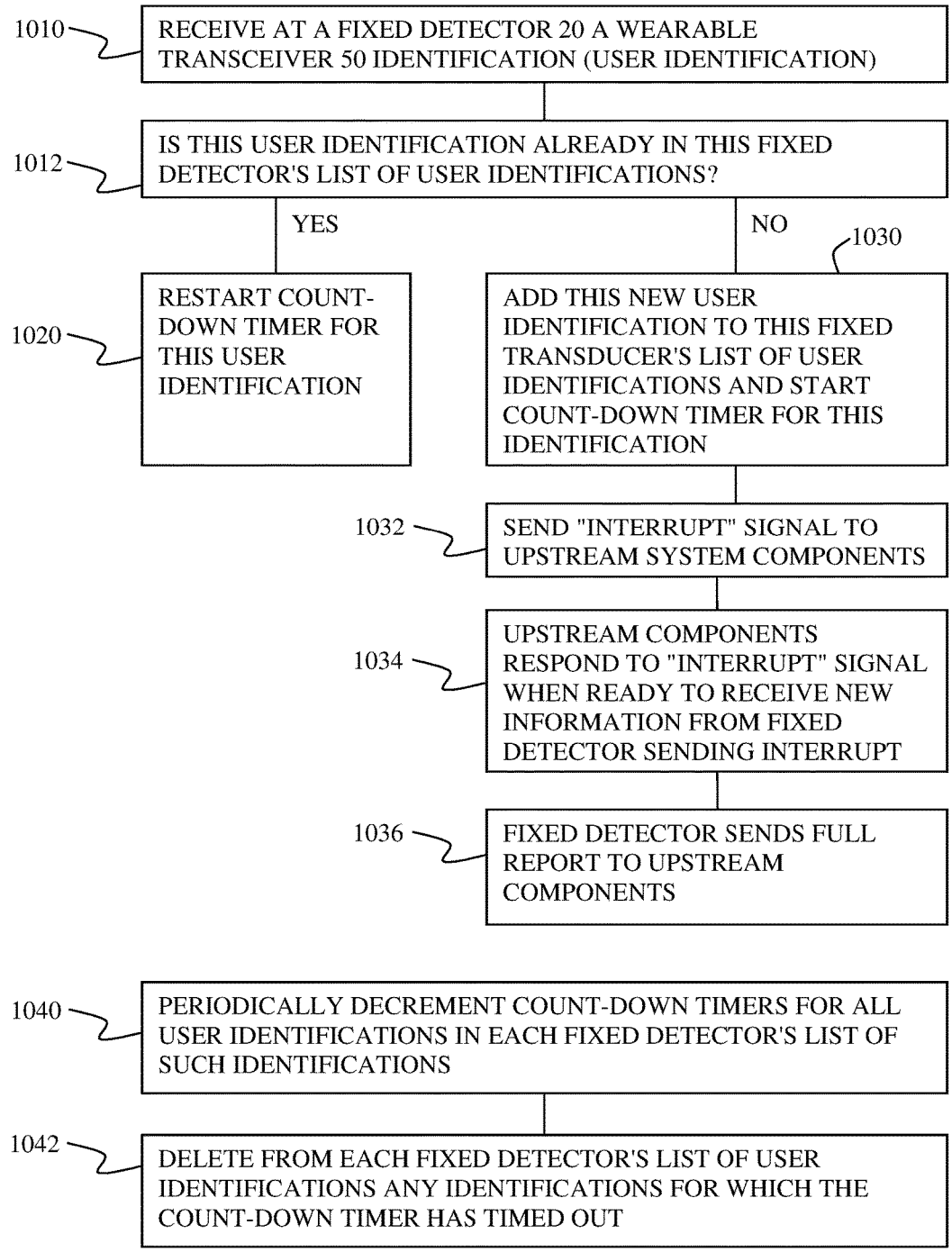
FIG. 32 (comprising parts 32a and 32b) is a diagram of illustrative alternative or additional steps that can be performed (e.g., in and using system elements such as are shown in earlier FIGS.) to achieve certain possible aspects of the invention.

FIG. 32 illustrates steps that can be performed (e.g., in various components in a system like that shown in FIG. 3) to implement embodiments like those that have been described in the preceding several paragraphs. The steps shown in FIG. 32 are preferably carried out in parallel (i.e., simultaneously or substantially simultaneously) in and/or for each of the fixed detectors 20 in the system.

Step 1010 in FIG. 32 shows a typical fixed detector 20 receiving a user identification form any wearable transceiver 50 in the broadcast signal reception area of that fixed detector. In step 1012 the fixed detector 20 determines whether or not that user identification is already in the list of user identifications that fixed detector is currently maintaining. If so, step 1020 is performed to restart (re-initialize to some predetermined suitable time value) the count-down timer for that user identification. On the other hand, if step 1012 determines that a user identification that has been received is not already in the list of such identifications being maintained by the fixed detector 20 being considered, then step 1030 is performed.

Step 1030 treats the just-received user identification as the identification of a user who has newly arrived in the vicinity (broadcast signal reception area) of the fixed detector 20 being considered. Accordingly, step 1030 causes this new user identification to be added to this fixed detector's list of current (or at least relatively recent) identifications of users who are in the vicinity of this fixed detector. Step 1030 also starts (initializes) a count-down timer for this new user identification.

Following step 1030, step 1032 causes the fixed detector 20 being considered to send an interrupt request to upstream (higher-level) components of the system (e.g., elements 100 and/or 150 in FIG. 3) in order to begin the process of that fixed detector reporting to those upstream components that it has detected arrival of a new user in its vicinity.

Step 1034 shows that when the upstream system components are ready to receive more information from a fixed detector 20 that has requested attention by having sent an interrupt signal, the upstream components reply to indicate that readiness. In response to that reply, the fixed detector 20 being considered sends what it has to report to the upstream components. Such a report will typically include the identification of the user that the fixed detector has newly detected. This report may also include other data from the fixed detector, such as all the user identifications in that fixed detector's list of such identifications with the current count-down timer value for each such identification.

Independent of the operations associated with all other steps in FIG. 32, steps 1040 and 1042 show that each fixed detector 20 periodically decrements all of its count-down timers (step 1040) and deletes from the list of user identifications it is maintaining any user identification for which the associated count-down timer has counted down to zero. In this way the list of user identifications maintained by each fixed detector 20 remains an indication of the users who are currently in the vicinity of that fixed detector (or who were at least quite recently in that vicinity).

It should be noted that a system that operates in accordance with all of FIGS. 23, 28, and 32 (and possibly also FIGS. 25 and 26) provides another example of a complete system for both (1) keeping track of the locations of all users at substantially all times while they are in the cave, and (2) being able to rapidly identify and report the user who is (or the users who are) most likely responsible for an inappropriate (or alternatively a rewardable) interaction with a speleothem. In connection with item (2) in the immediately preceding sentence, whenever step 872 in FIG. 23 or step 972 in FIG. 28 is performed to request that a fixed detector 20 report the users who are currently in the vicinity of that fixed detector, the fixed detector can respond with the list of such users it is maintaining as shown in FIG. 32 and as described above in connection with that FIG.

Figure 33:
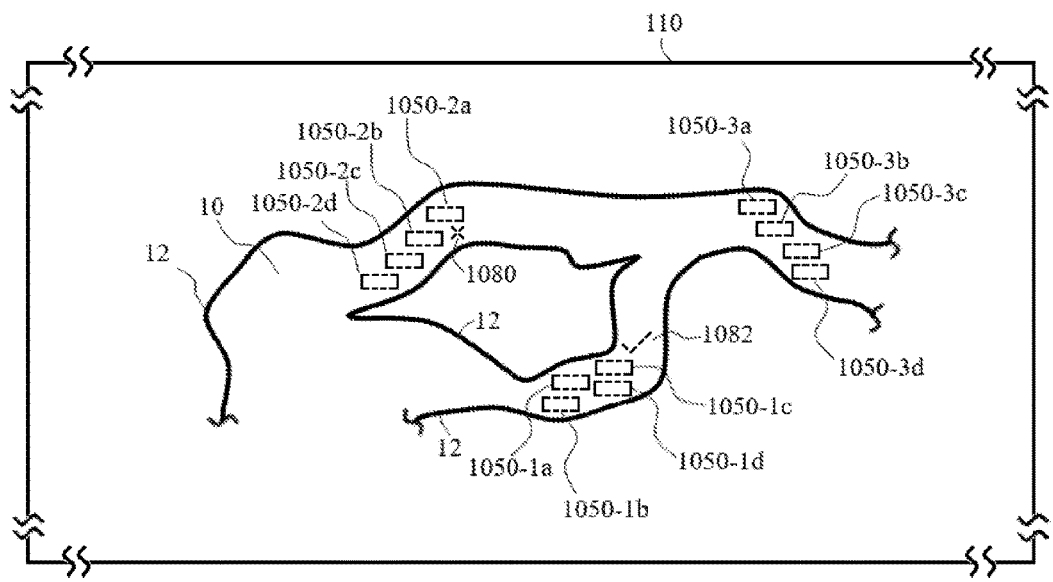
FIG. 33 is an illustrative display (map) of a representative portion of a typical artificial cave in accordance with certain possible aspects of the invention for the purpose of showing how users are currently performing (or previously performed) in certain respects in the cave.

A possible feature of systems in accordance with the invention is to provide various kinds of maps of how a user has travelled through the artificial cave. For example, one useful and interesting type of such a map can be a "real-time" graphical display (e.g., on a computer screen such as one or more displays 110 in FIG. 3) of where each user currently is in the cave passageway 10 (e.g., FIG. 1). As just an example of a small representative portion of such a real-time mapping display, FIG. 33 shows how the portion of the cave shown in FIG. 4 may be shown on a portion of a display (e.g., computer monitor) 110. As in FIG. 4, the depicted portion of cave passageway 10 is shown as though mapped from above, with cave side walls 12 shown on either side of the passageway 10 that is traversable by user-cavers. Again, it is emphasized that FIG. 33 shows only an illustrative portion of the viewable area of display 110 and a corresponding small portion of the full map of the artificial cave. In actual practice the map on display 110 is preferably more extensive, most preferably a map of the entire artificial cave. In such a map any portions of the cave that pass under other portions of the cave may be shown on the map using dotted lines. (For example, there is one such dotted line portion of the cave in the FIG. 1 cave diagram.) Any caver icons, speleothem damage icons, or reward icons (described later in this specification and respectively reference-numbered 1060, 1080, and 1082) that need to be shown in such a dotted line portion of a cave map display can also be shown in dotted lines to help signify that what those icons identify are located in a portion of the cave that is under another (solid line) portion of the cave.

Comparing FIG. 33 to FIG. 4, it will be seen that in FIG. 33 several areas 1050 of the mapped passageway 10 at or near the location of each fixed detector 20 (FIG. 4 only) are reserved for display of icon-like display elements that can be used to identify each user who has currently (or at least recently) been detected to be in that area in the cave. For example, FIG. 33 shows four such areas 1050-1a through 1050-1d reserved for as many as four such user icon displays in the area 20-1R of the cave monitored by fixed detector 20-1 (FIG. 4). Similarly, FIG. 33 shows four such possible icon-display areas 1050-2a through 1050-2d in the portion of the cave map display monitored in the corresponding area 20-2R in the actual cave by fixed detector 20-2 (FIG. 4). Yet another example is the actual cave area 20-3R monitored by fixed detector 20-3 (FIG. 4), for which icon-display areas 1050-3a through 1050-3d are reserved in the corresponding portion of the cave map display in FIG. 33. In the absence of any actual icon information (further described below), nothing about any of reserved areas 1050-1a, 1050-1b, etc., in FIG. 33 may be visible to the viewer of the FIG. 33 display. Only the icons that may be inserted in those reserved areas may be visible to a viewer of the display. On the other hand, the display 110 shown in FIG. 33 is preferably driven by software of the system to always show the solid line cave wall lines 12 whenever the display is on and ready for user mapping as is here being described.

Figure 34:
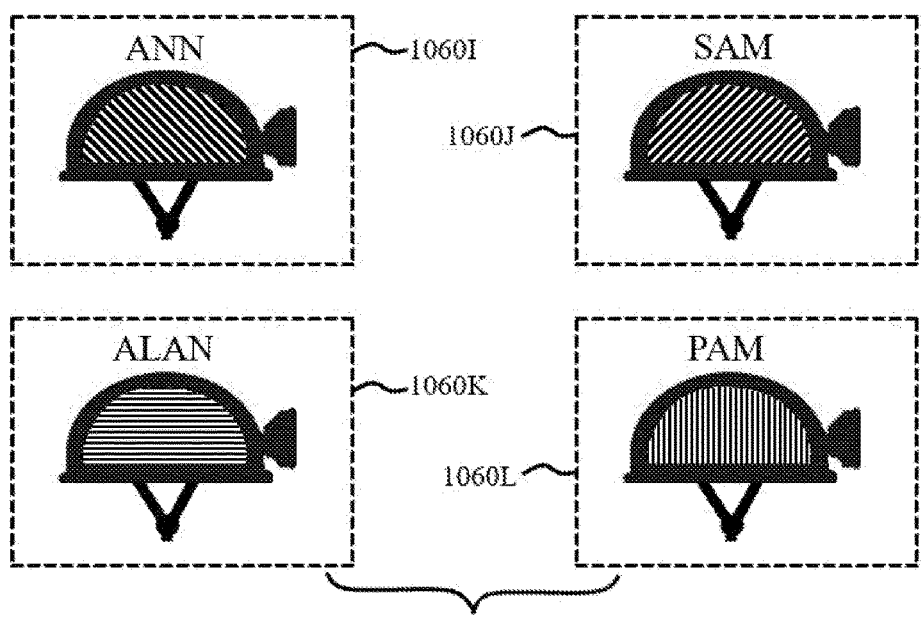
FIG. 34 shows several examples of icons that may be used in displays such as FIG. 33 to represent the positions of various users in an artificial cave at various times in accordance with certain possible aspects of the invention.

FIG. 34 shows an example of the kind of icon-like information that may be inserted and thereby displayed in any of the reserved areas 1050 in a cave-map display like that illustrated by FIG. 33. As shown in FIG. 34, each such icon may include the outline of a side view of a typical caver's helmet (see FIG. 2), with letters for a particular user's name above it. To help further quickly find a particular user on a cave map display like FIG. 33, each helmet icon 1060 may be colored using a distinctively different color, such as blue or red or green or yellow, etc. These possibly different colors are indicated by the different shading used on the various representative helmet icons shown in FIG. 34. The system can add any name desired by each user to the icon 1060 that will be used for that user while that user is in the cave. In the example shown in FIG. 34 the name "ANN" has been included in icon 1060I at the request of user Ann. Similarly, the names "SAM", "ALAN", and "PAM" have been included in icons 1060J-L, respectively.

It will be understood that the number of reserved areas 1050 in each region of the FIG. 33 map can be more or less than the number shown in FIG. 33. Similarly, the four icons shown in FIG. 34 are only examples and more than four different icons can be available if desired. Also, a user can preferably enter any desired name for inclusion in his or her icon. Still further, the icons do not have to have the appearance shown in FIG. 34 but can instead have any other suitable appearance. As just one such possible variation, name-only icons can be used if desired.

Further consideration will now be given to an illustrative system for real-time mapping of the progress of users through cave. For convenience in this discussion it is assumed that certain aspects of the system operate as described above in connection with FIG. 32. Assume, for example, that fixed detector 20-1 in FIG. 4 has newly detected user Ann in the vicinity of that fixed detector. This causes performance of step 1030 for user Ann in FIG. 32. As an ultimate consequence of this performance of step 1030, fixed detector 20-1 reports user Ann as a new arrival in its vicinity to upstream system components such as 100 and/or 150 in FIG. 3 (steps 1032, 1034, and 1036 in FIG. 32). These upstream components retrieve user Ann's icon 1060I from system memory and cause that icon to be displayed in any one of the reserved areas 1050-1a through 1050-1d that is not already being used for display of another user's icon. Upstream system components 100 and/or 150 keep this reserved area displaying Ann's icon 1060I at least until some other fixed detector 20 reports that it has detected user Ann as a new arrival in its vicinity. When that happens, upstream system components 100 and/or 150 may cease to display Ann's icon in one of reserved areas 1050-1a through 1050-1d and begin to display that icon in one of the similarly reserved map display areas associated with user Ann's detected new location in the cave. For example, if user Ann moves on from the vicinity of 20-1R of fixed detector 20-1 in FIG. 4 to the vicinity of 20-3R of fixed detector 20-3 in FIG. 4, upstream system components like 100 and/or 150 may cause user Ann's icon 1060I to correspondingly "move" from appearing in one reserved area 1050-1a through 1050-1d to appearing in any available one of reserved areas 1050-3a through 1050-3d in the FIG. 33 map display. In this way any human companion of user Ann (or anyone else) who is not in the cave and who is positioned to see the cave map on display 110 can watch user Ann's progress through the cave in real time (i.e., concurrently with user Ann's actual movement through the cave).

Another use that can be made of a map display like that shown in FIG. 33 is to replay for a user who has exited the cave that user's traversal of the cave. A way that this can be done is to store or record in memory of the system data about what was displayed on cave map display 110 for each user as that user passed through the cave. Then after a user has exited the cave, the data that was stored or recorded for that user's traversal of the cave can be replayed on a map display (like FIG. 33) for viewing by that user. Assuming that the earlier-described "real-time" cave map display is still in use for other users, a separate similar cave map display 110 can be used for viewing any such "replay" information.

Figure 35:
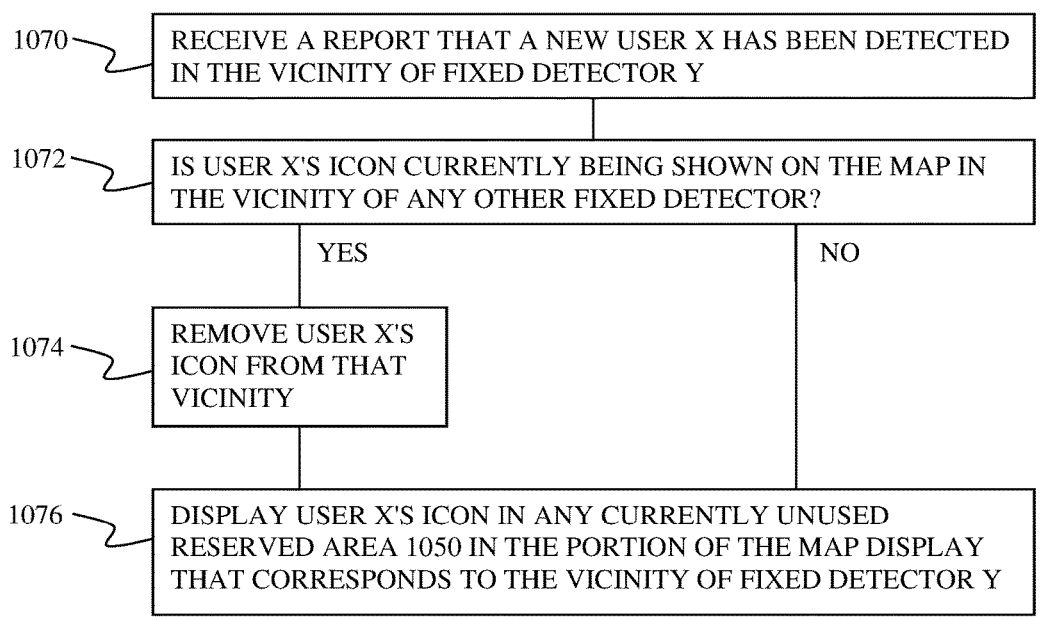
FIG. 35 is a diagram of illustrative steps that can be performed in various artificial cave system components for such purposes as providing and supporting certain aspects of displays like FIG. 33 in accordance with certain possible aspects of the invention.

FIG. 35 shows examples of some operations that can be performed in various components of the system (e.g., as in FIG. 3) to provide and support real-time map display of the locations of users in the cave (e.g., as in FIG. 33, with addition of user-specific icons such as shown in FIG. 34 at appropriate map locations and at appropriate times).

In step 1070 the map-controlling software (e.g., in system components such as 100 and/or 150 in FIG. 3) receives a report that some one of fixed detectors 20 (i.e., "fixed detector Y") has detected that a user (i.e., "user X") has newly arrived in the vicinity (broadcast signal reception area) of that fixed detector. In a system operated in other respects in accordance with FIG. 32, such a report of a new user location can come from a performance of step 1036 in FIG. 32.

Step 1072 checks to determine whether user X's icon (e.g., like an icon 1060 in FIG. 34) is currently being shown on the FIG. 33 map in relation to any fixed detector other than fixed detector Y. If so, step 1074 is performed to remove that appearance of user X's icon from the map display, and control then passes to step 1076. On the other hand, if it is not necessary to perform step 1074, then control passes directly from step 1072 to step 1076.

Step 1076 causes user X's icon 1060 to appear in any currently unused reserved area 1050 in the region of the FIG. 33 map display that shows the vicinity of fixed detector Y. For example, if user X is user "Alan" (icon 1060K in FIG. 34), and if fixed detector Y is fixed detector 20-3 in FIG. 4, then step 1076 in FIG. 35 causes icon 1060K to be displayed in any available one of reserved areas 1050-3a through 1050-3d in FIG. 33.

To possibly add another element of information and interest to a map display like 110 in FIG. 33, additional image areas like 1080 and 1082 can be reserved. For example, image area 1080 can be reserved at a map location that corresponds to the location of a speleothem in the cave that a user should avoid interacting inappropriately with. Such a reserved image area 1080 may have the shape of an X, which the system can illuminate (e.g., in red) for a predetermined time interval whenever an inappropriate user interaction with the associated speleothem is detected. Such a red X display tells any viewer of the FIG. 33 map in "real time" that there has been "damage" to the speleothem at the corresponding location in the cave. Such a red X is therefore an example of a "speleothem damage icon" that may be displayed on a map like that shown in FIG. 33. Because the currently nearby cavers are concurrently identified by their icons 1060 appearing on the same FIG. 33 map, the viewer of the map can also tell which of several possible users is probably responsible for that speleothem damage.

Similarly, image area 1082 can be reserved at a map location that corresponds to the location of a "reward" speleothem (e.g., as in FIG. 31) that a user should positively interact with to demonstrate "good" caver behavior. Such a reserved image area 1082 may have the shape of a check mark, which the system can illuminate (e.g., in green) for a predetermined time interval whenever a rewardable interaction with the associated reward speleothem is detected. Such a green check mark display (an example of a "reward icon") tells any viewer of the FIG. 33 map in real time that a user has performed a good caver behavior. Again, because the locations of all cavers are also concurrently identified by their icon 1060 locations on the map display, the viewer of the map display can determine which user was probably responsible for the good behavior.

Figure 36:
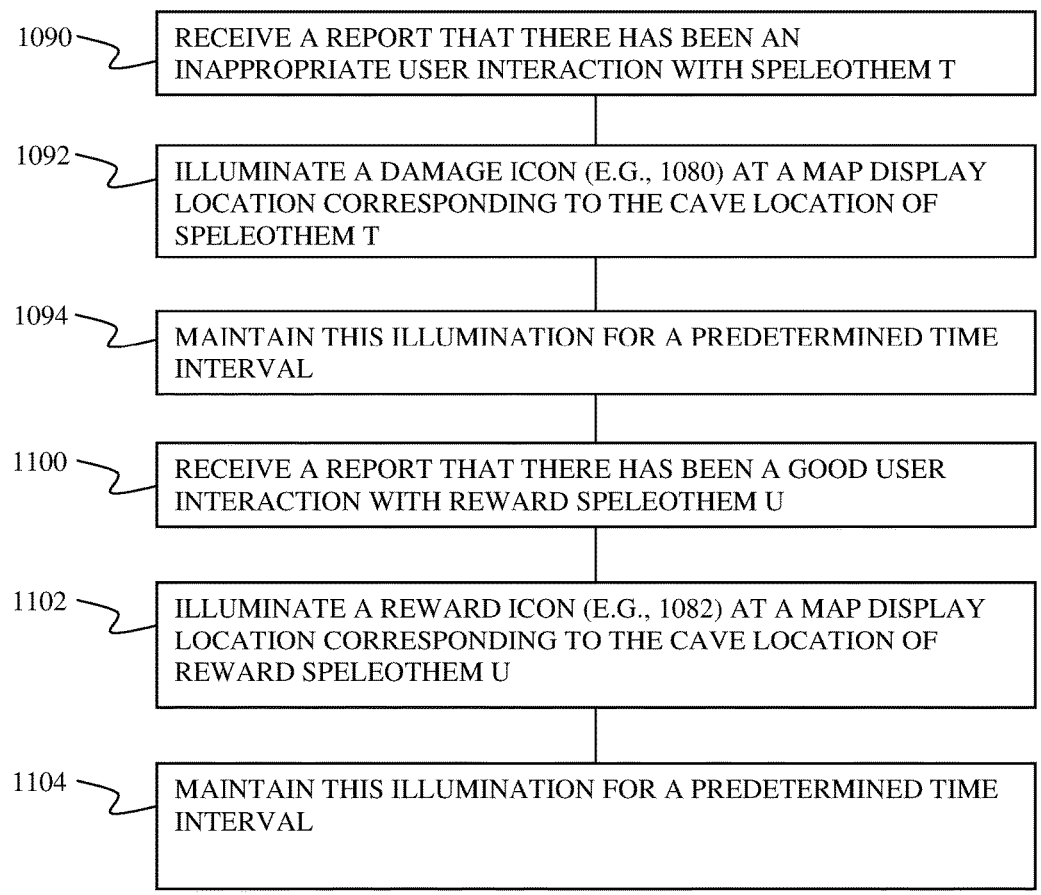
FIG. 36 is a diagram of illustrative further steps that can be performed in various artificial cave system components for such purposes as providing and supporting certain other aspects of displays like FIG. 33 in accordance with certain further possible aspects of the invention.

FIG. 36 shows illustrative steps that can be performed (e.g., in various components of the system shown in FIG. 3) to support display of damage icons and/or reward icons like 1080 and 1082 in map displays like 110 in FIG. 33. In step 1090 a report of an inappropriate user interaction with a typical damageable speleothem T is received by system control elements (e.g., 100 and/or 150 in FIG. 3) from the speleothem sensor 30 (e.g., FIG. 1) associated with that speleothem. Step 1092 is then performed to illuminate the damage icon (e.g., 1080) at the map display location that corresponds to the location in the cave of damaged speleothem T. Step 1094 keeps the above-mentioned damage icon illuminated for a predetermined interval of time (e.g., 5 seconds, 10 seconds, or any other suitable and desired amount of time). Thereafter that damage icon illumination is discontinued (turned off).

Step 1100, 1102, and 1104 are similar or analogous for reward speleothems and the associated reward icons (like 1082 in FIG. 33). In step 1100 a report of a positive user interaction with a typical reward speleothem U is received.

In step 1102 the reward icon (like 1082) at the map display location that corresponds to the cave location of reward speleothem U is illuminated. Step 1104 keeps that reward icon illuminated for the desired predetermined time interval, after which the reward icon is extinguished again.

FIGS. 37 and 38 show illustrative information that may be stored (e.g., in memory components of the FIG. 3 system) during operation of the artificial cave to facilitate allowing a user who has traversed the cave to subsequently replay for viewing by that user what that map display (e.g., as in FIG. 33) showed as that user travelled through the cave. FIG. 37 is a memory table 1110 in which for each user of the artificial cave that user's "external" name, "internal" name, cave entering time, and cave exiting time are stored in association with one another (as in each horizontal line in table 1110). A user's "external" name is the name a user chooses to be known as by other individuals and can be part of that user's map display icon 1060 as shown, for example, in FIG. 34. A user's "internal" name is the unique user identification associated with the particular wearable transceiver 50 (helmet 52) that has been given to that user for use while in the cave. A user's cave entering time is the time on some relatively long-running clock in the FIG. 3 system when that user first entered the cave (e.g., via entrance 13 in FIG. 1). A user's cave exiting time is similar but for the time on the same clock when the user exited the cave (e.g., via exit 15 in FIG. 1). The just-mentioned clock may be a real-time clock in the sense that it may run at the same rate that clocks in ordinary daily human use run. Although this clock may digitally increment at any other suitable real-time rate, it may be sufficient for present purposes for it to increment at one-second time intervals. Thus, for example, FIG. 37 shows that user Ann's cave entering time was recorded as having occurred at 5 seconds on this clock, and her cave exiting time was recorded as having occurred at 245 seconds on this clock. For convenience herein this clock may sometimes be referred to as the map display reference clock.

FIG. 38 shows a map display image data table 1120 that may also be contained in memory of the FIG. 3 system. The left-hand column of this table contains successive time values from the map display reference clock. The right-hand column of this table contains data needed to recreate (regenerate) the map display (e.g., FIG. 33) as it appeared at successive map display reference clock times. For example, the first horizontal line in FIG. 38 stores the data that was used to create the map display in real time when the time on the map display reference clock was 00001. Similarly, the second horizontal line in FIG. 38 stores the data that was used to create the map display in real time when the time on the map display reference clock was 00002. Subsequent lines in table 1120 are similar for each successive map display reference clock time increment. The map display image data in each line of table 1120 can be captured from the system components that drive map display 110 (FIG. 33) during the initial, real-time display use of that data at the time on the map display reference clock on that same line of table 1120. In other words, while display 110 is initially operating in real time to show various conditions in the cave (i.e., in-cave locations of various users via icon 1060 placements 1050, speleothem damage occurrences via damage icons 1080, speleothem reward occurrences via reward icons 1082, etc.), the data being used to drive the display can be periodically captured and stored in successive lines in memory table 1120. The time on the map display reference clock at the time of each such line of map display data capture and store is recorded (stored) on that same line in the time column of table 1120. Thus, again assuming one-second time intervals between such map display data capture and stores, successive lines in table 1120 are from 1 seconds, 2 seconds, 3 seconds, 4 seconds, etc., on the map display reference clock.

Figure 39:
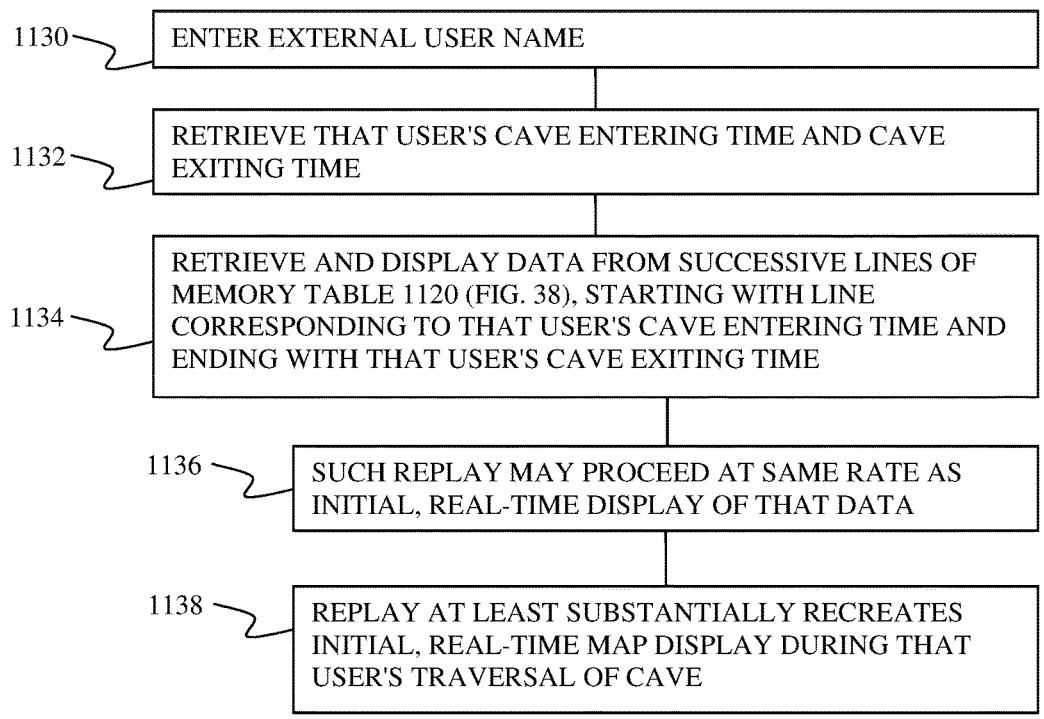
FIG. 39 is a diagram of illustrative steps that can be performed (e.g., in and using system elements such as are shown in earlier FIGS.) to employ data such as is shown in FIGS. 37 and 38 for such purposes as replaying displays like FIG. 33 in accordance with certain possible aspects of the invention.

FIG. 39 shows steps that can be performed (e.g., in various system components in FIG. 3) to replay any portion of what has been previously shown in real-time on map display 110 (FIG. 33) to (for example) allow a user who has traversed the artificial cave to see what was displayed during that user's traversal of the cave. In step 1130 a user who wishes to see such a map display enters his or her external name into the system (e.g., via a data entry device such as a keyboard near the replay display). The replay display can be display 110 (FIG. 33) or another separate iteration of that same type of display. The term "replay display" will sometimes be used herein as a generic term for either of the just-mentioned possibilities.

In step 1132 the external user name that has been entered is used to retrieve from memory table 1110 (FIG. 37) that user's cave entering time and cave exiting time.

In step 1134 the entering and exiting times retrieved in step 1132 are used to locate the lines in memory table 1120 (FIG. 38) where map display data retrieval for replay on the replay display should begin and end. Step 1136 indicates that such data retrieval from table 1120 and consequent map display replay may proceed at the same rate as the initial real-time display of that data while the user was actually in the cave. In this way (as step 1138 indicates) the replayed map display can substantially recreate the initial, earlier, real-time map display during that user's time in the cave. The user can follow his or her progress through the cave by observing at what locations 1050 (FIG. 33) his or her user icon (FIG. 34) appears over time. The user can also see what if any speleothem damage 1080 and/or reward 1082 icons appear while he or she was at or near the corresponding speleothem locations. Such a replay experience can add to a user's information about and enjoyment of the artificial caving activity.

Although in the foregoing, fixed detectors 20 and speleothem sensors 30 are generally shown at different locations along artificial cave passageway 10, it should be understood that this is not necessary in all cases. In particular, any speleothem sensor 30 can be at or very close to the same location along passageway 10 as a fixed detector 20.

What is claimed is:

1. A method of operating an artificial cave traversable by human users such that more than one user can be present in the cave at one time, each user wearing a wirelessly detectable identifier that uniquely identifies that user, the cave including a plurality of fixed detectors spaced throughout the cave, each fixed detector being able to wirelessly identify any user who is in the vicinity of that fixed detector by means of the identifier of that user, the cave further including a plurality of artificial speleothems spaced throughout the cave and positioned in the cave so that each user is challenged to exercise care in order to pass each speleothem without touching the speleothem and thereby interacting inappropriately with the speleothem, each speleothem including a sensor for indicating occurrence of such an inappropriate interaction with the speleothem, and each speleothem being in the vicinity of a respective one of the fixed detectors such that a user who may interact inappropriately with that speleothem is identifiable by that fixed detector, the method comprising:

for each speleothem sensor, electronically transmitting from that sensor to a central electronic system that serves all of the sensors and all of the fixed detectors an indication of detection of an inappropriate interaction with the speleothem of that sensor, and registering that indication and time of occurrence of that indication in the central electronic system;

for each fixed detector, electronically transmitting to the central electronic system information constituting a report indicative of the identity of a user detected in the vicinity of that fixed detector, and registering that report and time of occurrence of that report in the central electronic system;

using the central electronic system to make an association between (1) each indication of an inappropriate speleothem interaction registered in the central electronic system and (2) a report, also registered in the central electronic system, of a user detected by a fixed detector that is in the vicinity of the speleothem whose sensor produced the last-mentioned indication, each said association additionally being made only if there are common times of occurrence registered in the central electronic system for the indication and the report to be associated with one another, and said central electronic system using results of said association to provide an identification of the user responsible for each inappropriate speleothem interaction; and creating in the central electronic system a record, for each user, of inappropriate interactions with speleothems by that user based on identifications of that user provided in said using.

2. The method defined in claim 1 further comprising:
displaying for a user the record of that user's inappropriate interactions with speleothems.

3. The method defined in claim 2 wherein the displaying for a user comprises:
providing for that user a user-viewable depiction of the vicinity of each speleothem with which that user interacted inappropriately.

4. The method defined in claim 3 wherein each depiction comprises an image of the depicted speleothem vicinity similar to that vicinity as it would have been viewed by the user while in the cave.

5. The method defined in claim 1 further comprising:
including in the record for each user information specifying a total number of that user's inappropriate interactions with the speleothems.

6. The method defined in claim 5 further comprising:
displaying for a user the information specifying the total number of that user's inappropriate interactions with the speleothems.

7. The method defined in claim 1 wherein the speleothems include at least one special speleothem that differs from other speleothems in the cave by being easy for a user to pass without touching and by being a speleothem that each user should interact positively with by attempting to remove that special speleothem, and wherein for that special speleothem all steps of the method are performed as for inappropriate speleothem interactions except the creating is performed to include in the record for each user that user's positive interaction, if any, with the special speleothem.

8. The method defined in claim 7 further comprising:
including in the record for each user information specifying a total number of that user's inappropriate interactions with the speleothems reduced to give credit for that user's positive interaction, if any, with the special speleothem.

9. The method defined in claim 8 further comprising:
displaying for a user the information specifying the total number of that user's inappropriate interactions with the speleothems reduced to give credit for that user's positive interaction, if any, with the special speleothem.

10. The method defined in claim 1 further comprising:
including in the record for each user and for each speleothem with which that user interacted inappropriately information specifying a total number of times the user interacted inappropriately with that speleothem.

11. The method defined in claim 10 further comprising:
displaying for a user for each of the speleothems with which that user interacted inappropriately the information specifying the total number of times that user interacted inappropriately with that speleothem.

12. The method defined in claim 1 further comprising:
determining a time TENTER when each user entered the cave;
determining a subsequent time TEXIT when that user exited the cave; and
displaying for each user how much time that user spent in the cave based on a difference between that user's TENTER and TEXIT.

13. A method of operating an artificial cave traversable by human users such that more than one user can be present in the cave at one time, each user wearing a wirelessly detectable identifier that uniquely identifies that user by means of a user identification that is unique to that user, the cave including a plurality of fixed detectors spaced throughout the cave, each fixed detector being able to wirelessly detect a user who is in the vicinity of that fixed detector by means of the identifier of that user, the cave further including a plurality of artificial speleothems spaced throughout the cave and positioned in the cave so that a user is challenged to exercise care in order to pass each speleothem without contacting the speleothem, each speleothem including a sensor for indicating when a user has contacted the speleothem, and each speleothem being in the vicinity of a respective one of the fixed detectors such that a user who may contact that speleothem is detectable by that fixed detector, the method comprising:

electronically transmitting from each sensor to a central electronic system that serves all of the sensors and all of the fixed detectors an indication of detection of a contact with the speleothem of that sensor, and registering that contact indication and time of occurrence of that contact indication in the central electronic system;

electronically transmitting from each fixed detector to the central electronic system a report of the identity of each user detected in the vicinity of that fixed detector, and registering that report and time of occurrence of that report in the central electronic system; and using the central electronic system for attributing responsibility for each contact indication to a user for whom a report was received from the fixed detector in the vicinity of the sensor that transmitted that contact indication and for which there are common times of occurrence for that contact indication and that report registered in the central electronic system.

14. The method defined in claim 13 further comprising:
making a record for each user of the contact indication attributed to that user in said attributing.

15. The method defined in claim 14 further comprising:
displaying for a user who has completed traversing the cave that user's record of contact indications.

16. The method defined in claim 15 wherein the displaying comprises:
showing the user an image of each speleothem for which there is a contact indication in that user's record of contact indications.

17. The method defined in claim 15 wherein the cave also includes at least one special speleothem disposed in the cave (1) where a user can see and manipulate the special speleothem to be rewarded for good caver behavior if the user chooses to manipulate the special speleothem by attempting to remove the special speleothem, but (2) where a user can alternatively easily avoid contact with the special speleothem if the user chooses to avoid such contact, the special speleothem being equipped with a sensor that transmits to the central electronic system a good-behavior indication when that sensor detects good-behavior manipulation of the special speleothem, the central electronic system handling the good-behavior indication like any contact indication so the displaying can comprise:

indicating to a user who has manipulated the special speleothem a credit notification for that good caver behavior.

\* \* \* \* \*

UNITED STATES PATENT AND TRADEMARK OFFICE
CERTIFICATE OF CORRECTION

PATENT NO. : 10,561,924 B1  
APPLICATION NO. : 15/870959  
DATED : February 18, 2020  
INVENTOR(S) : David Alexander Jackson Page 1 of 1

It is certified that error appears in the above-identified patent and that said Letters Patent is hereby corrected as shown below:

In the Specification

Column 4, Line 44, "(comprising parts 32*a* and 32*b*)" should be deleted.

Column 9, Line 20, "links Again" should be -- links. Again --.

Column 10, Line 19, "40" should be -- 410 --.

Column 10, Line 17, "64/66/68" should be -- 64/66/84 --.

Column 11, Line 22, "40" should be -- 410 --; Line 30, "40" should be -- 410 --.

Column 15, Line 25, "used" should be -- user --.

Column 15, Line 66, "show" should be -- shown --.

Column 19, Line 49, "20" should be -- 50 --.

Column 20, Line 58, "have" should be -- having --.

Column 42, Line 64, ""4"" should be -- "-1" --.

Column 42, Line 65, ""4"" should be -- "-1" --.

Column 42, Line 67, ""4"" should be -- "-1" --.

Column 44, Line 54, "form" should be -- from --.

Column 50, Line 2, "seconds" should be -- second --.

Signed and Sealed this  
Twenty-first Day of July, 2020

Andrei Iancu  
*Director of the United States Patent and Trademark Office*